(12) United States Patent
Yang

(10) Patent No.: US 6,480,307 B1
(45) Date of Patent: Nov. 12, 2002

(54) PLANE LIGHT SOURCE UNIT AND METHOD FOR MANUFACTURING HOLOGRAPHIC LIGHT-GUIDE USED FOR THE SAME

(76) Inventor: Keun-Chang Yang, Industrial Park Ga/501-1, Yatap-dong 150 Bundang-ku, Seongnam-si, Kyungki-do (KR)

( * ) Notice: Subject to any disclaimer, the term of this patent is extended or adjusted under 35 U.S.C. 154(b) by 13 days.

(21) Appl. No.: 09/609,094

(22) Filed: Jun. 30, 2000

(30) Foreign Application Priority Data

| Jul. 2, 1919 | (KR) | ............................................. | 99-26429 |
| Dec. 21, 1999 | (KR) | ............................................. | 99-59940 |
| Dec. 21, 1999 | (KR) | ............................................. | 99-59941 |

(51) Int. Cl.[7] ................................................ G02B 5/32
(52) U.S. Cl. .............................. 359/15; 362/31; 362/26; 362/27; 349/65
(58) Field of Search .............................. 359/15; 362/31, 362/26, 27; 349/65

(56) References Cited

U.S. PATENT DOCUMENTS 5,600,455 A * 2/1997 Ishikawa ...................... 362/31
5,961,198 A * 10/1999 Hira .............................. 362/31
6,231,200 B1 * 5/2001 Shinohara ..................... 362/31

OTHER PUBLICATIONS

B.Saleh, "Fundaments of Photonics", 1991, Wiley, p. 144*

* cited by examiner

Primary Examiner—Cassandra Spyrou
Assistant Examiner—Leo Boutsikaris
(74) Attorney, Agent, or Firm—Alston & Bird LLP

(57) ABSTRACT

A plane light source unit for backlighting and a method for manufacturing holographic light-guides used for the same is disclosed. The holographic light-guide has a first holographic layer on the bottom surface. The first holographic layer has patterns formed with a plurality of holograms, the area density of the pattern being low toward the tubular light source and increasing with an increase in distance from the tubular light source, thereby uniformly illuminating the LCD panel. The holographic light-guide also has a second holographic layer on the top surface, the second holographic layer adjusting scattering pattern of the beam emerged from the light-guide plate.

33 Claims, 55 Drawing Sheets

(a) prism type (b) semi-sphere type (c) ink printing type (a)

(a)

(c)

(d)

(a)　　　　　　　　(b)

(a) Holographic light-guide plate when a positive relief stamper is used (b) Holographic light-guide plate when a negative relief stamper is used

PLANE LIGHT SOURCE UNIT AND METHOD FOR MANUFACTURING HOLOGRAPHIC LIGHT-GUIDE USED FOR THE SAME

BACKGROUND OF THE INVENTION (a) Field of the Invention

The present invention relates generally to flat panel displays such as liquid crystal displays (LCDs), and more particularly, it relates to plane light source units for backlighting and a method for manufacturing holographic light-guides used for the same.

(b) Description of the Related Art

In recent years, flat panel displays have come into wide use as displays in electronic and electrical appliances, replacing conventional cathode ray tubes. Specifically, LCDs have been widely used in flat panel electronic displays.

LCDs comprise a plane light source unit as a backlighting source. Conventional plane light units for LCDs are shown in FIGS. 1A–1C. The conventional plane light source unit shown in FIG. 1A is adapted for an LCD having a relatively small or medium size, such as for a lap-top computer. Meanwhile, the plane light source unit shown in FIG. 1B or 1C is adapted for an LCD having a relatively large size, such as a monitor for desk-top computers, or a wide television monitor which can be attached to a wall.

First, referring to FIG. 1A, the conventional plane light source unit will be explained for an LCD having a relatively small or medium size. The conventional plane light source unit comprises a tubular light source 1, a light-guide plate 2 in which light from the tubular light source 1 propagates, and a reflecting plate 3 for reflecting light emitted from the tubular light source 1 to the LCD panel 8. The plane light source unit further comprises first and second diffusers 4, 5 and first and second prism plates 6, 7. Each prism plate has an array of microprisms formed on its upper surface. The edges of the microprisms are parallel to an x-axis in the first prism plate 6, while the edges of the microprisms are parallel to a y axis in the second prism plate 7 (see FIG. 2 (a)(b)).

FIG. 1B shows a conventional plane light source unit for an LCD having a relatively large size. The conventional plane light source unit comprises a pair of tubular light sources 1, 1', a light-guide plate 2 positioned between the pair of the light sources 1, 1', in which light from the light sources 1, 1' propagates, and a reflecting plate 3 for reflecting light emitted from the pair of tubular light source 1, 1' to the LCD panel 8. The unit further comprises two diffusers 4, 5.

Referring to FIG. 1C, another conventional plane light source unit for an LCD having a relatively large size is shown. The unit comprises a plurality of tubular light sources 1, a light-guide plate 2 above the light sources 1, and a reflecting plate 3 for reflecting light emitted from the plurality of tubular light sources 1 to the LCD panel 8. The unit further comprises two or more diffusers 4.

In the case of a conventional diffusion type light-guide plate used in the conventional plane light source units, scatterer patterns are formed on the reflecting surface on the light-guide plate in order to scatter light for uniform illumination. The scatterers are illustrated in FIG. 3. The light-guide plate may have depressions like (a) prism type or (b) semi-sphere type. The light-guide plate may have an ink dot pattern in which ink including scattering material is printed ((c) ink printing type).

The operation of the conventional plane light source unit is as follows:

First referring to FIG. 4, the plane light source unit as shown in FIG. 1A will be described. The light emitted from the tubular light source 1 enters the light-guide plate 2 and reflects internally (ray R1) in the light-guide plate 2. The light exits to the reflecting plate 3 when the light does not satisfy the total reflection condition or impinges on the scatterer of the light-guide plate 2 as shown in FIG. 3. The light is then reflected on the reflecting plate 3 and may reenter the light-guide plate 2 (ray R2). On the other hand, when the light reflected internally in the light-guide plate 2 impinges on the upper surface of the light-guide plate 2 and does not satisfy the total reflection condition, the light exits from the light-guide plate 2 (ray R3) with an angle θ1. The light then enter a first diffuser 4 and scatters with an angle θ2 (ray R4) which is larger than the angle θ1. The light through the first diffuser 4 enters a first prism plate 6. Since the first prism plate 6 has edges of the microprisms parallel to the x-axis, rays in the y-z plane are affected to decrease the scattering angle, but rays in the x-y plane are not affected (ray R5). The light though the first prism plate 6 enters a second prism plate 7 to make the main ray parallel to the y axis (ray R6) since the second prism plate 7 has edges of the microprisms parallel to the y-axis. Then the light is finally scattered by the second diffuser 5 to have a uniform light distribution for LCDs.

Referring to FIG. 5, the plane light source unit as shown in FIG. 1B will be described. The light emitted from the two tubular light sources 1, 1' enters the light-guide plate 2 and reflects internally in the light-guide plate 2. The light exits to the reflecting plate 3 when the light does not satisfy the total reflection condition or impinges on the scatterer of the light-guide plate 2 as shown in FIG. 3. The light proceeding to the reflecting plate 3 is reflected from the reflecting plate 13, and may then re-enter the light-guide plate 2 (ray R2). On the other hand, when the light reflected internally in the light-guide plate 2 impinges on the upper surface of the light-guide plate 2 and does not satisfy the total reflection condition, the light exits from the light-guide plate 2. The light intensity distribution at the upper surface of the light-guide plate 2 is shown in (b) of the FIG. 5. The lights then enter a first diffuser 4 and scatter to have the light intensity distribution shown in (c) of FIG. 5, which is more uniform than (b). The light that passes through the first diffuser 4 and enters a second diffuser 5 has a substantially uniform light intensity distribution as shown in (d) of FIG. 5, resulting in uniform illumination for LCDs.

As described above, since a light-guide plate of the conventional plane light source unit has scatterers having depressions like prisms or semi-spheres, it is required to have time-consuming and high cost manufacturing processes. Conventional injection molding methods or shaping methods with diamond cutters are not suitable for making light-guide plates which have fine depressions such as on the order of magnitude 10 μm.

On the other hand, it is also a time-consuming process to print dot patterns in the case of the ink printing type light-guide plate. Further, the ink printing type light-guide plate has drawbacks of overall low efficiency since both the ink and the scattering material may absorb light.

Now referring to FIG. 6, the plane light source unit as shown in FIG. 1C will be described. The light emitted from the tubular light sources 1 enters directly through the light-guide plate 2 (ray R2), or reflects from the reflecting plate 3 to the light-guide plate 2 (ray R1). When the light passes through the light-guide plate 3, the light distribution intensity is high near the light sources 1 as shown in diagram (C). The light passes two or more diffusers and then has a substantially uniform light distribution as shown in diagram (b), resulting in uniform illumination for LCDs.

However, since light is absorbed by the scattering pattern, the utilization efficiency of light is poor, and the power consumption of the light source is large.

Further, since the conventional plane light source units need several diffusers or prism plates to obtain uniform illumination, the light is absorbed by the diffusers or prism plates, and this results in a degradation of the brightness of the LCDs.

Therefore, it is required to use a higher intensity light source or more light sources, resulting in cost increases, and increased power consumption.

Further, since diffusers or prism plates are generally expensive, it increases the entire manufacturing cost.

SUMMARY OF THE INVENTION

In view of the prior arts described above, it is an object of the present invention to provide an improved plane light source unit which provides more energy efficiency and uniform illumination.

It is another object of the present invention to provide an improved plane light source unit having high brightness.

It is further another object of the present invention to provide a holographic light-guide used in the improved plane light source unit and method thereof.

It is still another object of the present invention to provide a holographic diffuser used in the improved plane light source unit and method thereof.

To achieve these objects, as embodied and broadly described herein, the invention comprises at least one tubular light source, elongated in a direction;

a holographic light-guide having at least one light incident surface placed near the tubular light source, a reflecting surface on which a first holographic layer is formed for uniform illumination, and a light emitting surface;

a reflector disposed against the reflecting surface of the holographic light-guide, for reflecting the light emerged from the reflecting surface and redirecting the light to the reflecting surface, wherein the first holographic layer has patterns formed with a plurality of holograms, the area density of the pattern being low toward the tubular light source and increasing with an increase in distance from the tubular light source.

According to another aspect of the present invention, a plane light source unit comprises a plurality of tubular light sources disposed in parallel, elongated in a direction;

a holographic light-guide having a light incident surface placed against the tubular light sources and a light emitting surface opposite to the light incident surface, a first holographic layer being formed on either the light incident surface or the light emitting surface; and a reflector disposed against both the tubular light sources and the reflecting surface of the holographic light-guide, for reflecting and redirecting the light to the reflecting surface, wherein the first holographic layer has speckles, the speckles being formed densely near the tubular light sources and sparesely farther from the tubular light source.

According to further aspect of the present invention, a holographic lightguide for plane light source units comprises the steps of:

1) forming a first hologram for the first holographic layer, comprising the steps of:
   A) enlarging a laser beam and entering it into a diffuser;
   B) exposing a first substrate with a mask having patterns to be formed to the laser beam, the first substrate being coated with photoresist;
   C) developing the first substrate by etching the photoresist;

2) forming a second hologram for the second holographic layer, comprising the steps of:
   a) enlarging a laser beam and sending it into a cylindrical lens so that the laser beam enters a diffuser;
   b) exposing a portion of a second substrate with a shielding plate to the laser beam at a predetermined distance, the second substrate being coated with photoresist;
   c) repeating the step b) as the distance increases by a predetermined increment until the entire surface of the second substrate is exposed, wherein the portion to be exposed is adjacent to the portion previously exposed and the portion previously exposed is shielded by the shielding plate;
   d) developing the second substrate by etching the photoresist;

3) forming a first metal stamper by electroless-plating the first substrate;

4) forming a second metal stamper by electroless-plating the second substrate;

5) coating a transparent plate with an ultraviolet-curing material;

6) irradiating the coated transparent plate by ultraviolet rays, but not to the extent that the ultraviolet-curing material is completely cured;

7) pressing the irradiated transparent plate up and down by the first metal stamper and the second metal stamper simultaneously; and 8) irradiating the transparent plate by ultraviolet rays until the ultraviolet-curing material is completely cured.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE PREFERRED EMBODIMENTS

Several preferred embodiments of the present invention will be described in detail with reference to the accompanying drawings.

First Preferred Embodiment

Figure 7:
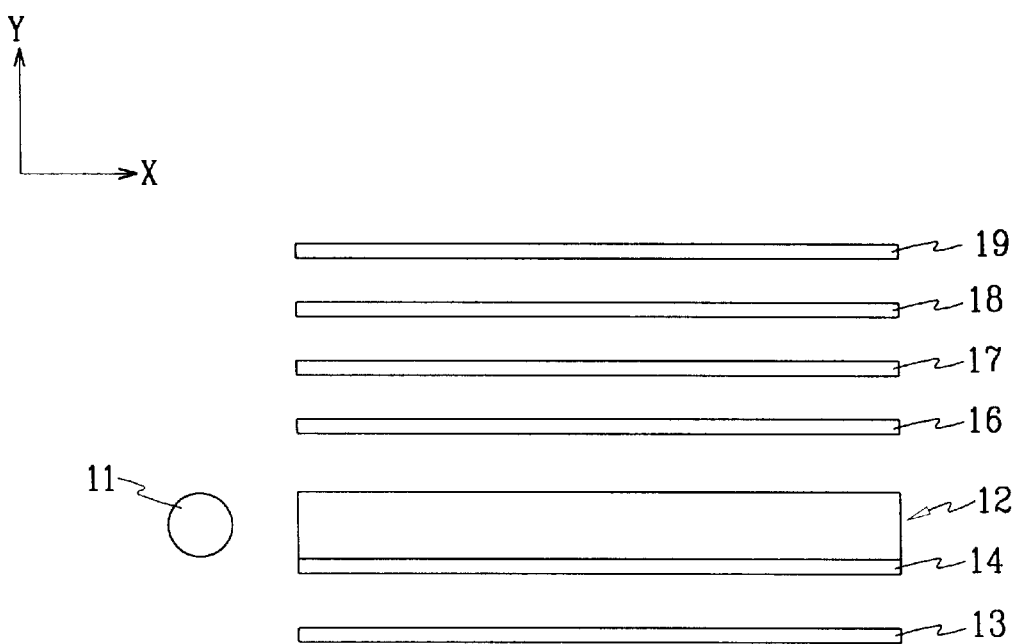
FIG. 7 shows a first preferred embodiment of a plane light source unit according to the present invention.

The first preferred embodiment of the present invention is preferably adapted for a small size LCD and will be described first with reference to FIGS. 7–19. Referring to FIG. 7, a tubular light source 11 is placed near a holographic light-guide 12. For ease of explanation hereinafter, the tubular light source is elongated parallel to a z-axis and the holographic light-guide lies on an x-y plane. The holographic lightguide 12 is constituted by a light incident surface on the left, a light emitting surface facing an LCD (not shown) on the top, and reflecting surfaces on the bottom and the right. The holographic light-guide 12 has a holographic layer 14 formed at the reflecting surface on the bottom, which functions to promote uniform illumination. A material having a high transmittance is preferably used for the holographic light-guide 12.

Reference numeral 13 denotes a reflecting plate for reflecting back light emitted from the holographic light-guide 12. A first diffuser 16, first prism plate 17, second prism plate 18 and second diffuser 19 are laminated in order between the light emitting surface of the holographic light-guide 12 and the LCD. Each prism plate has an array of microprisms formed on its upper surface. The edges of the microprisms are parallel to an x-axis in the first prism plate 17, while the edges of the microprisms are parallel to a y axis in the second prism plate 18.

Referring to FIGS. 8A–8D and FIGS. 9A–9B, several kinds of masks are illustrated for manufacturing the holographic layer 14 of the holographic light-guide 12. The holographic layer 14 can be manufactured using a mask among the masks FIGS. 8A–8D, 9A–9B, and the holographic layer 14 has the same pattern composed of holograms as the pattern of the mask used. These mask patterns are generally produced with a transparent film by CAD with computers. The portions outside the patterns of the mask are opaque to block light, while the portions inside the patterns (for example inside circles) are transparent. Therefore, holograms are only produced inside the patterns.

Figure 8A:
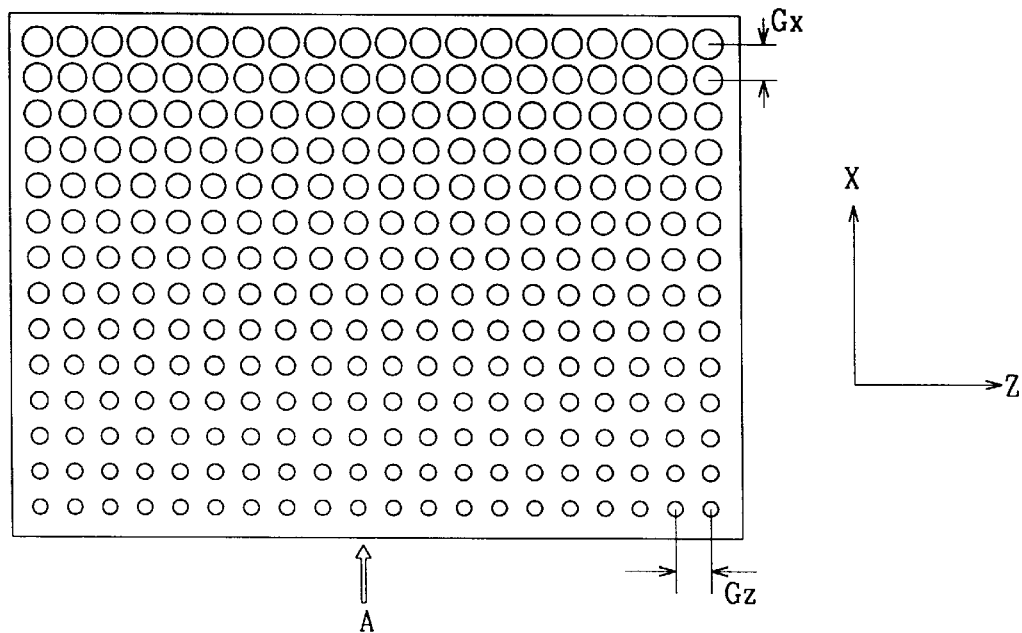
FIGS. 8A–8D illustrate four kinds of mask patterns having circles or polygons.
Figure 8B:
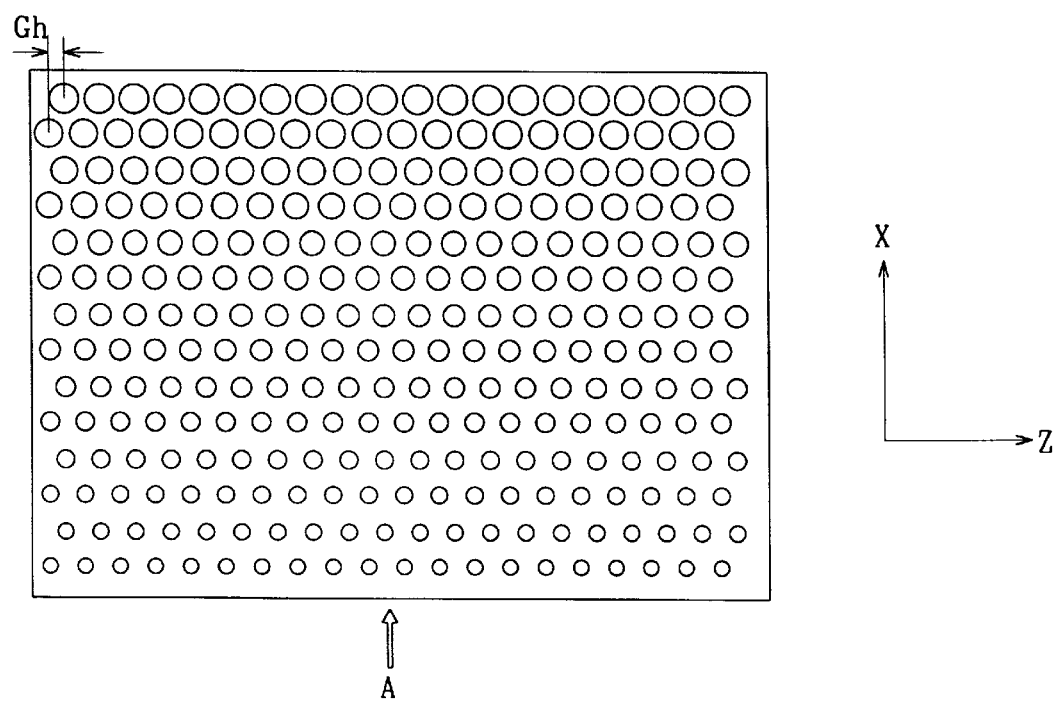
Figure 8C:
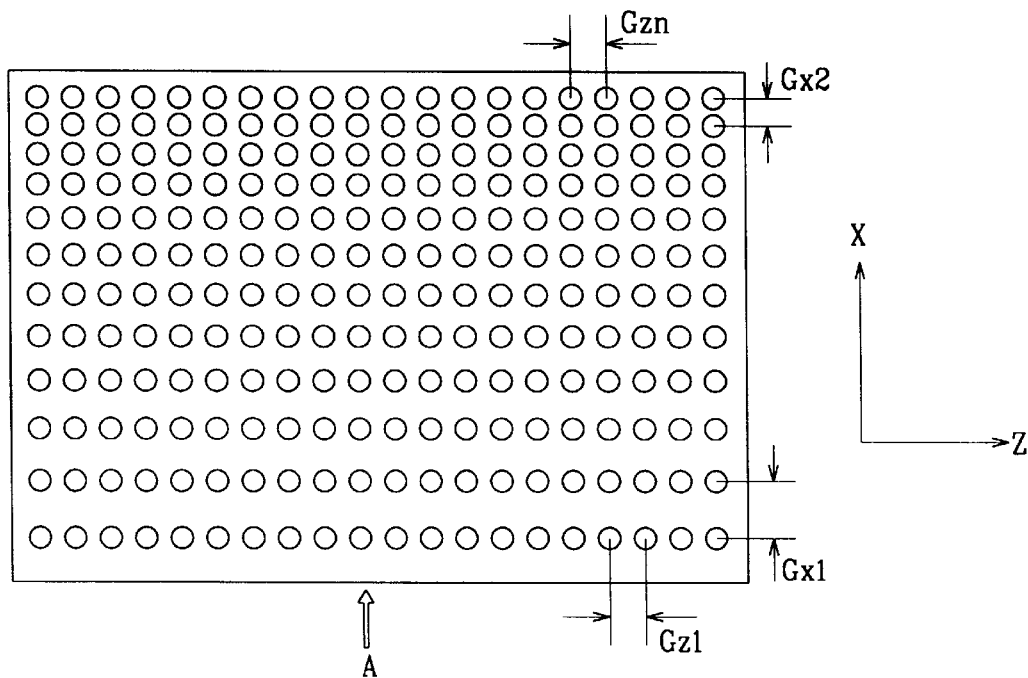
Figure 8D:
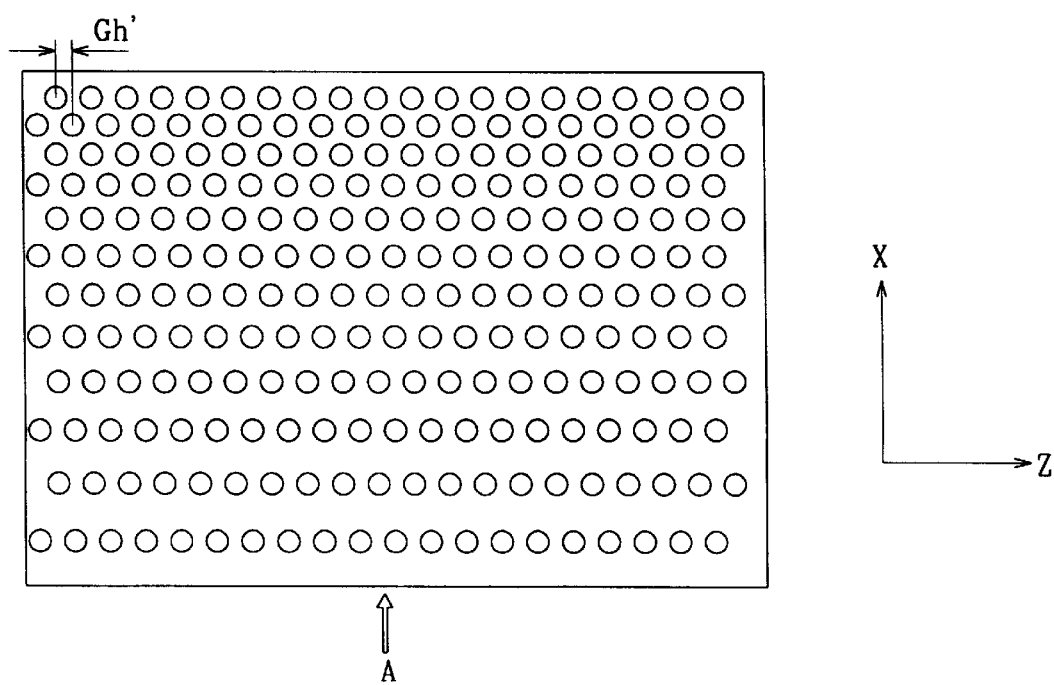

In FIG. 8A, the diameters of circles (or polygons) are small near the tubular light source (arrow A) and increased with an increase in distance from the tubular light source, maintaining a uniform distance (Gx, Gz) between centers of the adjacent circles. The arrangement of FIG. 8B is the same as that of FIG. 8A, except that the centers of the circles are on the same line toward the x-axis in every other line. That is, the centers of the adjacent lines are shifted in the amount of half of the distance between the adjacent centers (Gh=Gz/2). In FIG. 8C, the diameter of the circles are uniform, but the circles are sparsely formed at portions near the tubular light source (arrow A), whereas the circles are densely formed at portions remote from the tubular light source. That is, distances between the centers along the x-axis decrease with an increase in distance from the tubular light sources (Gx1>Gx2). The distance between the centers along the z-axis can also be decreased or maintained at a uniform value. In the drawing, it is illustrated that the distance along the z-axis is maintained at a uniform value (Gz1=Gzn). The arrangement of FIG. 8D is the same as that of FIG. 8C, except that the centers of the circles are on the same line toward the x-axis in every other line (Gh'=Gz/2).

Figure 9A:
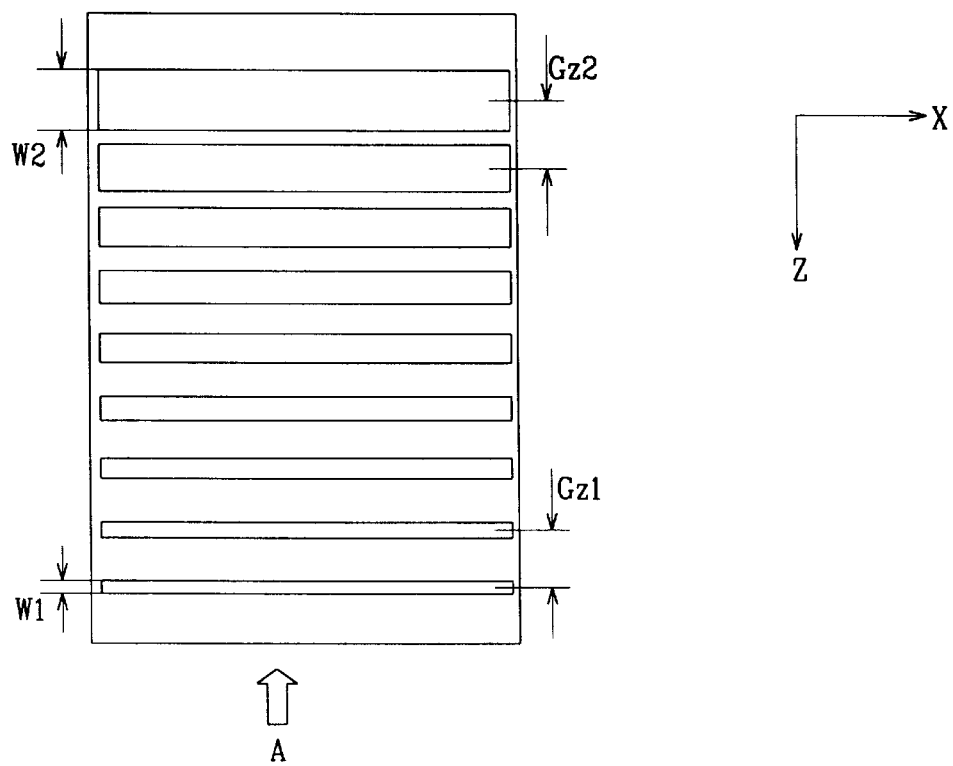
FIGS. 9A–9B illustrate two kinds of mask patterns having bands.
Figure 9B:
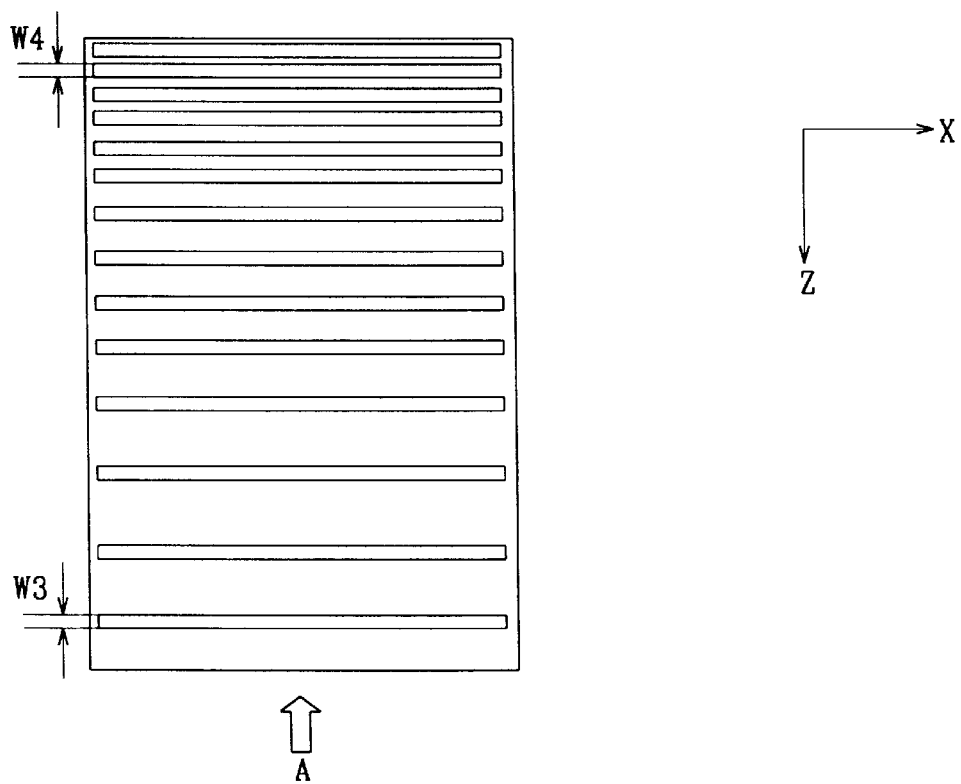

FIGS. 9A–9B illustrate two kinds of mask patterns having bands. In FIG. 9A, the width of the bands are small near the tubular light source (arrow A) and increase with an increase in distance from the tubular light source (W1<W2), maintaining the uniform distance (Gz1=Gz2) between center lines of the adjacent bands. In FIG. 9B, the widths of bands are uniform (W3=W4), whereas the distance between the center lines of the adjacent bands decrease with an increase of the distance from the tubular light source.

The area density of the pattern is low toward the tubular light source and increases with an increase in distance from the tubular light source, so that the scattering of light can be decreased near the light source and increased with an increase of the distance from the light source. Therefore, resultant light intensity distribution becomes uniform.

The manufacturing method for a holographic light-guide will be described with reference to FIGS. 10–19. First, a master hologram is made using a mask shown in FIGS. 8A–8D and 9A–9B, and a master stamper is prepared. Finally, a holographic light-guide is made using a master stamper.

Figure 10:
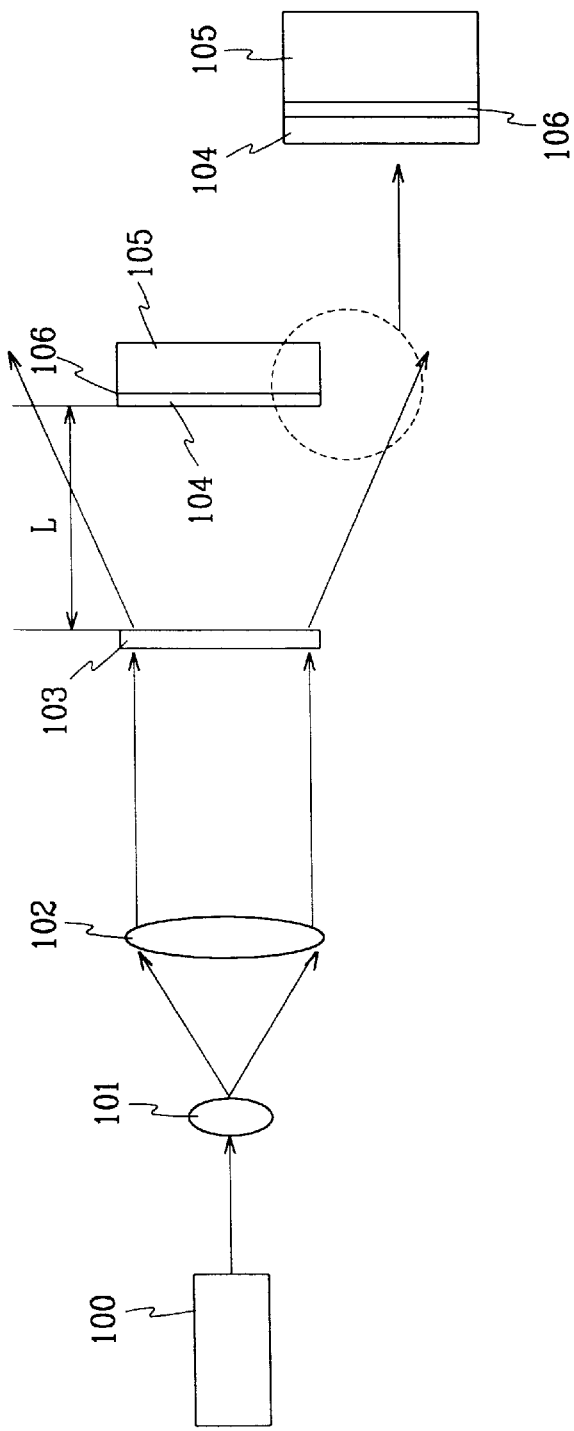
FIG. 10 illustrates a process for manufacturing a negative master hologram using a mask.

Referring now to FIG. 10, a process for making a master hologram is explained.

Figure 11:
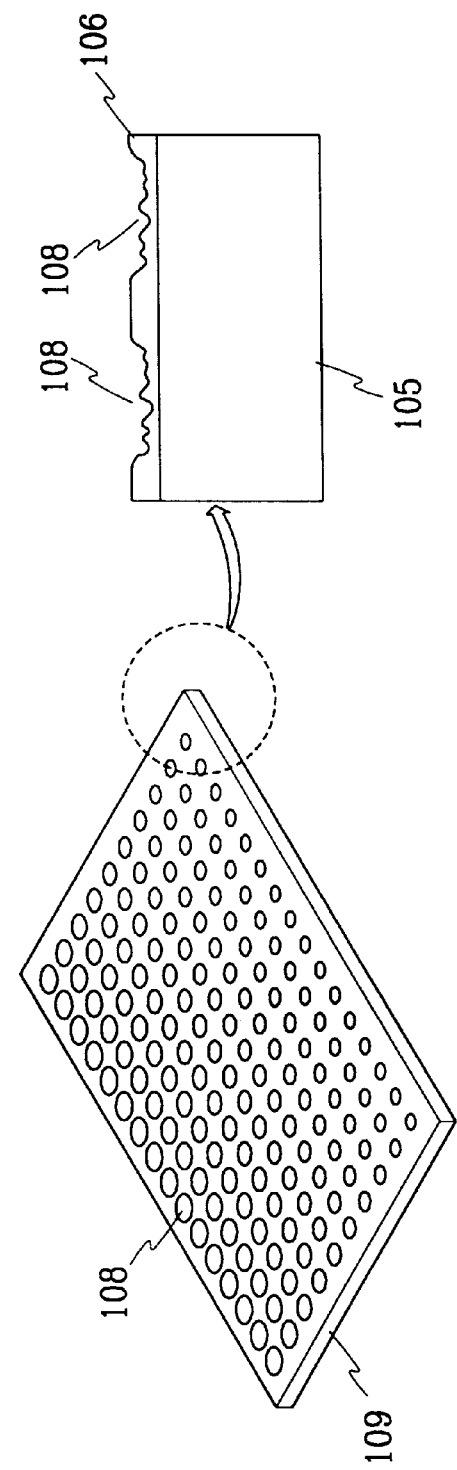
FIG. 11 shows a master hologram according to the process of FIG. 10.

The laser beam from laser 100 enters lenses 101, 102, resulting in an enlarged beam. The enlarged beam enters a diffuser 103 such as a ground is glass diffuser, and then enters a glass substrate 105 which is at a distance L from the diffuser 103. The glass substrate 105 is coated with photoresist layer 106 and then the mask 104 (one of FIGS. 8A–8D, 9A–9B) is attached. Thereafter, the diffused laser beam passes through transparent pattern portions of the mask 104, and the photoresist layer of the transparent pattern portions is exposed. A master hologram 109 as shown in FIG. 11 is prepared through this developing process. The master hologram 109 has a hologram pattern 108 which is etched by speckles of the laser beam. It is matter of course that the hologram pattern 108 is arranged the same as the pattern of the mask used.

Figure 12:
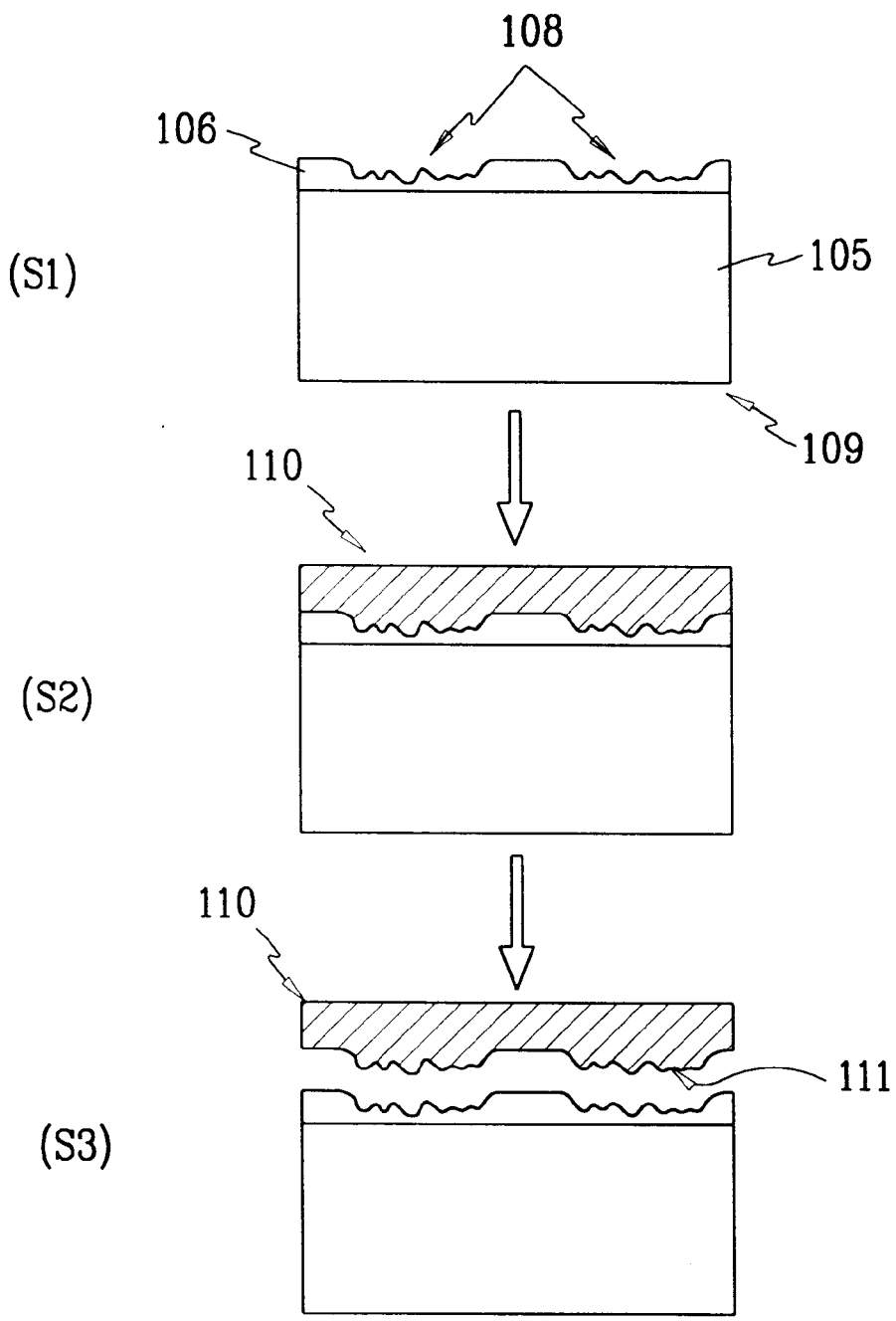
FIG. 12 illustrates a process for making a stamper from the master hologram.
Figure 13:
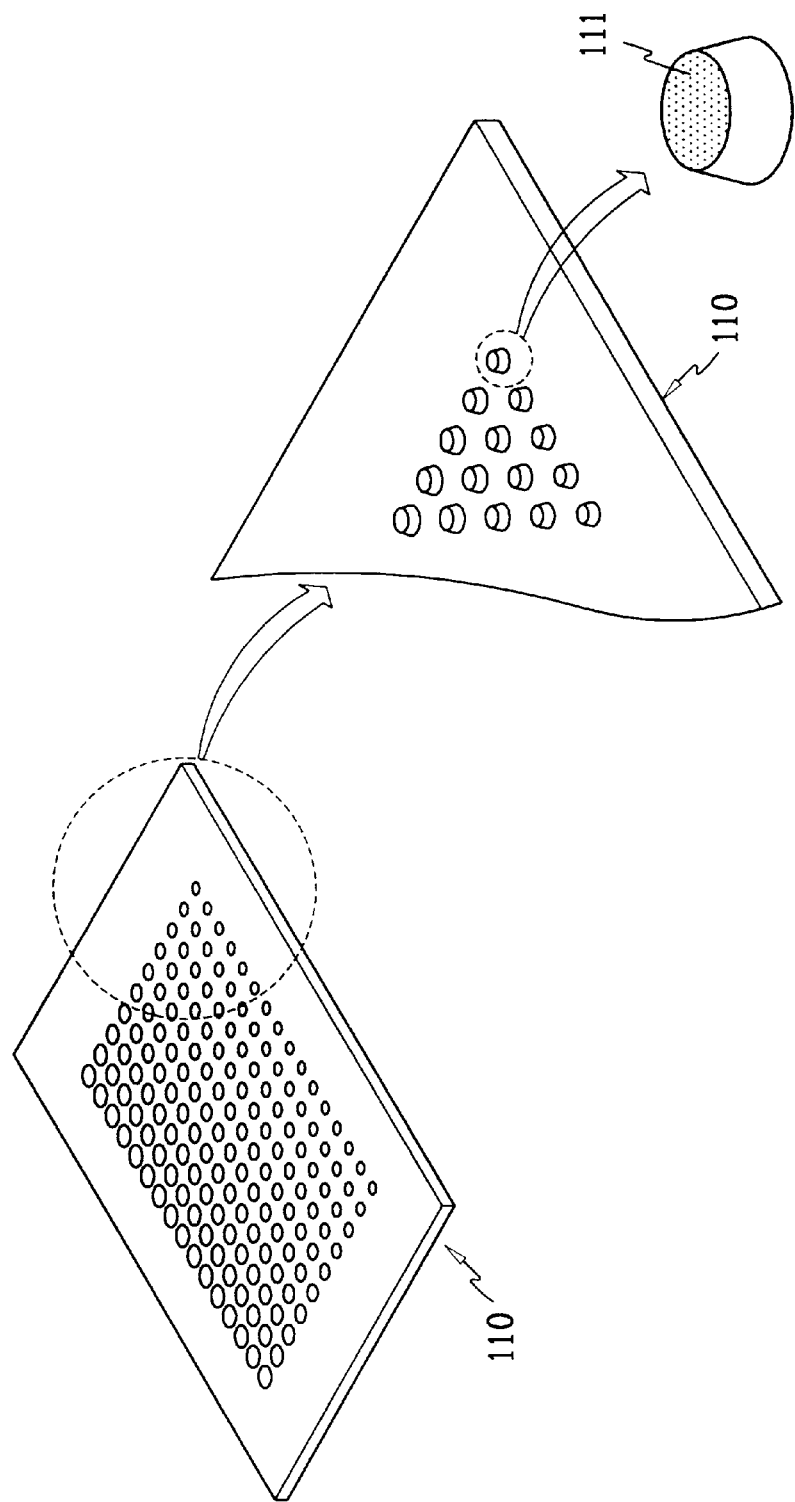
FIG. 13 shows a stamper according to the process of FIG. 12.

Then, a master stamper is made in the process of FIG. 12. The master hologram 109 is electroless-plated so that a metal layer 110 is formed on the photoresist layer 106 (the unexposed portion and the hologram patterns 108). (S1–S2) The master stamper is provided by separating the metal layer 110 from the master hologram 109 (S3), and in this case, the master stamper 110 has a raised portion of the hologram pattern, resulting in a positive stamper. FIG. 13 shows an enlarged view of the positive master stamper 110 having the raised hologram pattern 111.

Figure 14:
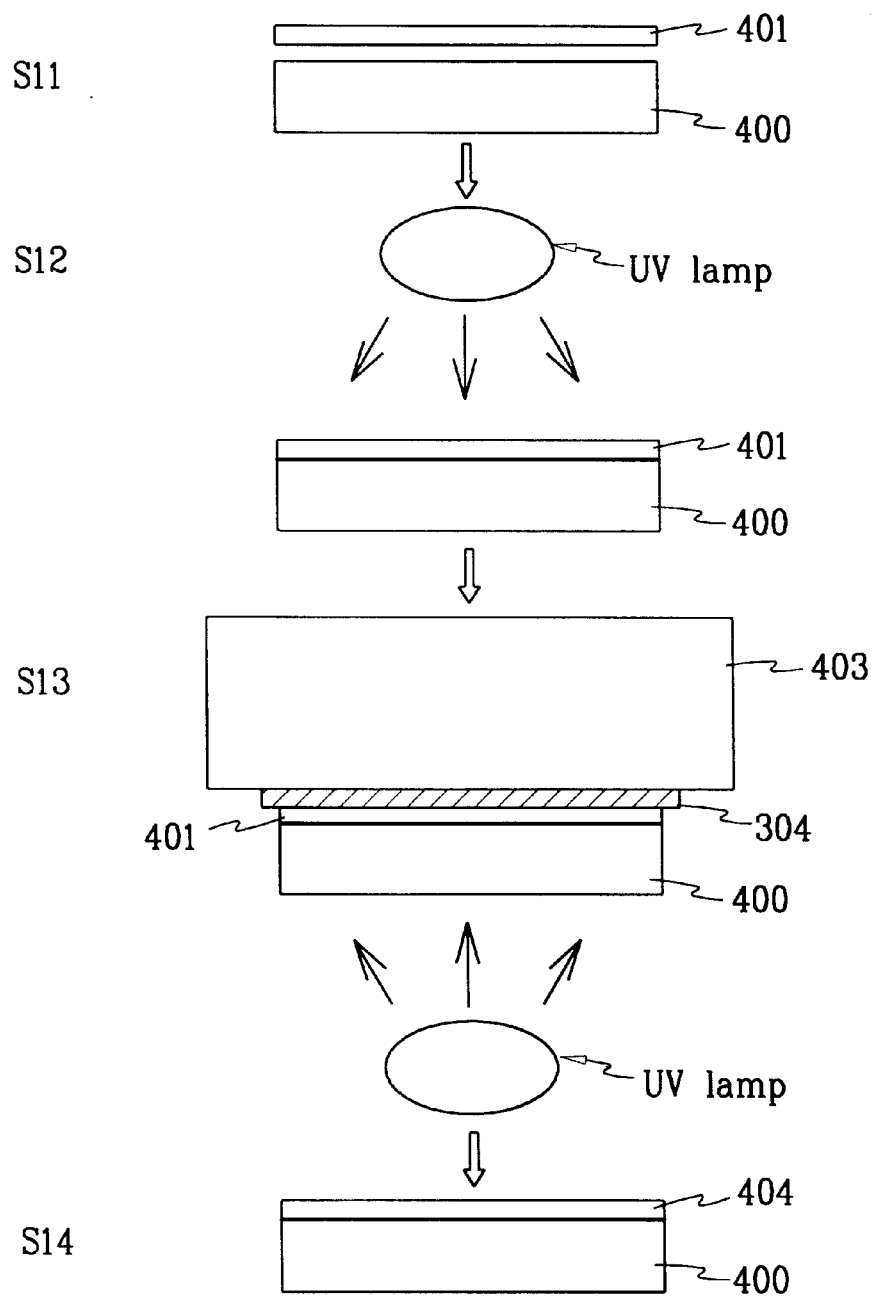
FIG. 14 illustrates a process for manufacturing a holographic light-guide using the stamper FIG. 13.
Figure 15:
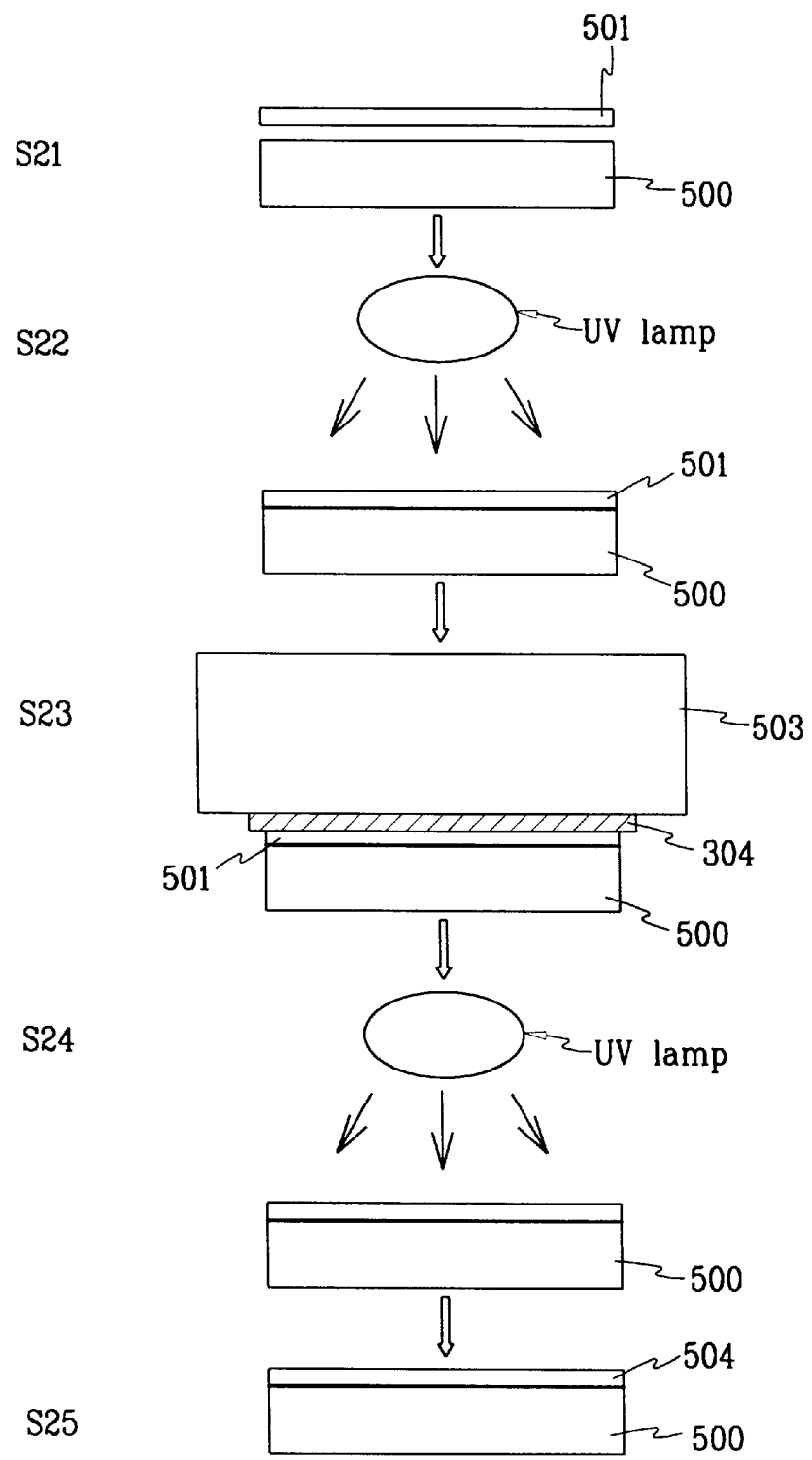
FIG. 15 illustrates another process for manufacturing a holographic light-guide using the stamper of FIG. 13.
Figure 16:
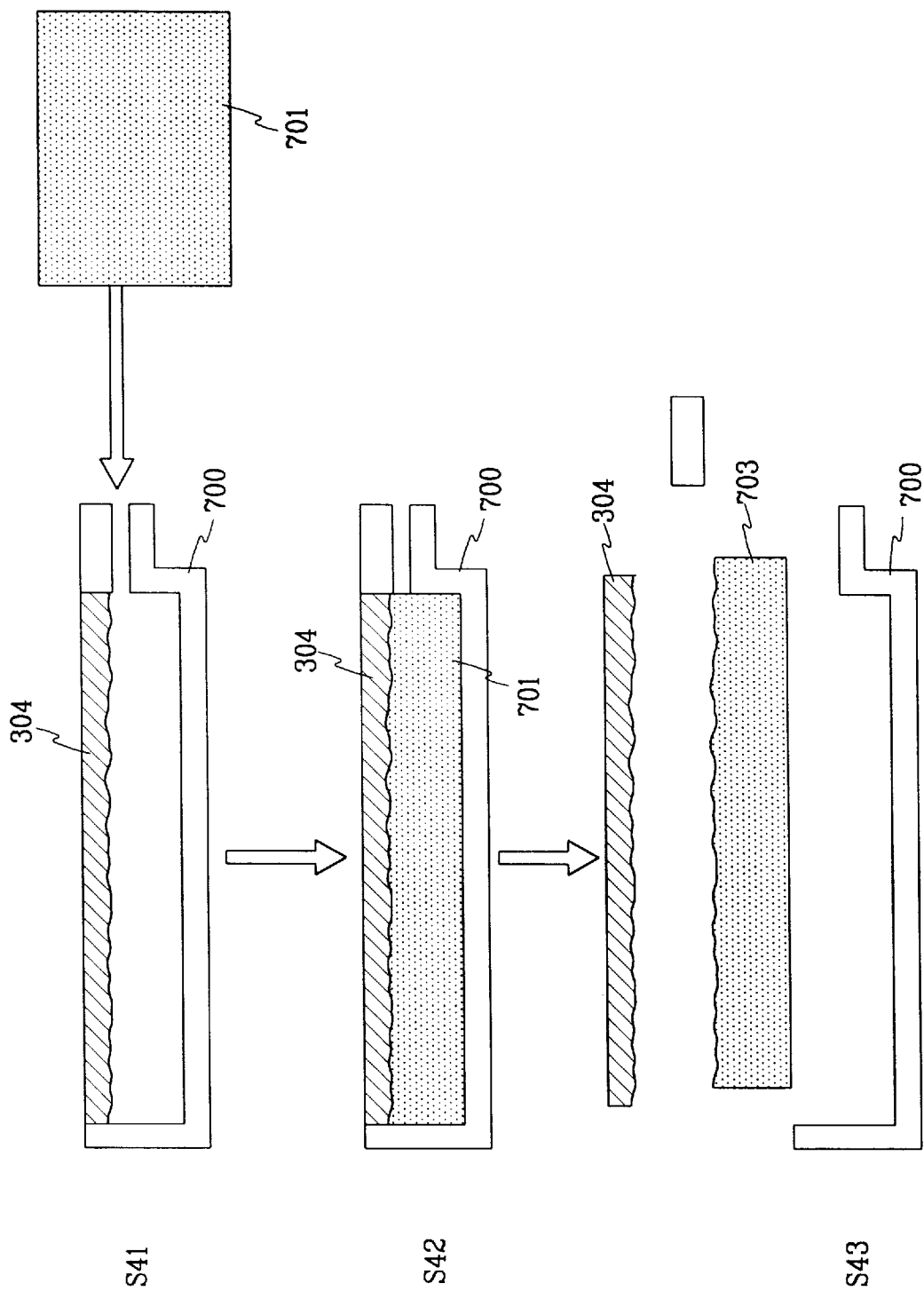
FIG. 16 illustrates still another process for manufacturing a holographic light-guide using the stamper of FIG. 13.

Referring now to FIGS. 14–16, three manufacturing processes for the holographic light-guide will be described using a master stamper.

First, FIG. 14 shows a manufacturing process for an ultraviolet (UV) curing method. A transparent substrate 400 for a holographic light-guide is prepared and coated with UV-curing material 401 (S11), and then the substrate 400 is illuminated by UV light, but not to the extent that the UV-curing material 401 is completely cured (S12). Next, the stamper 304 (110 in FIG. 12), which is attached to a press 403, is pressed to the UV-curing material 401. During the pressing process, the UV light is again illuminated on the UV-curing material 401, until it is completely cured (S13). Finally, a holographic light-guide is completed by separating the stamper 304 from the substrate 400 (S14).

FIG. 15 shows another manufacturing process for an ultraviolet (UV) curing method, which is identical with that of FIG. 7 except that the final curing process is performed after separation of the stamper. That is, a transparent substrate 500 coated with UV-curing material 501 is illuminated by UV light, but not to the extent that the UV-curing material 501 is completely cured (S21–S22), and then the stamper 304 (110 in FIG. 12), which is attached to a press 503, is pressed to the UV-curing material 501 and then separated (S23). Then the UV light is again illuminated on the UV-curing material 401 until it is completely cured (S33), and a holographic light-guide is provided.

FIG. 16 shows a manufacturing process for an injection molding method. The stamper 304 (110 in FIG. 12) is mounted on a mold 700 (S41). The transparent resin 701 is heated, provided to the mold 700, and cooled (S42). Then, a holographic light-guide 703 is provided by separating it from the mold (S43).

Figure 17:
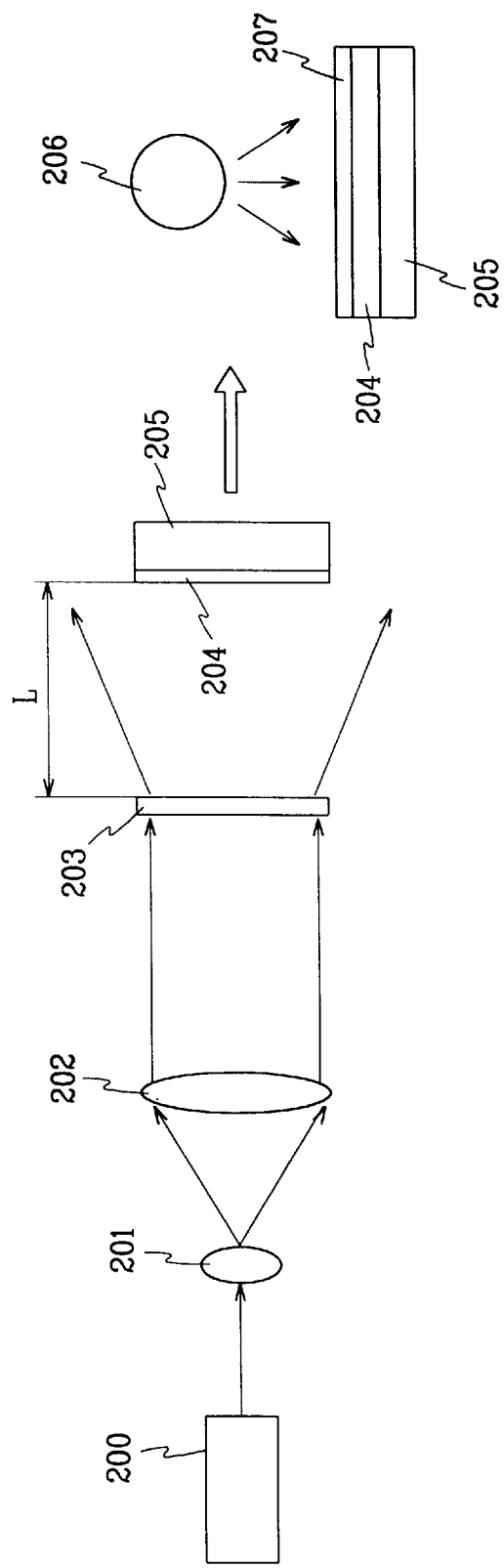
FIG. 17 illustrates a process for manufacturing a positive master hologram using mask.

Although FIGS. 11–16 show processes for making a stamper of a positive type, it is possible to make a negative stamper in order to manufacture a holographic light-guide. FIG. 17 shows a process for making a positive master hologram to provide a negative stamper.

Figure 18:
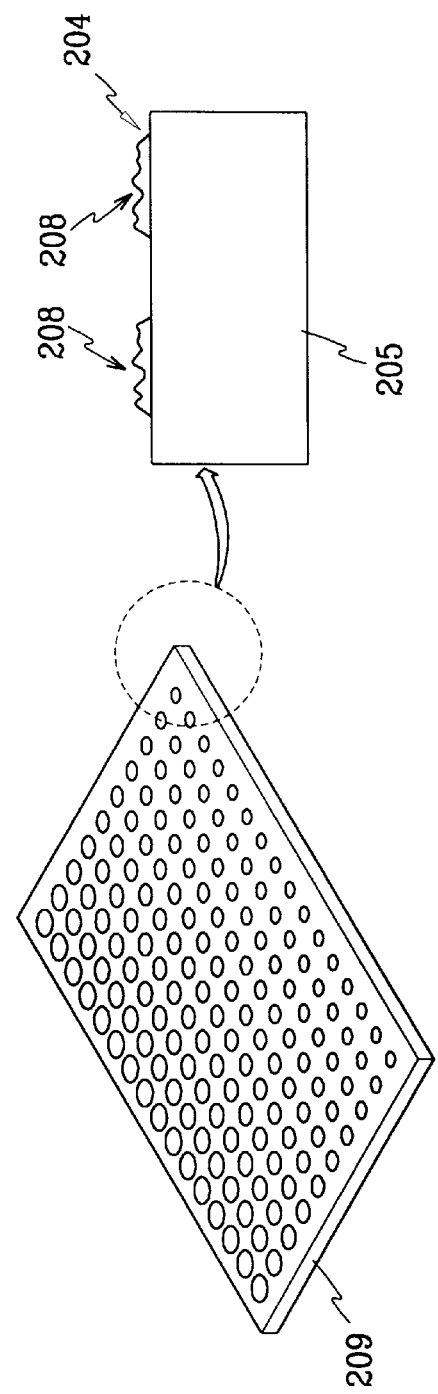
FIG. 18 shows a positive master hologram according to the process of FIG. 17

The laser beam from laser 200 enters lenses 201, 202, resulting in an enlarged beam. The enlarged beam enters a diffuser 203 such as a ground glass diffuser, and then enters a glass substrate 205 which is at a distance L from the diffuser 203. The glass substrate 205 is coated with a photoresist layer 204. Then, the glass substrate 205 is first-exposed for a desired time to the laser beam, then the mask 207 is attached and illuminated by UV light. The mask 207 has patterns which may be one of the patterns shown in FIGS. 8A–8D, 9A–9B, but the portions outside the patterns of the mask are transparent, while the portions inside the patterns (for example inside circles) are opaque to block light. Therefore, the UV light is passed through transparent pattern portions of the mask 207, and the photoresist layer of the transparent portions outside the patterns is completely exposed and etched through the developing process. The photoresist layer of the opaque pattern portions inside the patterns is developed to form laser speckle patterns because it is not exposed to the UV light, and hence a positive master hologram 209 as shown in FIG. 18 is prepared. The master hologram 209 has a positive hologram pattern 208 which is etched by speckles of the laser beam. It is matter of course that the hologram pattern 208 is arranged the same as the pattern of the mask used.

Figure 19:
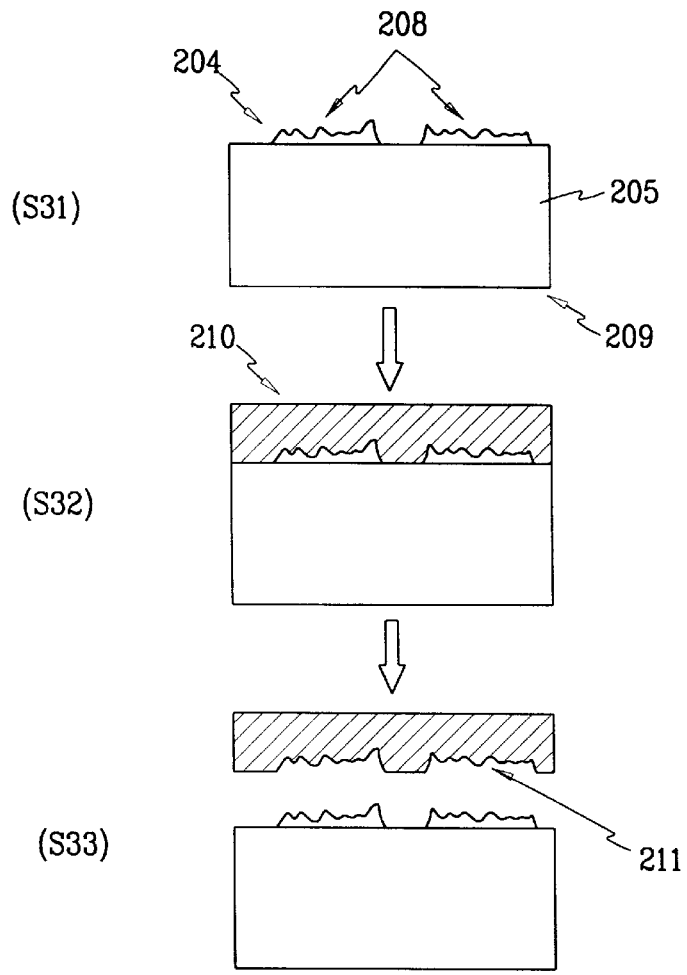
FIG. 19 illustrates a process for making a negative stamper from the positive master hologram.

Now, a master stamper is made in the process of FIG. 19. The master hologram 209 is electroless-plated so that a metal layer 210 is formed on the photoresist layer 206 and the completely exposed portions of the substrate. (S31–S32) The master stamper is provided by separating the metal layer 210 from the master hologram 209 (S33). In this case, the master stamper 210 has a depressed portion 211 of the hologram pattern, resulting in a negative stamper.

Figure 53:
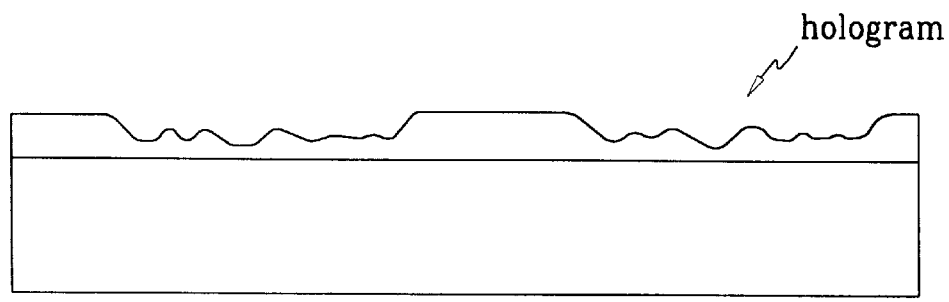
FIG. 53 shows holographic light-guides using positive and negative stampers.
Figure 53:
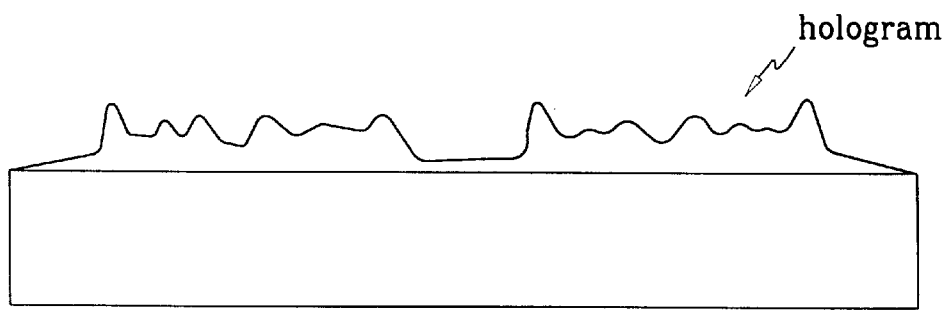

The holographic light-guide is manufactured by the process of FIG. 14, 15 or 16 using the negative stamper, similar to that of the process using the positive stamper. FIG. 53 shows schematic views of holographic light-guides of (a) using a positive stamper by the process of FIGS. 10–12, and (b) using a negative stamper by the process of FIGS. 17–19.

Second Preferred embodiment

Now referring to FIG. 20, the second preferred embodiment of the plane light source unit for relatively small size LCDs according to the present invention will be explained.

A tubular light source 21 is placed near a holographic light-guide 22. The holographic light-guide 22 is constituted by a light incident surface on the left, a light emitting surface facing an LCD (not shown) on the top, and reflecting surfaces on the bottom and the right. The holographic light-guide 22 has a first holographic layer 24 formed at the reflecting surface on the bottom and a second holographic layer 25 formed at the light emitting surface on the top. The first and second holographic layers 24, 25 function to promote uniform illumination. A material having a high transmittance is preferably used for the holographic light-guide 22.

Reference numeral 23 denotes a reflecting plate for reflecting back light emitted from the holographic light-guide 22. A first prism plate 27, second prism plate 28 and a diffuser 29 are laminated in order between the light emitting surface of the holographic light-guide 22 and the LCD. Each prism plate has an array of microprisms formed on its upper surface. The edges of the microprisms are parallel to an x-axis in the first prism plate 27, while the edges of the microprisms are parallel to an y-axis in the second prism plate 28.

The first holographic layer 24 can be formed using a mask among the masks of FIGS. 8a–8D, 9A–9B, and it will then have a hologram pattern of the pattern of the mask used.

The master hologram as well as the master stamper (first stamper) for the first holographic layer 24 is made through the processes as described with reference to FIG. 12 or 19.

On the other hand, the second holographic layer 25 can be formed as follows: First, a master hologram is made through processes shown in FIGS. 21 and 23A–23B, and a master stamper (second stamper) is prepared. Finally, a holographic light-guide is then made using the first and second master stampers.

Figure 21:
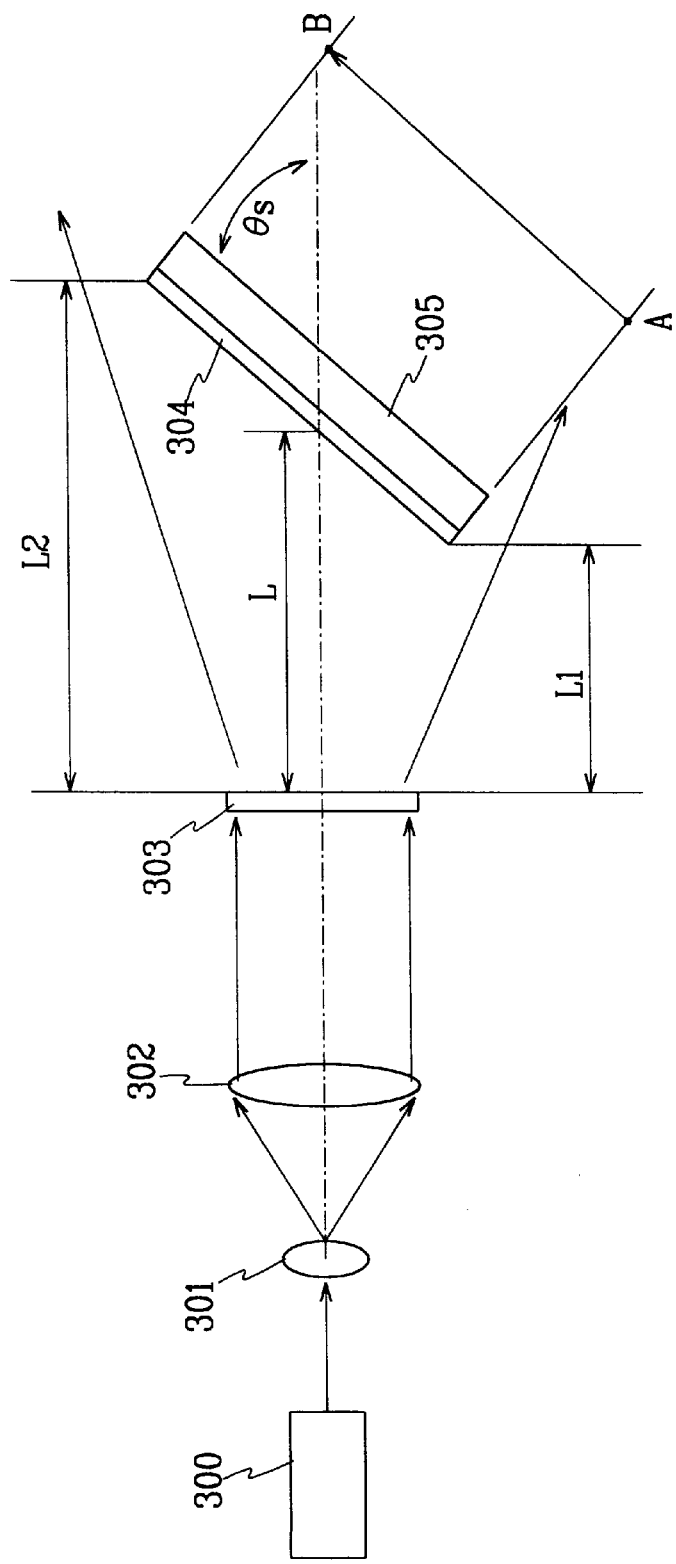
FIG. 21 illustrates a process for manufacturing a master hologram for a second holographic layer.

Referring to FIG. 21, the laser beam from the laser 300 enter lenses 301, 302, resulting in enlarged beams. The enlarged beam enters a diffuser 303 such as a ground glass diffuser, and then enter a glass substrate 305 which is at a distance L from the diffuser 303 and having an angle θs with respect to the optic axis of the laser beam. The glass substrate 305 is coated with a photoresist layer 304. One edge A of the substrate 305 is distant from the diffuser 303 by the distance L1 (L1=L−L cos θs/2), while the other edge B of the substrate 305 is distant from the diffuser 303 by the distance L2 ( L2=L+L cos θs/2). When the laser beam from the diffuser exposes the substrate 305 with the photoresist layer 304, the speckle patterns of the laser beam are increased with an increase of distance from the laser 300. That is, portions near the edge A, which are relatively near the laser 300, have a small speckle pattern so that the density of speckles is high. In contrast, portions near the edge B, which are relatively far from the laser 300, have a large speckle pattern so that the density of speckles is low. Therefore, the size of speckles is gradually increased and the density of speckles is gradually decreased, with an increase of distance from the edge A to the edge B.

The substrate 305, which is exposed by the above process, is developed to a master hologram 306 having holograms 304', 304". The density of the hologram is relatively high at the portion near the edge A (hologram 304'), and gradually decreases to the portion near the edge B (hologram 304").

Figure 23A:
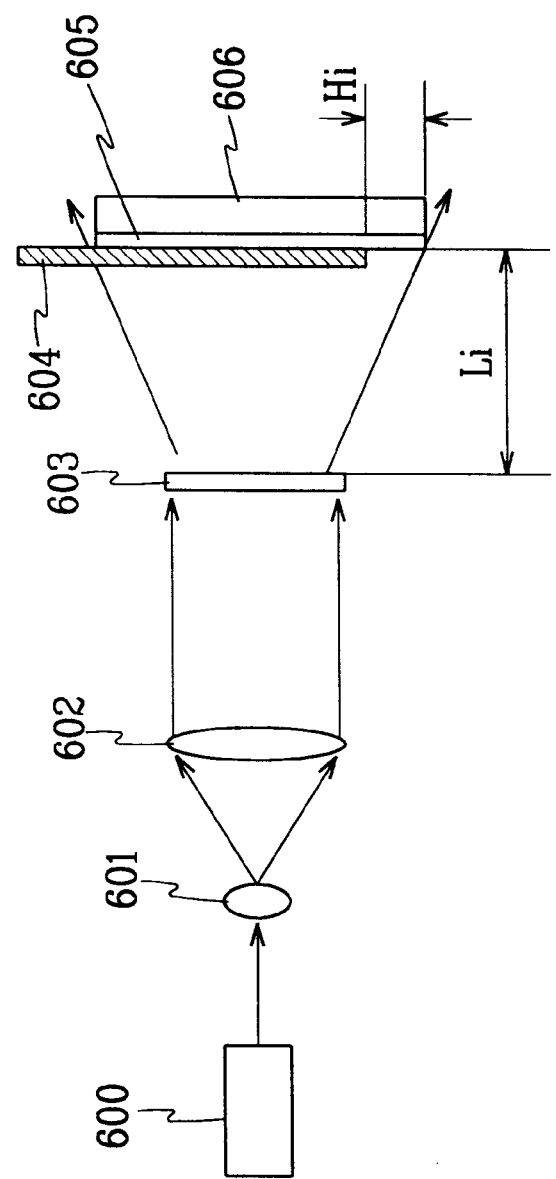
FIGS. 23A–23B illustrate another process for manufacturing a master hologram for the second holographic layer.
Figure 23B:
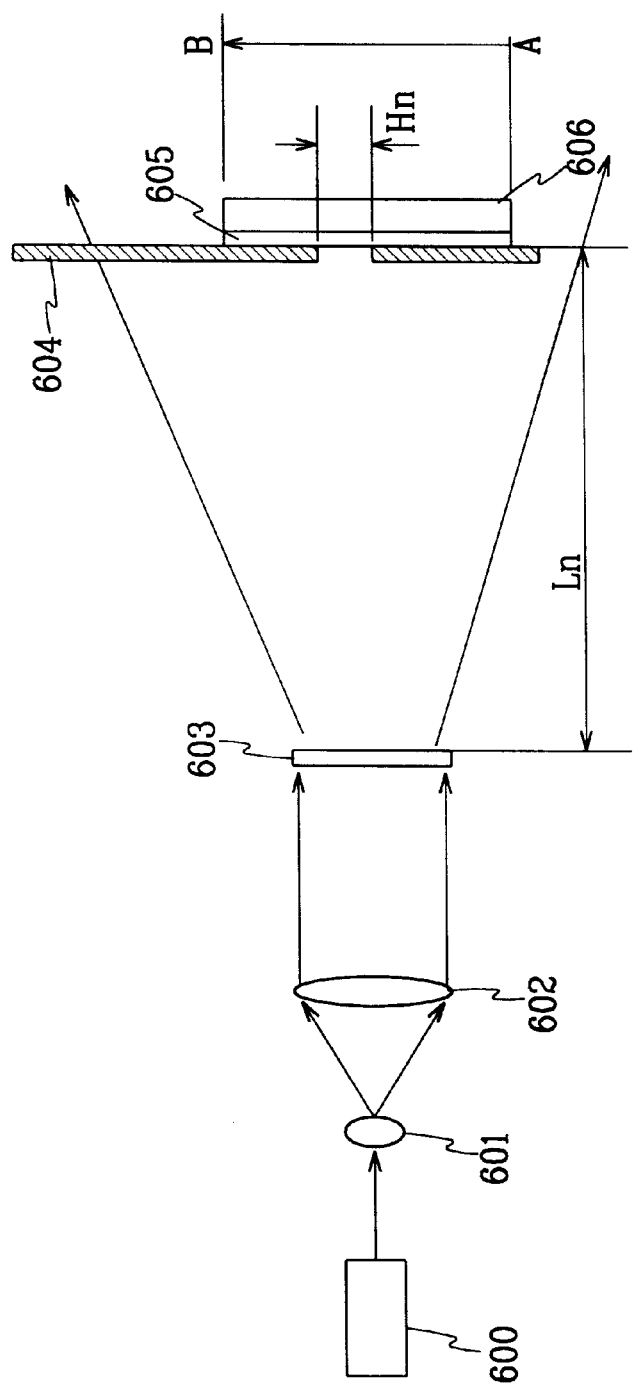

Another process for the second holographic layer whose density of speckle is gradually increased or decreased is illustrated in FIGS. 23A–23B. Referring to FIG. 23A, the laser beam from the laser 600 enter lenses 601, 602, resulting in enlarged beams. The enlarged beam enters a diffuser 603 such as a ground glass diffuser, and then enter a glass substrate 606 which is at a distance Li from the diffuser 603. The glass substrate 606, which is coated with a photoresist layer 304, are all shielded by a shielding plate 604, except for a desired width Hi at one edge. When the substrate is exposed to the laser beam, only the portions having the width Hi of the substrate 606 are exposed. Then, the distance between the diffuser 603 and the substrate 606 is increased a predetermined distance, and the shielding plate is shifted in a manner such that the previously exposed portion Hi is shielded and the next adjacent portion is exposed. The substrate is exposed, and the above process is repeated as the distance increases until the entire surface of the substrate 606 is exposed (toward edge B in FIG. 23B).

Figure 24:
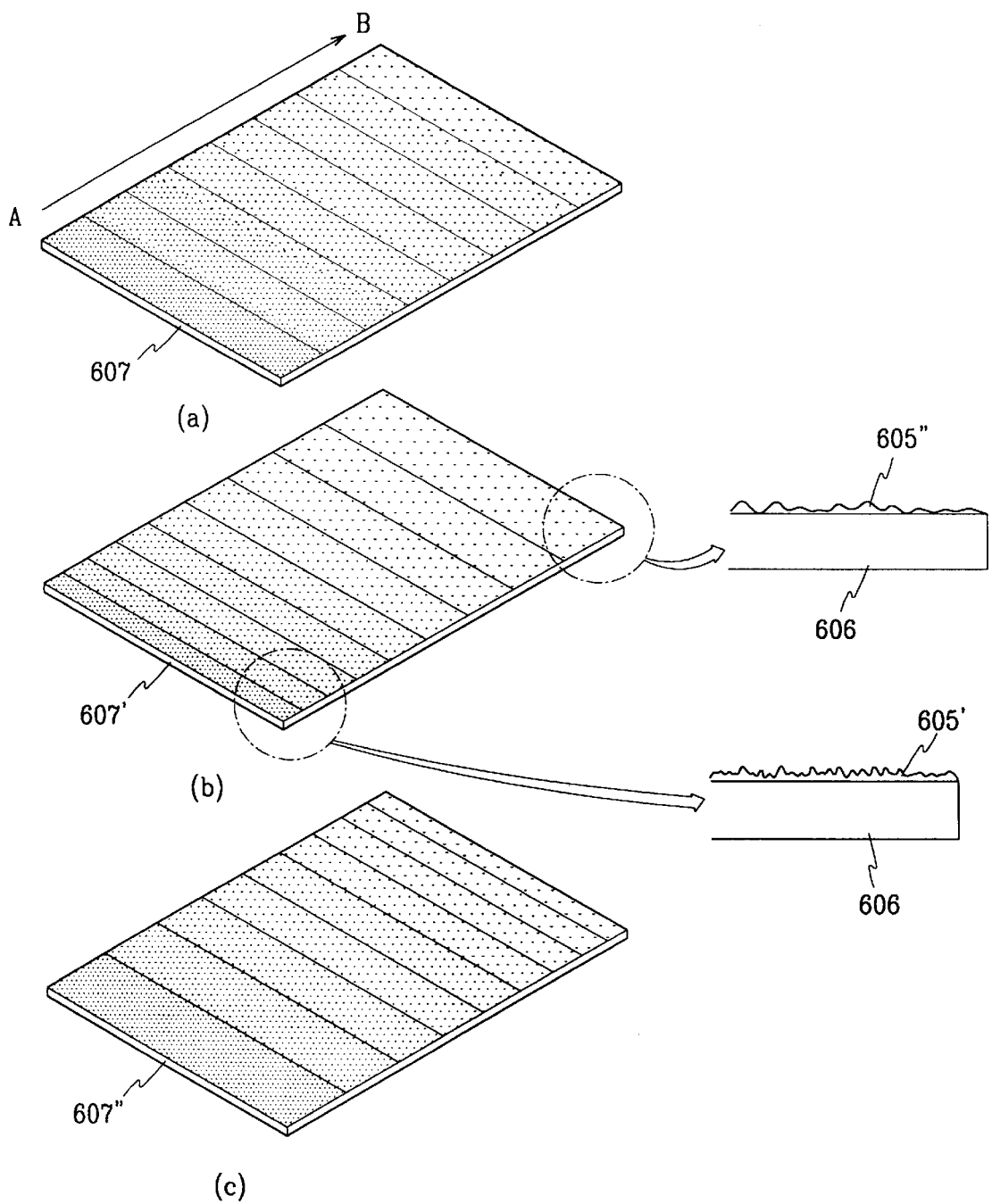
FIG. 24 shows a master hologram according to the process of FIGS. 23A–23B.

The substrate 606, which is exposed by the above process, is developed to a master hologram 607, 607' or 607" having holograms 605', 605", as shown in FIG. 24. The density of speckles in the hologram is relatively high at the portion near the edge A (hologram 605'), and discretely decreases to the portion near the edge B (hologram 605"). FIG. 24 shows master holograms 607, 607' and 607" wherein (a) shows the exposed width Hi is uniform over the entire substrate (Hi=Hn), while (b) shows the width Hi gradually increasing (Hi<Hn) and (c) shows the width Hi gradually decreasing (Hi>Hn).

Then, a master stamper for the second holographic layer is made in the process of FIG. 12.

Figure 25:
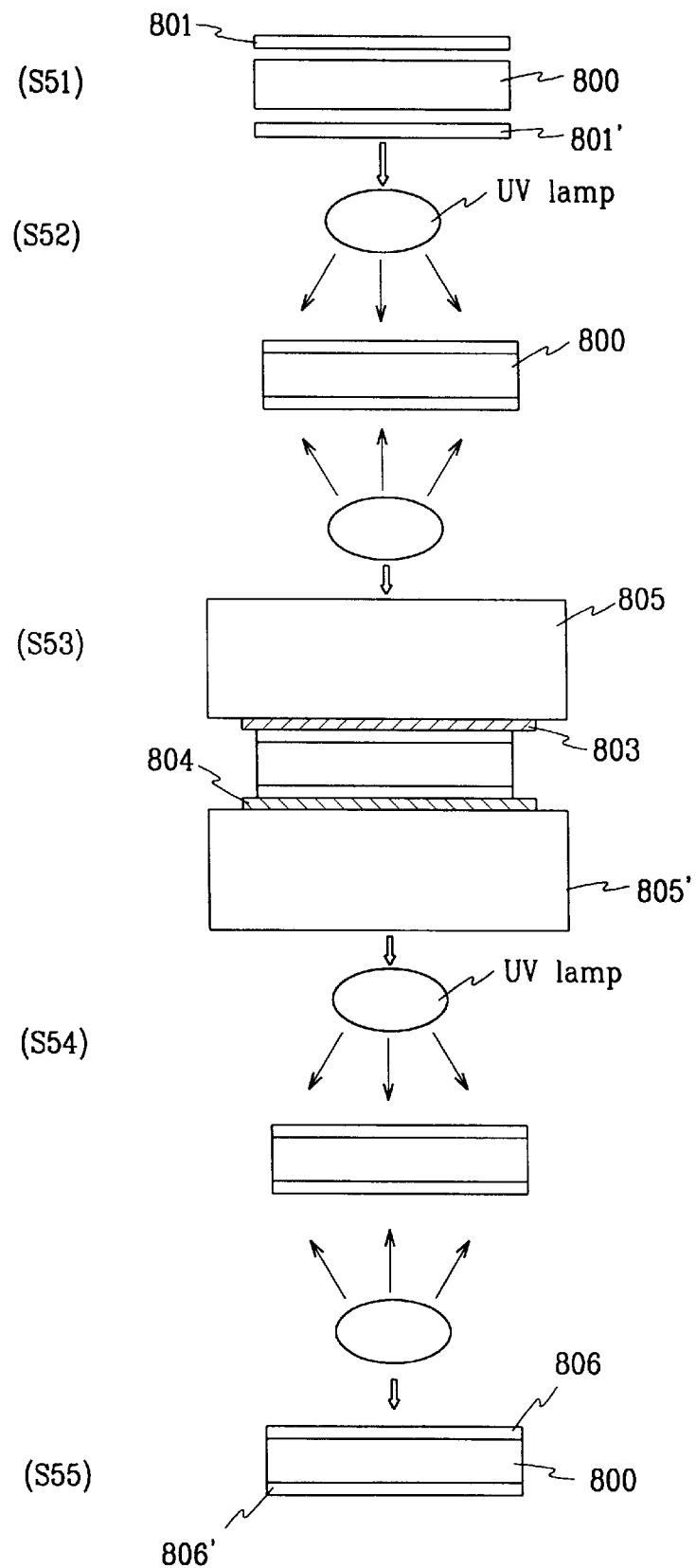
FIG. 25 illustrates a process for manufacturing a holographic light-guide using two stampers.
Figure 26:
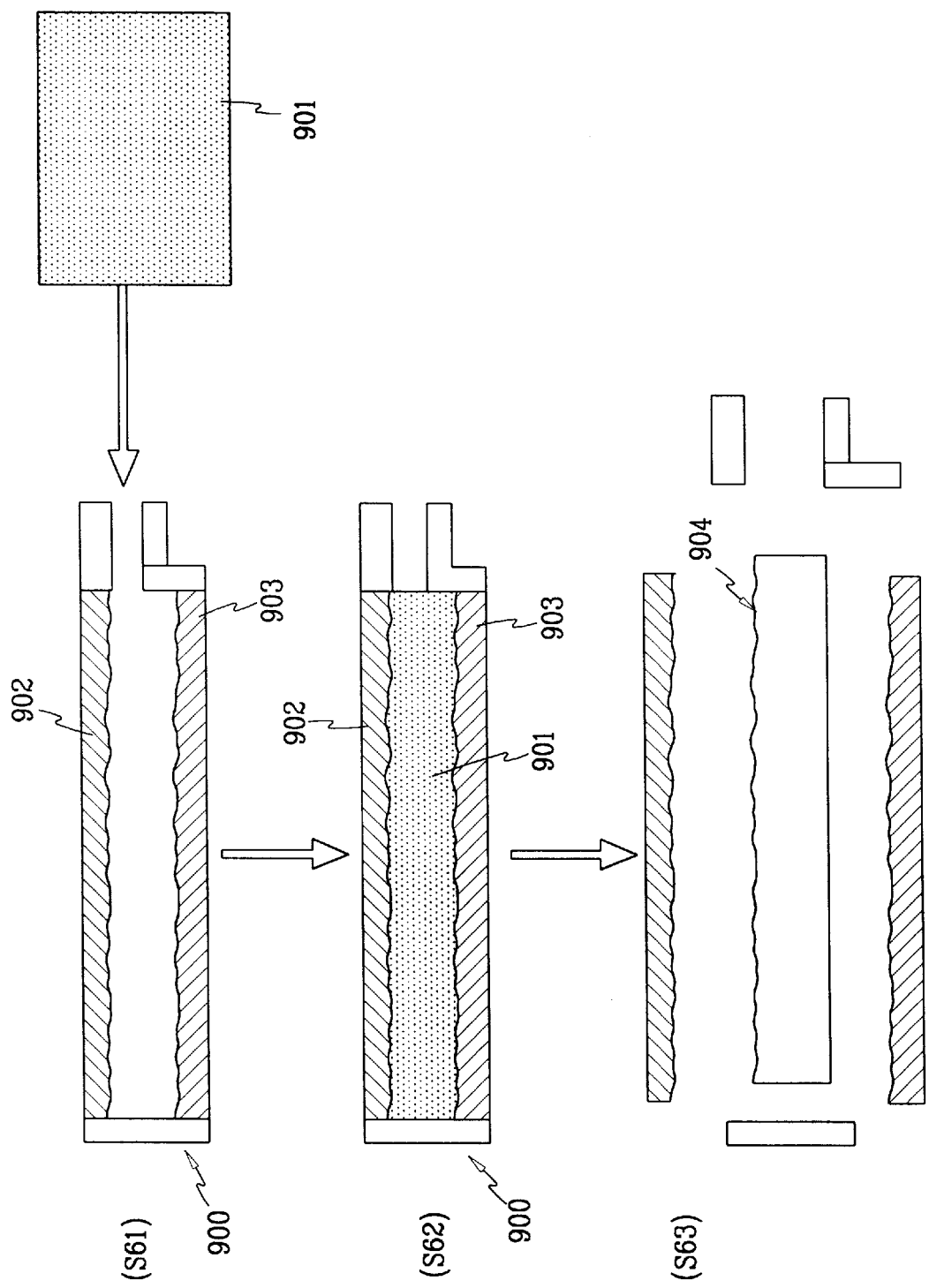
FIG. 26 illustrates another process for manufacturing a holographic light-guide using two stampers.

Referring now to FIGS. 25–26, two manufacturing processes for the holographic light-guide will be described using two master stampers for the first and second holographic layer.

First, FIG. 25 shows a manufacturing process for an ultraviolet (UV) curing method. A transparent substrate 800 for a holographic light-guide is prepared and coated with a UV-curing material 801, 801' on the top and bottom surfaces of the substrate 800 (S51). Then, the substrate 800 is illuminated by UV light, but not to the extent that the UV-curing material 801, 801' is completely cured (S52). Next, the stampers 804, 803 for the first and second holographic layers, which are attached to presses 805' 805, respectively, are pressed to the UV-curing material 801, 801', respectively. The stampers 804, 803 are separated (S53) in a predetermined time. Then the UV light is again illuminated on the UV-curing material 801, 801' until it is completely cured (S53). Finally, a holographic light-guide is provided having the first and second holographic layers formed on the bottom and top surfaces, respectively.

FIG. 26 shows another manufacturing process for the holographic light-guide which is an injection molding method. The stampers 903, 902 for the first and second holographic layers are mounted on the bottom and top faces of a mold 900 (S61). The transparent resin 901 is heated, provided to the mold 900, and cooled. (S62) Then, a holographic light-guide 904 is provided by separating from the mold (S63).

Third Preferred Embodiment

Now referring to FIG. 27, the third preferred embodiment of the plane light source unit for relatively small size LCDs according to the present invention will be explained.

A tubular light source 31 is placed near a holographic light-guide 32. The holographic light-guide 32 is constituted by a light incident surface on the left, a light emitting surface facing an LCD (not shown) on the top, and reflecting surfaces on the bottom and the right. A reflecting plate 33 is placed to reflect back light emitted from the holographic light-guide 32. A prism plate 36 and a diffuser 37 are laminated in order between the light emitting surface of the holographic light-guide 32 and the LCD. The prism plate 36 has an array of mircroprisms of which edges are parallel to a z-axis.

Figure 52A:
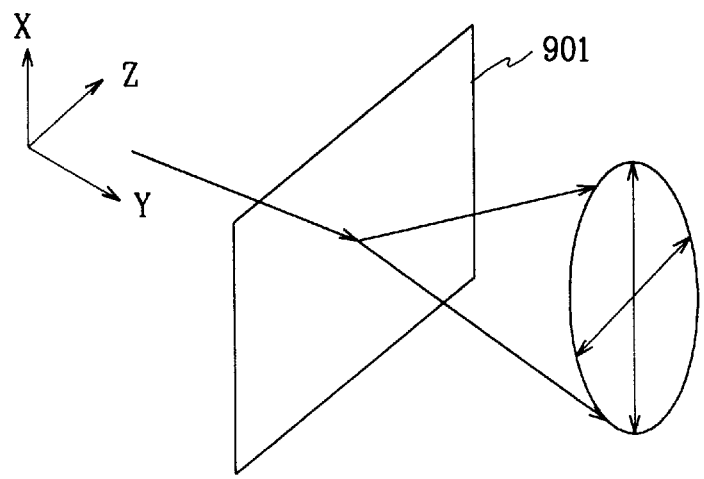
FIGS. 52A–52D illustrate various diffusing characteristics.
Figure 52B:
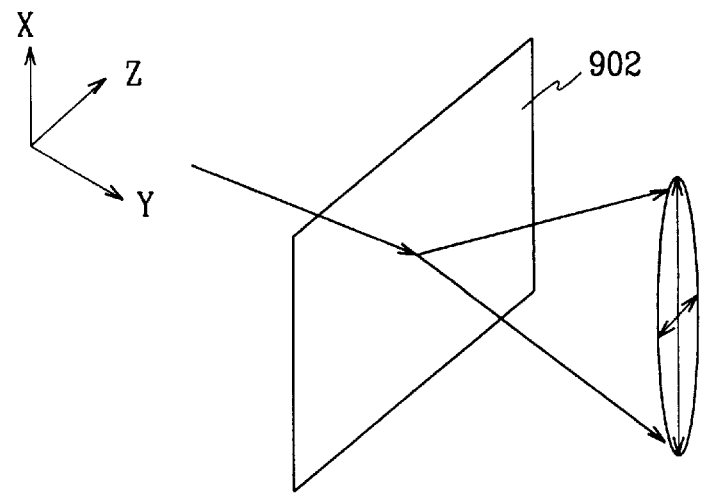

The holographic light-guide 32 has a first holographic layer 34 formed at the reflecting surface on the bottom and a second holographic layer 35 formed at the light emitting surface on the top. The first holographic layer 34 functions to promote uniform illumination, while the second holographic layer 35 functions to adjust the beam shaping. The second holographic layer 35 redirects the light with an asymmetric scattering pattern as shown in FIG. 52B. The light going through the second holographic layer 35 has an angle of scattering which is substantially greater in the direction of the z-axis as compared to the direction of the x-axis.

The first holographic layer 34 can be formed using a mask among the masks of FIGS. 8A–8D, 9A–9B, and it will have a hologram pattern of the pattern of the mask used.

The master hologram as well as the master stamper (first stamper) for the first holographic layer 24 is made through the processes as described with reference to FIG. 12 or 19.

On the other hand, the second holographic layer 35 can be formed as follows: First, a master hologram is made through processes shown in FIGS. 28A–28B, and a master stamper (second stamper) is prepared. Finally, a holographic light-guide is made using the first and second master stampers.

Figure 28A:
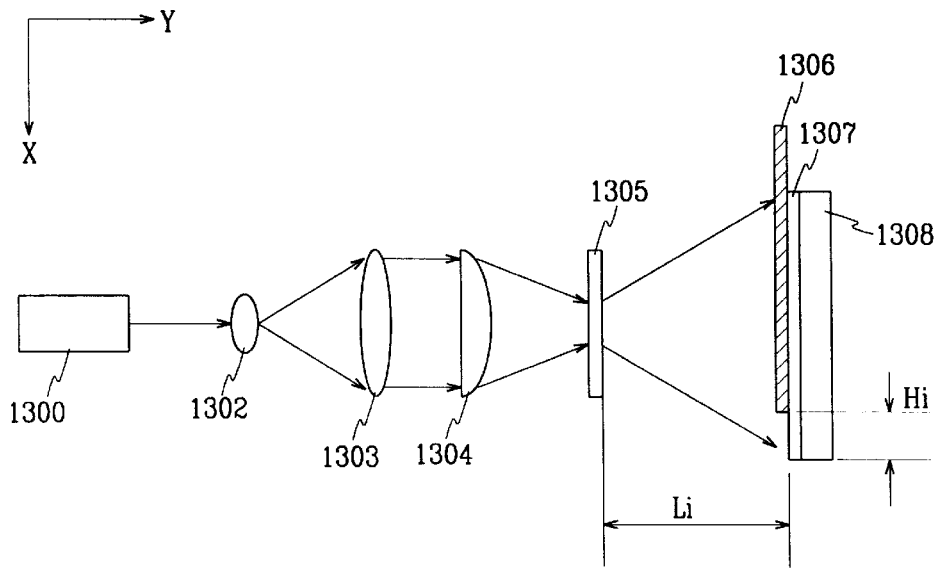
FIGS. 28A–28B illustrate a process for manufacturing a master hologram for a second holographic layer for adjusting the scattering angle of the light.
Figure 28B:
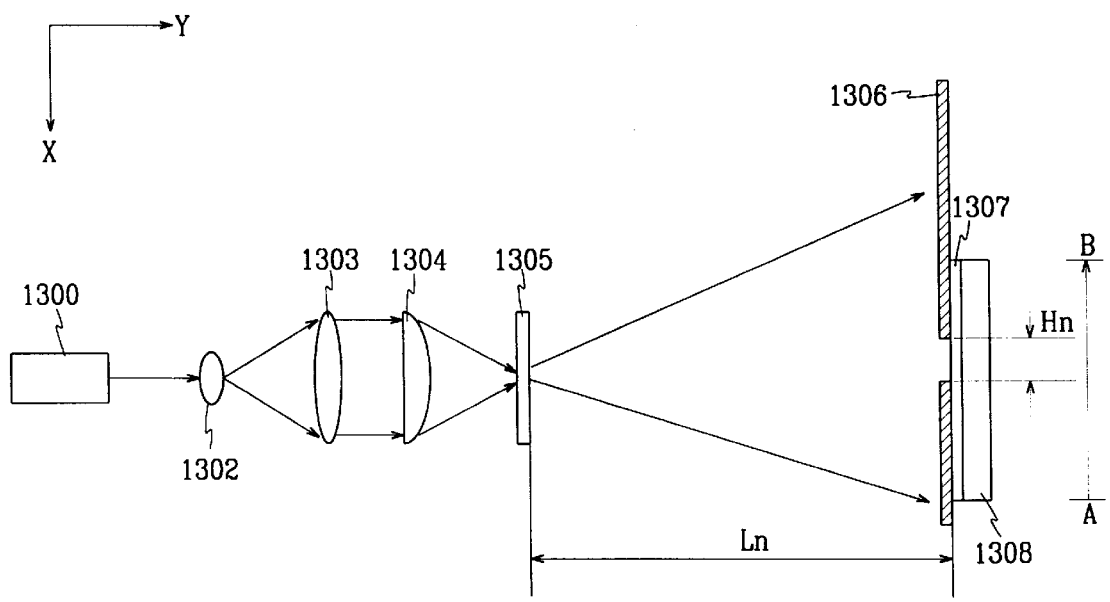

Referring to FIGS. 28A–28B, the laser beam from the laser 1300 enters lenses 1302, 1303, resulting in an enlarged beam. The enlarged beam enters a cylindrical lens 1304 which has a curvature in an x-y plane. The cylindrical lens 1304 focuses the beam into the diffuser 1305 such as a ground glass diffuser. The beam diffused by the diffuser 1305 then enters a glass substrate 1308 which is at a distance Li from the diffuser 1305. The glass substrate 1308, which is coated with photoresist layer 1307, is all shielded by a shielding plate 604, except for a desired width Hi at one edge. When the substrate is exposed to the laser beam, only the portions having the width Hi of the substrate 1308 are exposed. Then, the distance between the diffuser 1305 and the substrate 1308 is increased a predetermined distance, and the shielding plate is shifted in a manner such that the previously exposed portion Hi is shielded and the next adjacent portion is exposed. The substrate is exposed, and the above process is repeated as the distance increases until the entire surface of the substrate 1308 is exposed (toward edge B in FIG. 28B).

Figure 29:
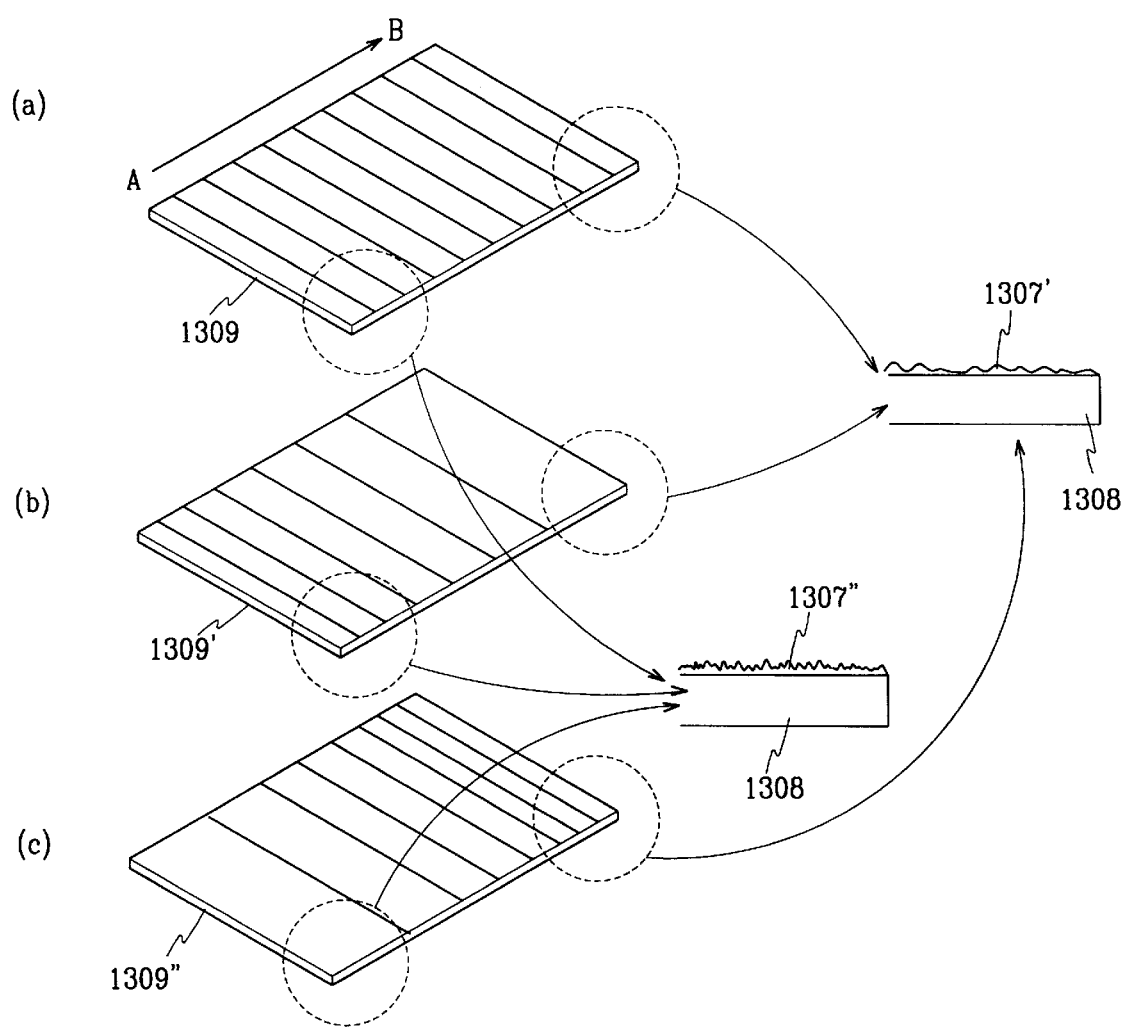
FIG. 29 shows a master hologram according to the process of FIG. 28A–28B.

The substrate 1308, which is exposed by the above process, is developed to a master hologram 1309, 1309' or 1309" having holograms 1307', 1307", as shown in FIG. 29. The density of speckles in the hologram is relatively high at the portion near the edge A (hologram 1307'), and discretely decreases to the portion near the edge B (hologram 1307"). FIG. 29 shows master holograms 1309, 1309' and 1309" wherein (a) shows the exposed width Hi is uniform over the entire substrate (Hi=Hn), while (b) shows the width Hi gradually increasing (Hi<Hn) and (c) shows the width Hi gradually decreasing (Hi>Hn).

Then, a master stamper for the second holographic layer 35 is made in the process of FIG. 12. The holographic light-guide is manufactured by a UV-curing method shown in FIG. 25 or an injection molding method shown in FIG. 26.

Fourth Embodiment

Now referring to FIG. 30, the fourth embodiment of the plane light source unit for relatively small size LCDs according to the present invention will be explained.

A tubular light source 41 is placed near a holographic light-guide 42. The holographic light-guide 42 is constituted by a light incident surface on the left, a light emitting surface facing an LCD (not shown) on the top, and reflecting surfaces on the bottom and the right. A reflecting plate 43 is disposed for reflecting back light emitted from the holographic light-guide 42.

Reference numeral 46 denotes a holographic diffuser having the scattering characteristics such that the angle of scattering is substantially greater to the direction of the z-axis as compared to the direction of the x-axis. A diffuser 47 is disposed between the holographic diffuser 46 and the LCD.

The holographic light-guide 42 has a first holographic layer 44 formed at the reflecting surface on the bottom and a second holographic layer 45 formed at the light emitting surface on the top. The first holographic layer 34 functions to promote uniform illumination, while the second holographic layer 35 functions to adjust the beam shaping. The holographic light-guide 42 in the fourth preferred embodiment is the same as the holographic light-guide 32 in the third preferred embodiment.

Figure 31A:
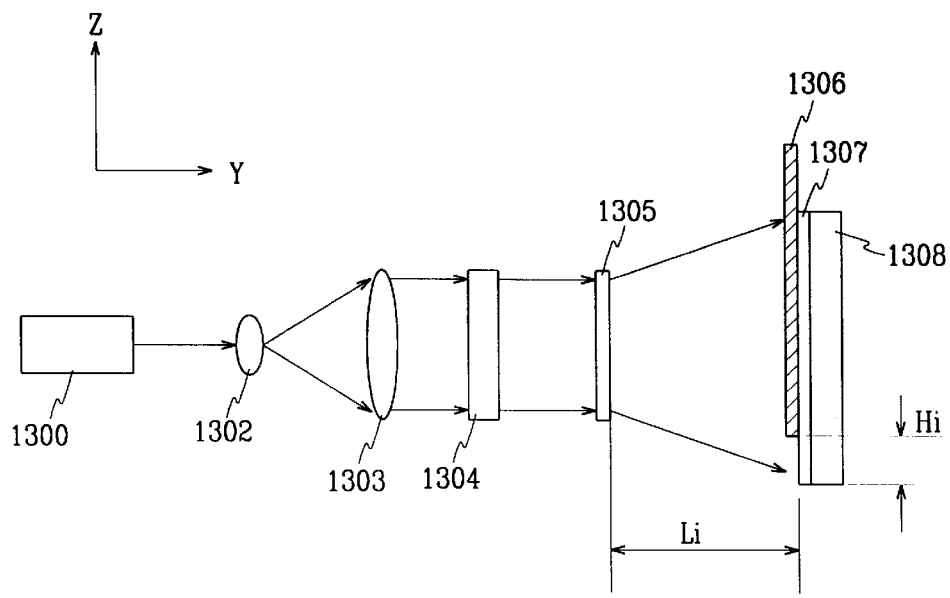
FIGS. 31A–31B and 32 illustrate a process for manufacturing a beam-shaping holographic plate of the fourth preferred embodiment.
Figure 31B:
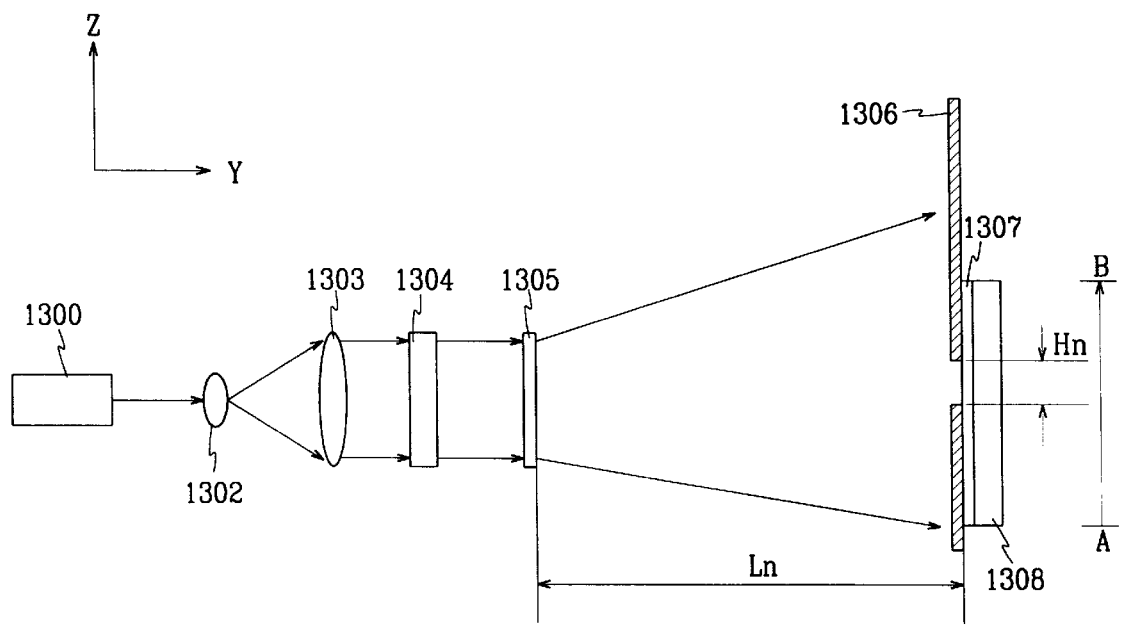

On the other hand, the holographic diffuser 46 will be described with reference to FIGS. 31A–31B and 32. As shown in FIGS. 31A–31B, the optical system for exposure is identical with that of FIGS. 28A–28B, except that a cylindrical lens 1304 has a curvature in a y-z plane. That is, the system for exposure is arranged by rotating the cylindrical lens 1304 around the y-axis by an amount of 90 degrees.

Referring to FIGS. 31A–31B, the laser beam from the laser 1300 enters lenses 1302, 1303, resulting in an enlarged beam. The enlarged beam enters a cylindrical lens. 1304 which has a curvature in the y-z plane. The cylindrical lens 1304 focuses the beam into the diffuser 1305 such as a ground glass diffuser. The beam diffused by the diffuser 1305 then enters a glass substrate 1308 which is at a distance Li from the diffuser 1305. The glass substrate 1308, which is coated with photoresist layer 1307, is all shielded by a shielding plate 1306, except for a desired width Hi at one edge. When the substrate is exposed to the laser beam only the portions having the width Hi of the substrate 1308 are exposed. Then, the distance between the diffuser 1305 and the substrate 1308 is increased a predetermined distance to Ln, and the shielding plate is shifted in a manner such that the previously exposed portion Hi is shielded and the next adjacent portion Hn is exposed. The substrate is exposed, and the above process is repeated as the distance increases until the entire surface of the substrate 1308 is exposed (toward edge B in FIG. 31B).

The substrate 1308, which is exposed by the above process, is developed to a master hologram for the holographic diffuser 46. Then, a master stamper for the holographic diffuser 46 is made in the process of FIG. 12.

Figure 32:
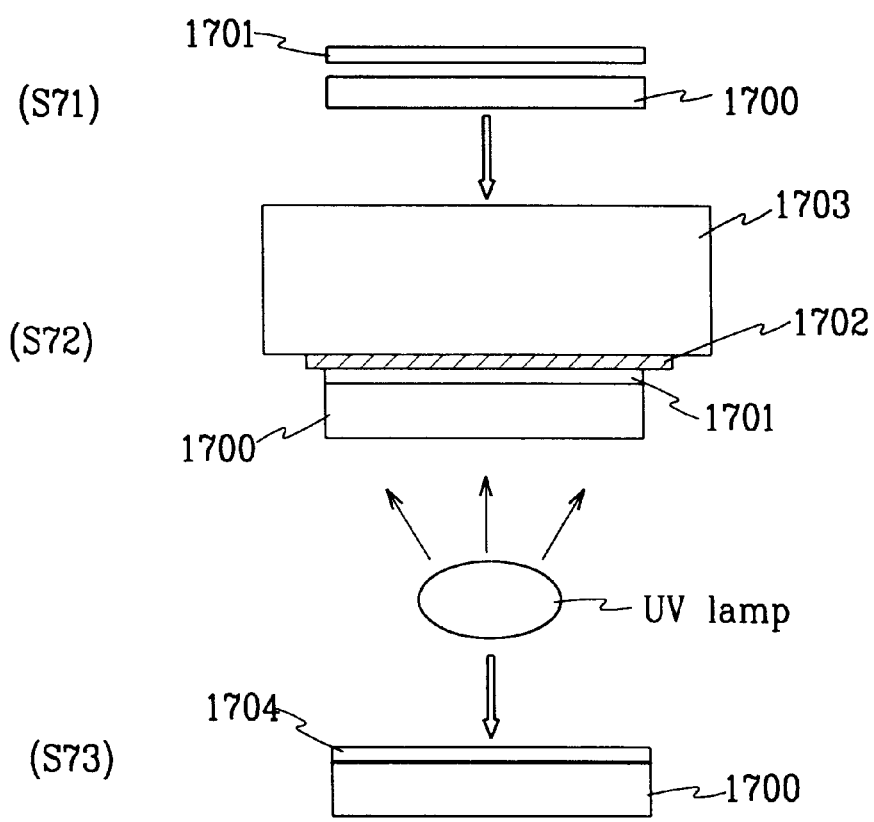

The holographic diffuser 46 is manufactured by a UV-curing method shown in FIG. 32. A transparent optical resin 1700 having a relatively thin thickness for a holographic diffuser is prepared and coated with UV-curing material 1701 (S71). The stamper 1702, which is formed in FIGS. 31A–31B, is attached to a press 1703 and is then pressed to the UV-curing material 1701. During the pressing process, the UV light is illuminated to the UV-curing material 1701 until it is completely cured (S72). Finally, a holographic diffuser 46 is completed by separating the stamper 1702 from the optical resin 1700 (S73).

Accordingly, the holographic diffuser 46 has scattering characteristics whereby the angle of scattering is substantially greater in the direction of the z-axis as compared to the direction of the x-axis. It is the same as what is shown in FIG. 52B when the coordinates rotate 90 degrees around the y-axis.

Fifth Preferred Embodiment

Now referring to FIG. 33, the fifth preferred embodiment of the plane light source unit for relatively small size LCDs according to the present invention will be described.

A tubular light source 51 is placed near a holographic light-guide 52. The holographic light-guide 52 is constituted by a light incident surface on the left, a light emitting surface facing an LCD (not shown) on the top, and reflecting surfaces on the bottom and the right. A reflecting plate 53 is disposed for reflecting back light emitted from the holographic light-guide 52. A diffuser 56 is disposed between the holographic light-guide 52 and the LCD.

Figure 52C:
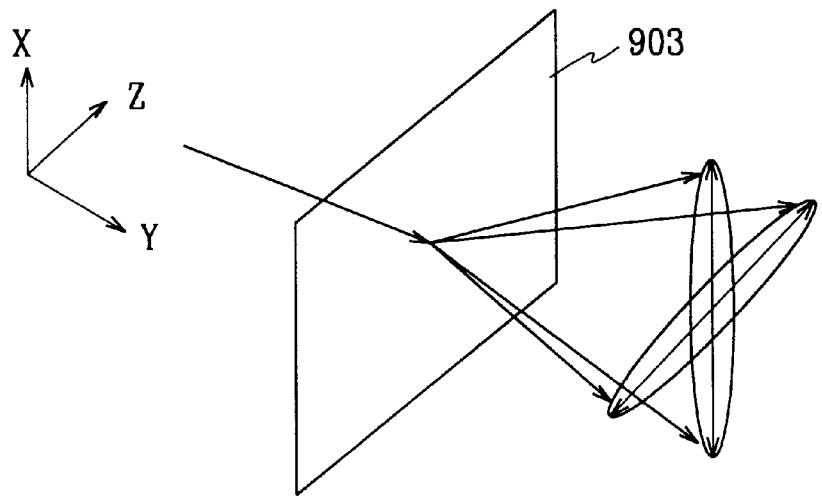

The holographic light-guide 52 has a first holographic layer 54 formed at the reflecting surface on the bottom and a second holographic layer 55 formed at the light emitting surface on the top. The first holographic layers 54 functions to promote uniform illumination, while the second holographic layer 55 functions to adjust the beam shaping. The second holographic layer 55 redirects the light with combined asymmetric scattering patterns as shown in FIG. 52C. That is, the second holographic layer 55 scatters the light in such a way that it concentrates it substantially along the z-axis and the x-axis.

The first holographic layer 54 can be formed using a mask among the masks of FIGS. 8A–8D, 9A–9B, and it will have a hologram pattern of the pattern of the mask used.

The master hologram as well as the master stamper (first stamper) for the first holographic layer 54 is made through the processes as described with reference to FIG. 12 or 19.

On the other hand, the second holographic layer 55 can be formed as follows: First, a master hologram is made through double exposure processes which are shown in FIGS. 28A–28B and FIGS. 31A–31B, and a master stamper (second stamper) is prepared. Finally, a holographic light-guide is made using the first and second master stampers.

Referring to FIGS. 28A–28B, the laser beam from the laser 1300 enters lenses 1302, 1303, resulting in an enlarged beam. The enlarged beam enters a cylindrical lens 1304 having a curvature in an x-y plane, the diffuser 1305, and finally the glass substrate 1308 in order to expose. Then, the above exposure process is repeated after the cylindrical lens 1304 is rotated by 90 degrees around the y-axis. The double exposed substrate 1308 is hence developed to a master hologram.

A master stamper for the second holographic layer 55 is then made in the process of FIG. 12, and the holographic light-guide is manufactured by a UV-curing method shown in FIG. 25 or an injection molding method shown in FIG. 26.

Accordingly, the second holographic layer of the holographic light-guide 42 has combined scattering characteristics such that it concentrates the light substantially along the z-axis and the x-axis, as shown in FIG. 52C.

Sixth Preferred Embodiment

Now referring to FIG. 34, the sixth preferred embodiment of the plane light source unit for relatively small size LCDs according to the present invention will be explained.

A tubular light source 61 is placed near a holographic light-guide 62. The holographic light-guide 62 is constituted by a light incident surface on the left, a light emitting surface facing an LCD (not shown) on the top, and reflecting surfaces on the bottom and the right. A reflecting plate 63 is disposed for reflecting back light emitted from the holographic light-guide 62.

Reference numeral 66 denotes a holographic diffuser having scattering characteristics such that the direction of scattering is substantially changed in a desired direction.

The holographic light-guide 62 has a first holographic layer 64 formed at the reflecting surface on the bottom and a second holographic layer 65 formed the light emitting surface on the top. The first holographic layers 64 functions to promote uniform illumination, while the second holographic layer 65 functions to adjust the beam shaping. The holographic light-guide 62 in this embodiment is the same as the holographic light-guide 32 in the third preferred embodiment.

Figure 35:
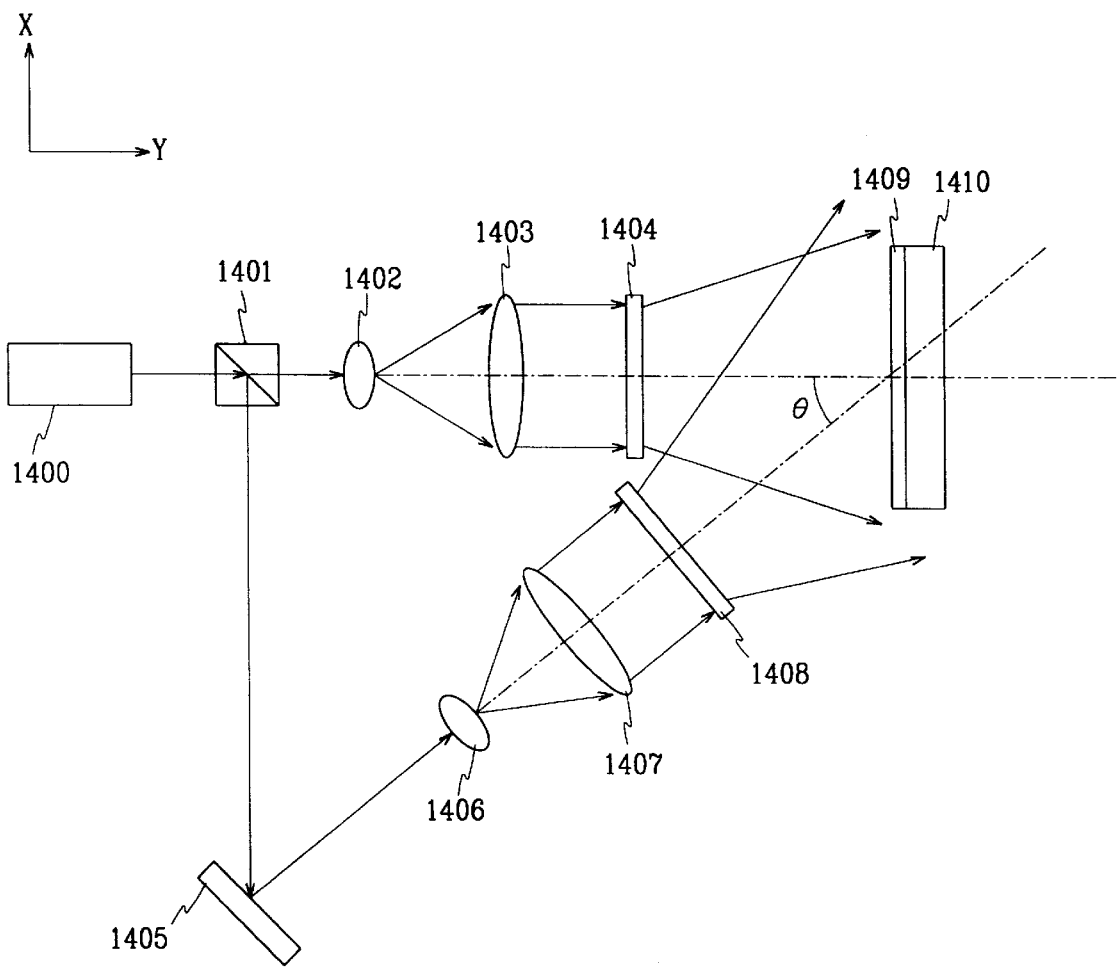
FIG. 35 illustrates a process for manufacturing a holographic plate for adjusting scattering angle according to the sixth preferred embodiment.

On the other hand, the holographic diffuser 66 will be described with reference to FIG. 35. The laser beam from laser 1400 enter a beam splitter 1401 and splits into two beams. One of the two split beams (first beam) enters lenses 1402, 1403, resulting in an enlarged beam, and then enters a first diffuser 1404 to diffuse. The other beam (second beam) is reflected by a mirror 1405 to enter lenses 1406, 1407 resulting in an enlarged beam. The enlarged beam then enters a second diffuser 1408 to diffuse. Then both beams enter a glass substrate 1410, which is coated with a photoresist layer 1409, maintaining an angle θ between the center axes of the first and second beams. After the substrate 1410 is exposed to the two beams for a desired time, it is developed to a master hologram for the holographic diffuser 66. Then, a master stamper for the holographic diffuser 66 is made in the process of FIG. 12, and the holographic diffuser 66 is next manufactured by an UV-curing method shown in FIG. 32.

Figure 52D:
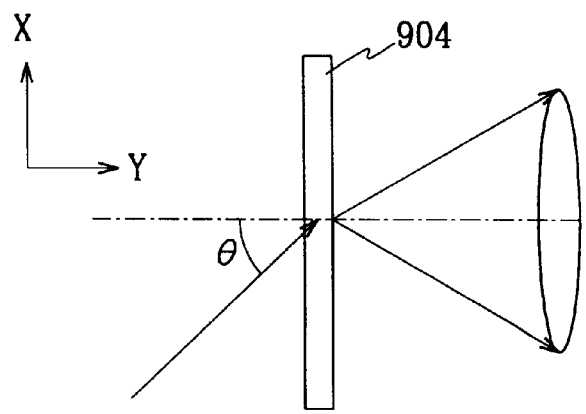

Accordingly, the holographic diffuser 66 has scattering characteristics such that light having an incident angle 0 is scattered to emerge in a normal direction straight out of the plane of the holographic diffuser 66 as shown in FIG. 52D. FIGS. 52A–52D illustrate various diffusing characteristics for a conventional diffuser, the second holographic layer 35 of the third preferred embodiment, the second holographic layer 55 of the fifth preferred embodiment, and the holographic diffuser 66 of the sixth preferred embodiment, respectively.

Seventh Preferred Embodiment

The preferred embodiments described above are preferably adapted for relatively small size LCDs. Now, embodiments for relatively large size LCDs will be described.

Figure 36:
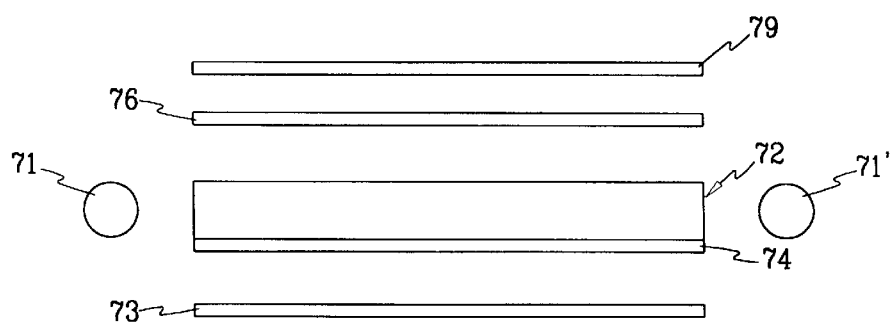
FIG. 36 shows a seventh preferred embodiment of a plane light source unit according to the resent invention.

Referring to FIG. 36, two tubular light sources 71, 71' are positioned a adjacent to oppositely disposed light incident surfaces of a holographic light-guide 72. The holographic light-guide 72 is constituted by two light incident surfaces on the right and left in the drawing, a light emitting surface facing an LCD (not shown) on the top, and reflecting surfaces on the bottom. The holographic light-guide 72 has a holographic layer 74 formed at the reflecting surface on the bottom. The holographic layer 74 functions to promote uniform illumination.

Reference numeral 73 denotes a reflecting plate for reflecting back light emitted from the holographic light-guide 72. A first diffuser 76 and second diffuser 79 are laminated in order between the light emitting surface of the holographic light-guide 72 and the LCD.

Referring to FIGS. 37A–37D and FIGS. 38A–38B, several kinds of masks are illustrated for manufacturing the holographic layer 74 of the holographic light-guide 72. The holographic layer 74 can be manufactured using a mask among the masks of FIGS. 37A–37D, 38A–38B, and then the holographic layer 74 will have a hologram pattern of the pattern of the mask used. These mask patterns are generally produced with a transparent film by CAD with computers. The portions outside the patterns of the mask are opaque to block light, while the portions inside the patterns (for example inside circles) are transparent. Therefore, holograms are only produced inside the patterns.

Specifically, mask patterns of FIGS. 37A–37D are symmetrically formed with the two identical mask patterns of FIGS. 8A–8D attached around the center of line C, so that the area density of the pattern is low toward the tubular light sources and increases with an increase in distance from the tubular light sources.

Figure 37A:
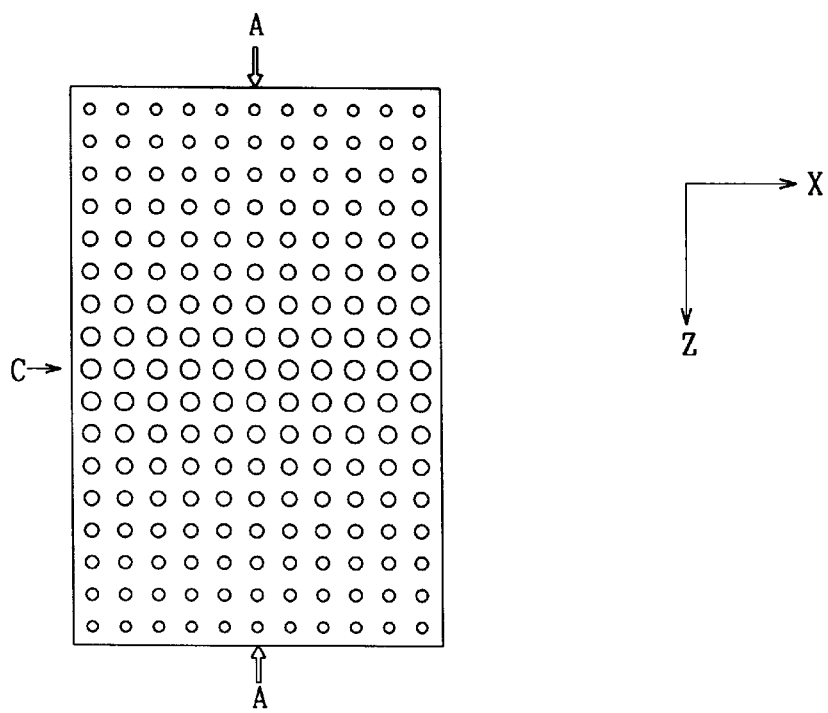
FIGS. 37A–37D illustrate four kinds of mask patterns having circles or polygons.
Figure 37B:
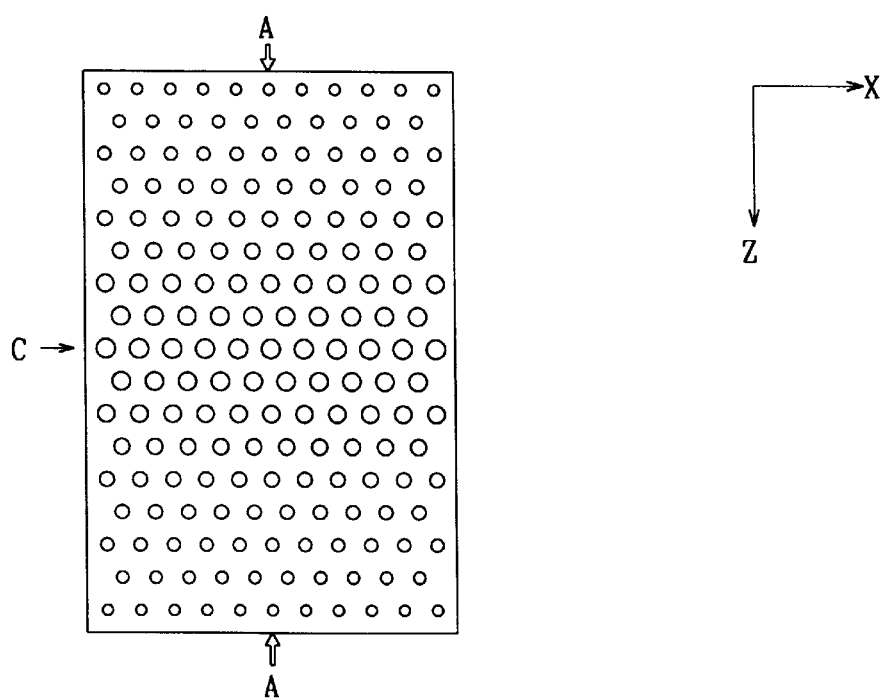
Figure 37C:
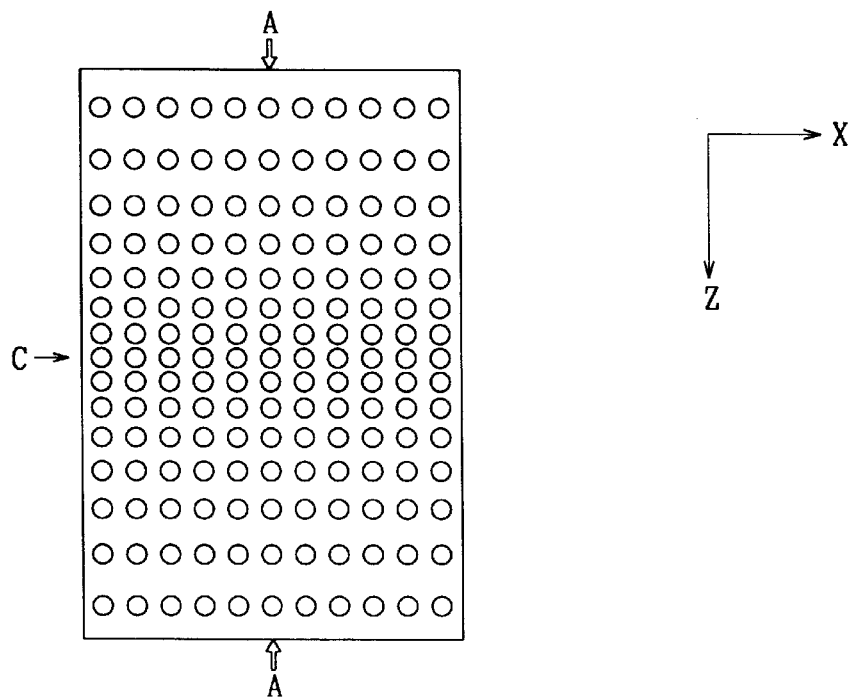
Figure 37D:
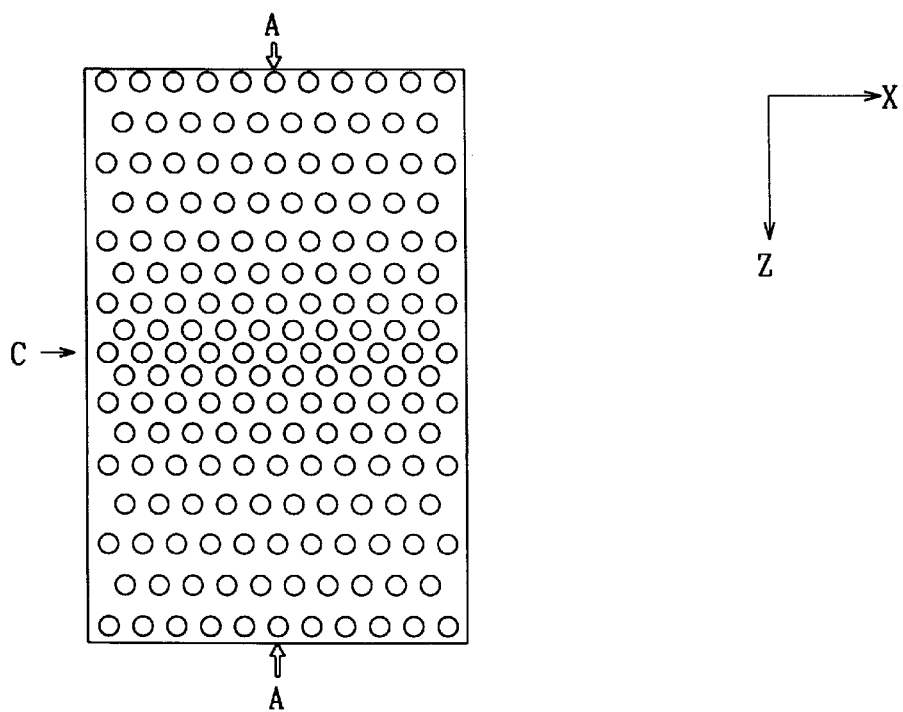

In FIG. 37A, the diameters of circles (or polygons) are small near the two tubular sources (arrow A) and are increased with an increase in distance from the tubular light sources, maintaining the uniform distance (Gx, Gz) between centers of the adjacent circles. The arrangement of FIG. 37B is the same as that of FIG. 8A, except that the centers of the circles are on the same line toward the x-axis in every other line. That is, the centers of the adjacent lines are shifted in the amount of half of the distance between the adjacent centers (Gh=Gz/2). In FIG. 37C, the diameter of circles are uniform, but the circles are sparsely formed at portions near the two tubular light sources (arrow A), whereas the circles are densely formed at portions remote from the tubular light sources. That is, distances between the centers along the x-axis are decreased with an increase in distance from the tubular light sources (Gx1>Gx2). The distances between the centers along the z-axis also can be decreased or maintained at a uniform value. In the drawing, it is illustrated that the distances along the z-axis are maintained at a uniform value (Gz1=Gzn). The arrangement of FIG. 37D is the same as that of FIG. 37C, except that the centers of the circles are on the same line toward the x-axis in every other line (Gh'= Gz/2).

Figure 38A:
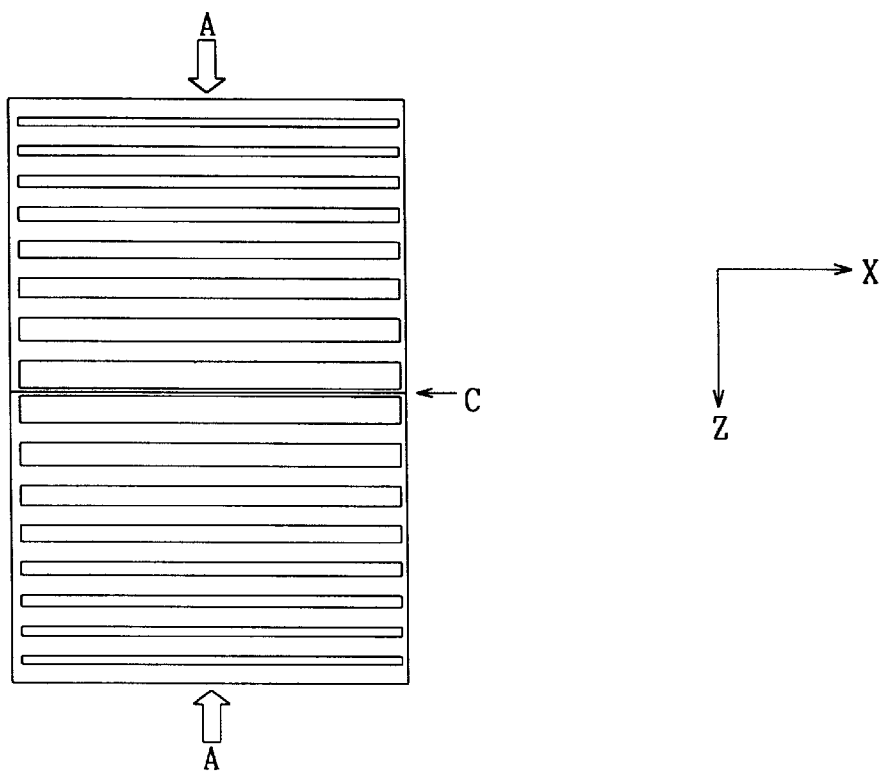
FIGS. 38A–38B illustrate two kinds of mask patterns having bands.
Figure 38B:
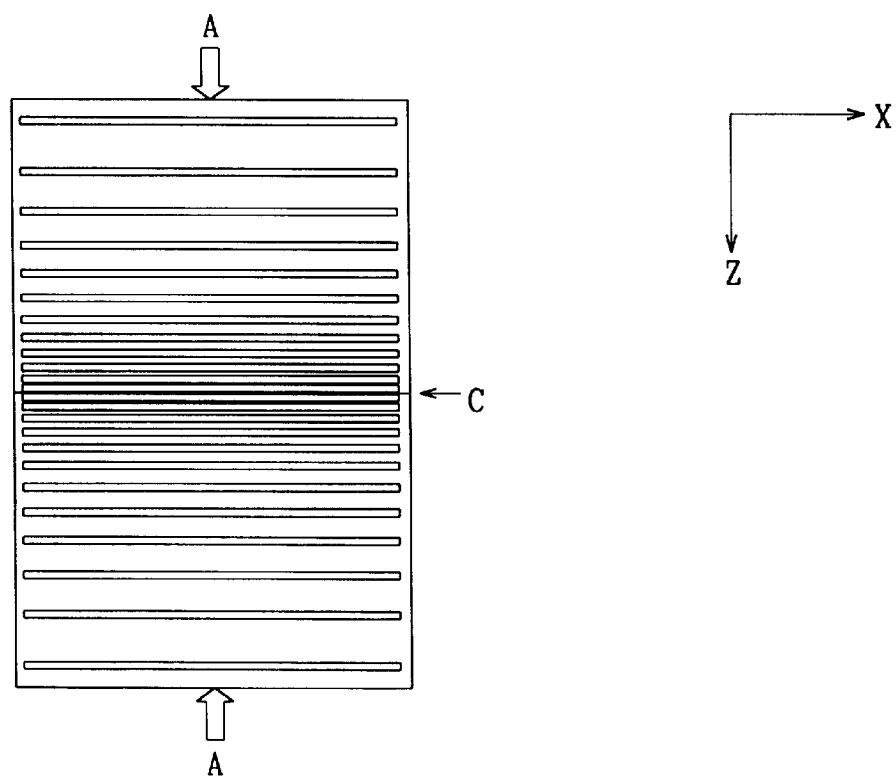

In the case of band patterns, the mask patterns of FIGS. 38A–38B are symmetrically formed with the two identical mask patterns of FIGS. 9A–9B attached around the center line C, so that the area density of the pattern is low toward the tubular light sources and increases with an increase in distance from the tubular light sources. Therefore, the scattering of light can be decreased near both light sources and increased with an increase of the distance from the light sources, resulting in the light intensity distribution becoming uniform.

The holographic layer 74 can be formed using a mask among the masks FIGS. 37A–37D, 38A–38B, and it will then have a hologram pattern of the pattern of the mask used. The master hologram as well as the master stamper for the holographic layer 74 is made through the processes as described in the first preferred embodiment with reference to FIGS. 10–12 or 17–19. Then, the holographic light-guide 72 is formed using the master stamper by the UV-curing process of FIGS. 14–15 or the injection molding process of FIG. 16.

Eighth Preferred Embodiment

Now referring to FIG. 39, the eighth preferred embodiment of the plane light source unit for relatively large size LCDs according to the present invention will be explained.

Figure 39:
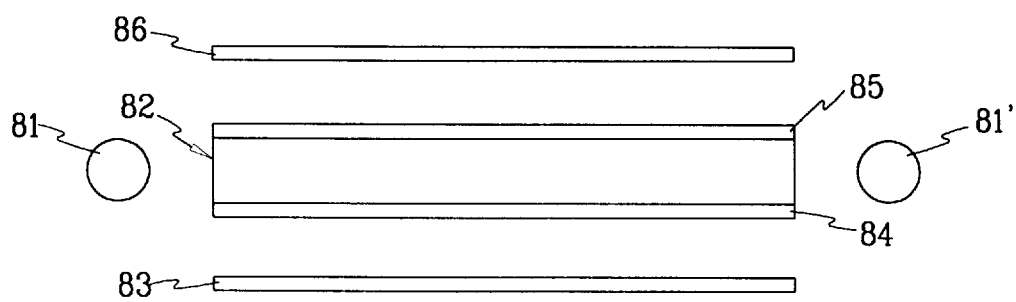
FIG. 39 shows a eighth preferred embodiment of a plane light source unit according to the present invention.

Referring to FIG. 39, two tubular light sources 81, 81' are positioned adjacent to oppositely disposed light incident surfaces of a holographic lightguide 82. The holographic light-guide 82 is constituted by two light incident surfaces on the right and left in the drawing, a light emitting surface facing an LCD (not shown) on the top, and reflecting surfaces on the bottom. The holographic light-guide 82 has a first holographic layer 84 formed at the reflecting surface on the bottom and a second holographic layer 85 formed at the light emitting surface on the top. The first and second holographic layers 84, 85 function to promote uniform illumination. A reflecting plate 83 is disposed to reflect back light emitted from the holographic light-guide 82. A diffuser 86 is laminated between the light emitting surface of the holographic light-guide 82 and the LCD.

The first holographic layer 84 can be formed using a mask among the masks FIGS. 37A–37D, 38A–38B, and it will then have a hologram pattern of the pattern of the mask used.

The master hologram as well as the master stamper (first stamper) for the first holographic layer 84 is made through the processes as described with reference to FIG. 12 or 19.

Figure 22:
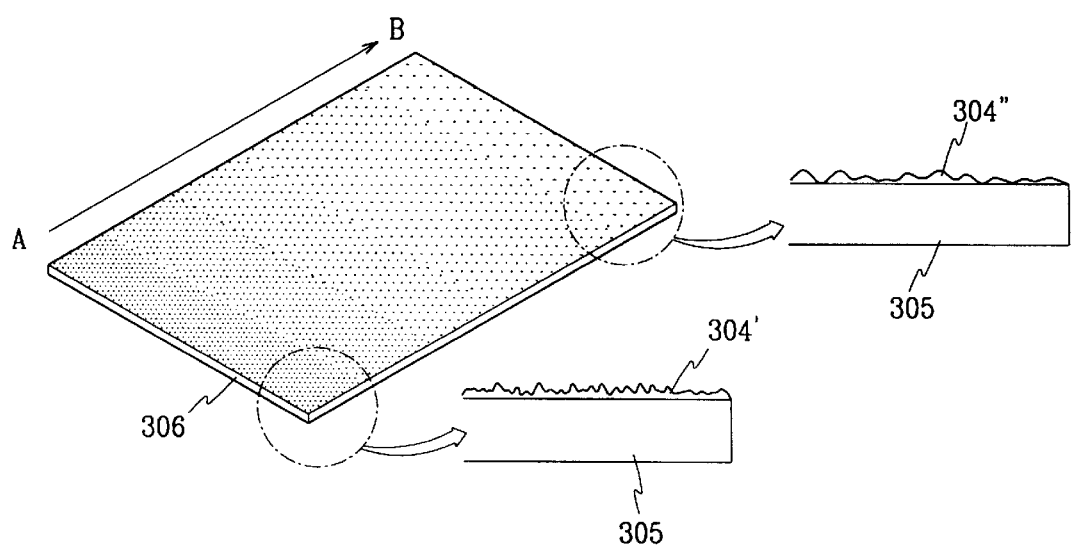
FIG. 22 shows a master hologram according to the process of FIG. 21.
Figure 40:
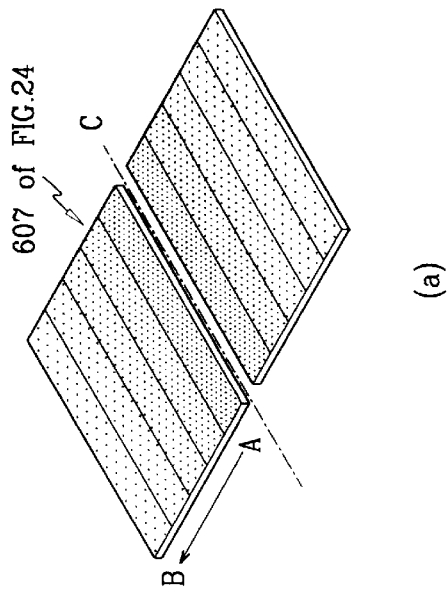
FIG. 40 shows a master hologram in which two holograms of FIG. 22 or 24 are attached around a center line C according to the process of FIG. 21.
Figure 40:
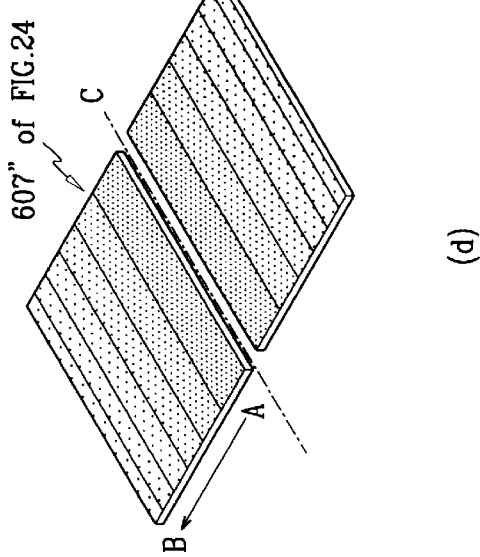
Figure 40:
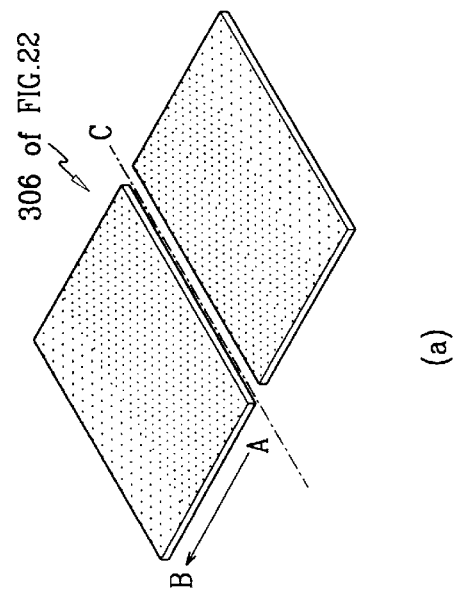
Figure 40:
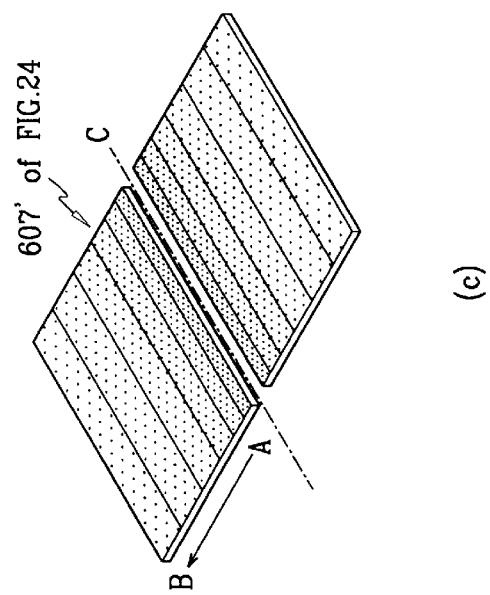

On the other hand, the second holographic layer 85 can be formed as follows: First, two identical master holograms are made through processes shown in FIGS. 21 and 23A–23B, and attached symmetrically around the center line C. FIG. 40 illustrates the attached master hologram in which two identical holograms of FIG. 22 or 24 are attached symmetrically. In (a) of FIG. 40, the density of speckles in the hologram is relatively high at the portion around the center C and gradually decreases to the portion near the both edges B. In (b)–(d) of FIG. 40, the density of speckles in the hologram is relatively high at the portion around the center C and discretely decreases to the portion near both edges B.

Finally, a holographic light-guide is then made by a UV-curing method shown in FIG. 25 or an injection molding method shown in FIG. 26, using the first so and second master stampers.

Ninth Preferred Embodiment

Now referring to FIGS. 41A–41B, the ninth preferred embodiment of the plane light source unit for relatively large size LCDs according to the present invention will be described.

Figure 41A:
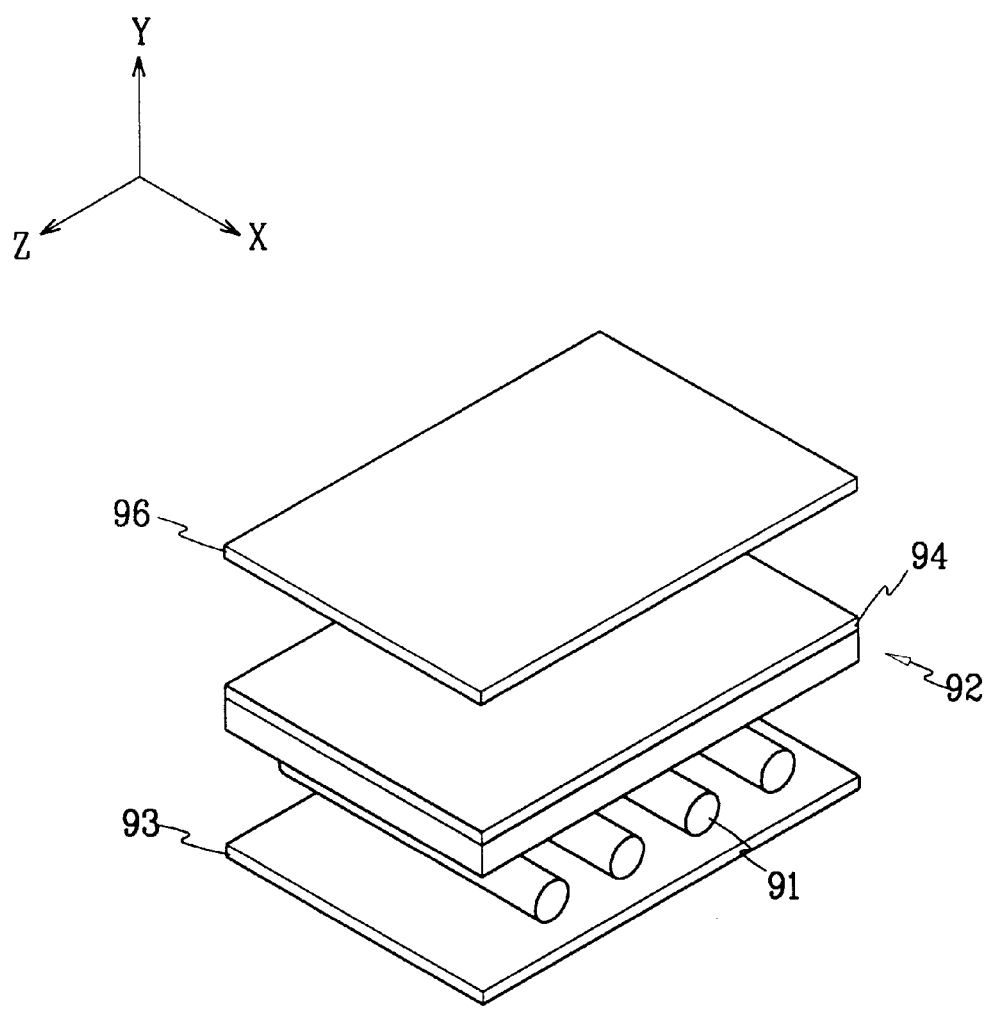
FIG. 41A shows a ninth preferred embodiment of the present invention.
Figure 41B:
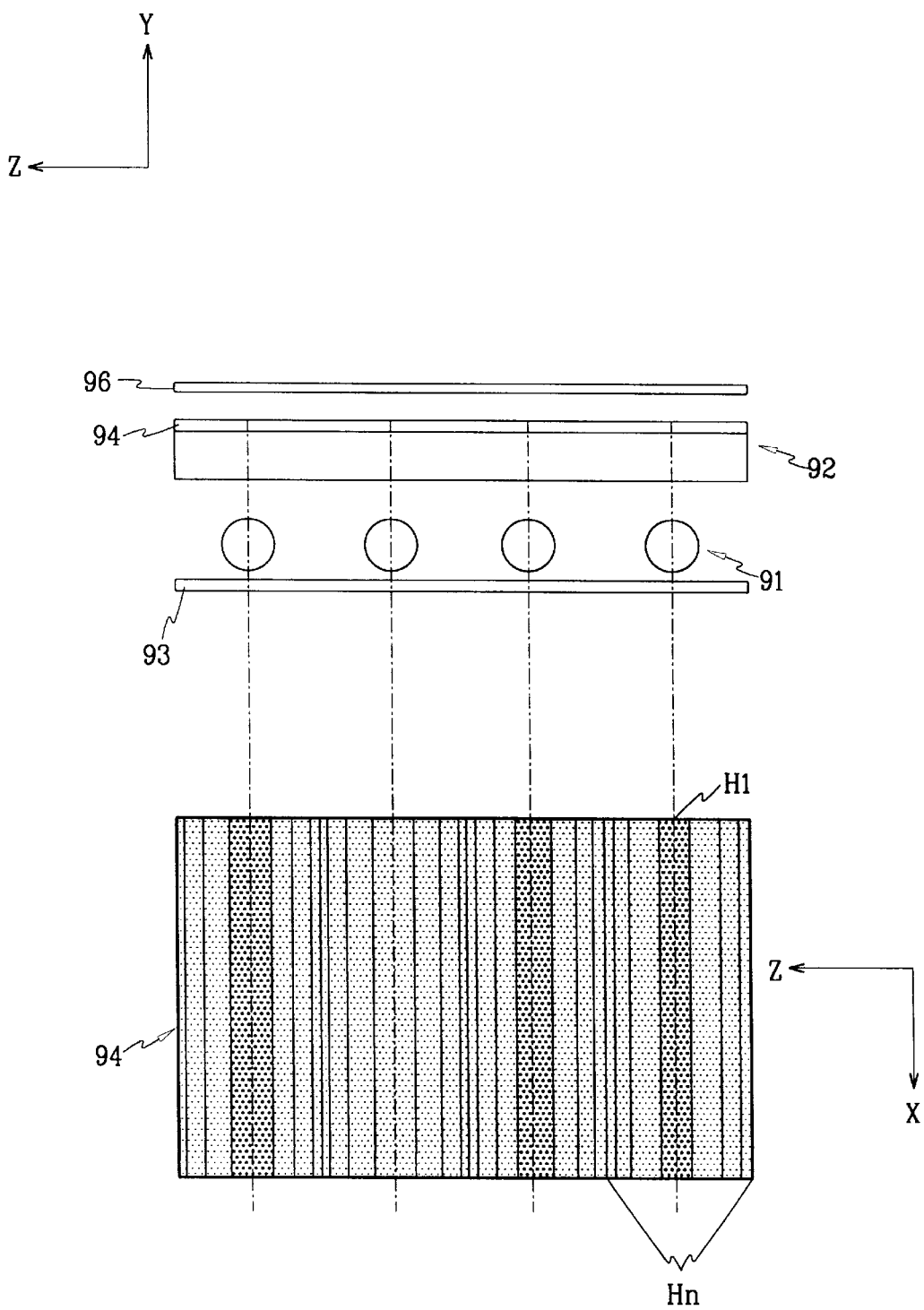
FIG. 41B shows a density of the scattering density for a holographic layer in relation to light sources according to the ninth preferred embodiment.

Referring to FIG. 41A, a plurality of tubular light sources 91 are positioned adjacent to a light incident surface of a holographic light-guide 92. The holographic light-guide 92 is constituted by the light incident surface on the bottom in the drawing, a light emitting surface facing an LCD (not shown) on the top, and reflecting surfaces on the other sides. The holographic light-guide 92 has a holographic layer 94 formed at the light emitting surface on the top. A reflecting plate 93 is disposed to reflect back light emitted from the plurality of tubular light sources 91 and the holographic light-guide 92. A diffuser 96 is laminated between the light emitting surface of the holographic lightguide 92 and the LCD.

The holographic layer 94 of the holographic light-guide 92 scatters light near the light source more in order to obtain uniform illumination. The density of speckles in the holographic layer 94 is relatively high at the portion around the light sources 91 and gradually decreases with an increase of distance from the light sources 91. As shown in FIG. 41B, the speckle pattern Hi of the holographic layer is densely formed near each of the light sources 91 while the speckle pattern is sparsely formed between the light sources 91. The density of speckles gradually decreases (H2 ... Hn) with an increase of distance from each of the light sources 91 to the middle portion between the adjaced light sources. The holographic layer scatters substantially more near the light source, resulting in filing in the gaps of light intensity between the light sources for uniform illumination.

Although the holographic layer is formed on the light emitting surface on the top in this embodiment, it is possible to form the holographic layer on the light incident surface on the bottom.

Now, referring to FIGS. 42A–42B and 43, the formation of the holographic layer 94 will be described.

Figure 42A:
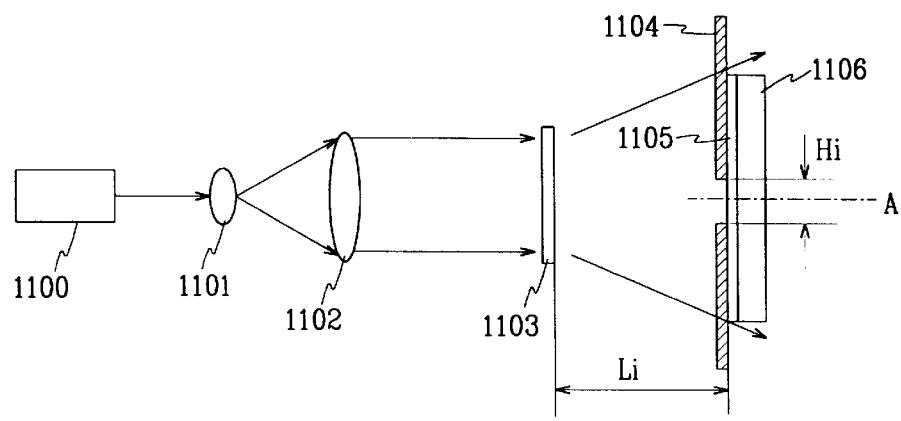
FIGS. 42A–42B illustrate a process for manufacturing a master hologram according to the ninth preferred embodiment.
Figure 42B:
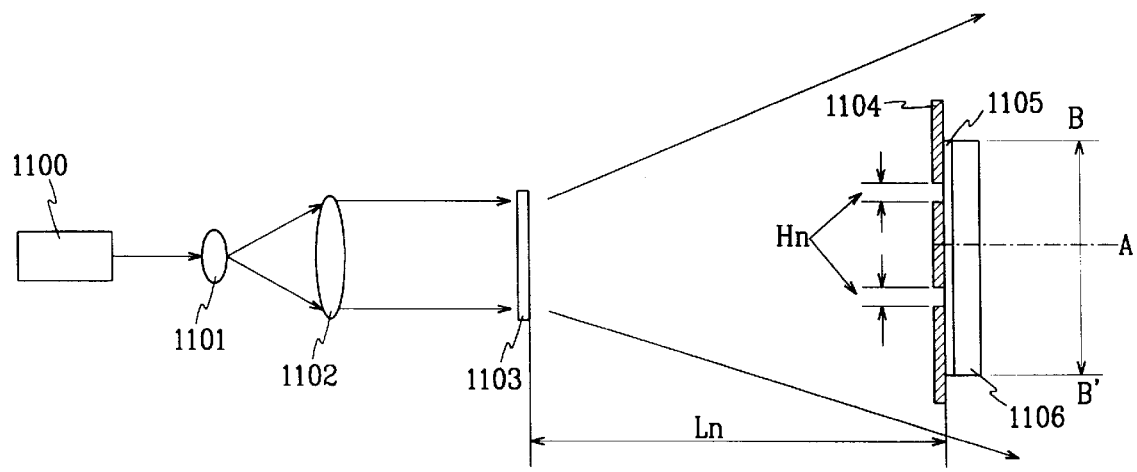

Referring to FIGS. 42A–42B, the laser beam from the laser 1100 enters lenses 1101, 1102, resulting in an enlarged beam. The enlarged beam enters a diffuser 1103 such as a ground glass diffuser. The beam diffused by the diffuser 1103 then enter a glass substrate 1106 which is at a distance Li from the diffuser 1103. The glass substrate 1106, which is coated with a photoresist layer 1105, is all shielded by a shielding plate 1104, except for a desired width Hi at the center. When the substrate is exposed to the laser beam, only the portions having the width Hi of the substrate 1106 are exposed. After exposure, the distance between the diffuser 1103 and the substrate 1106 is increased a predetermined distance, and the shielding plate is shifted in a manner such that the previously exposed portion Hi is shielded and the next two adjacent portions are exposed. Then, the substrate is exposed, and the above process is repeated as the distance increases until the entire surface of the substrate 1106 is exposed (toward both edges B, B' in FIG. 42B).

Figure 43:
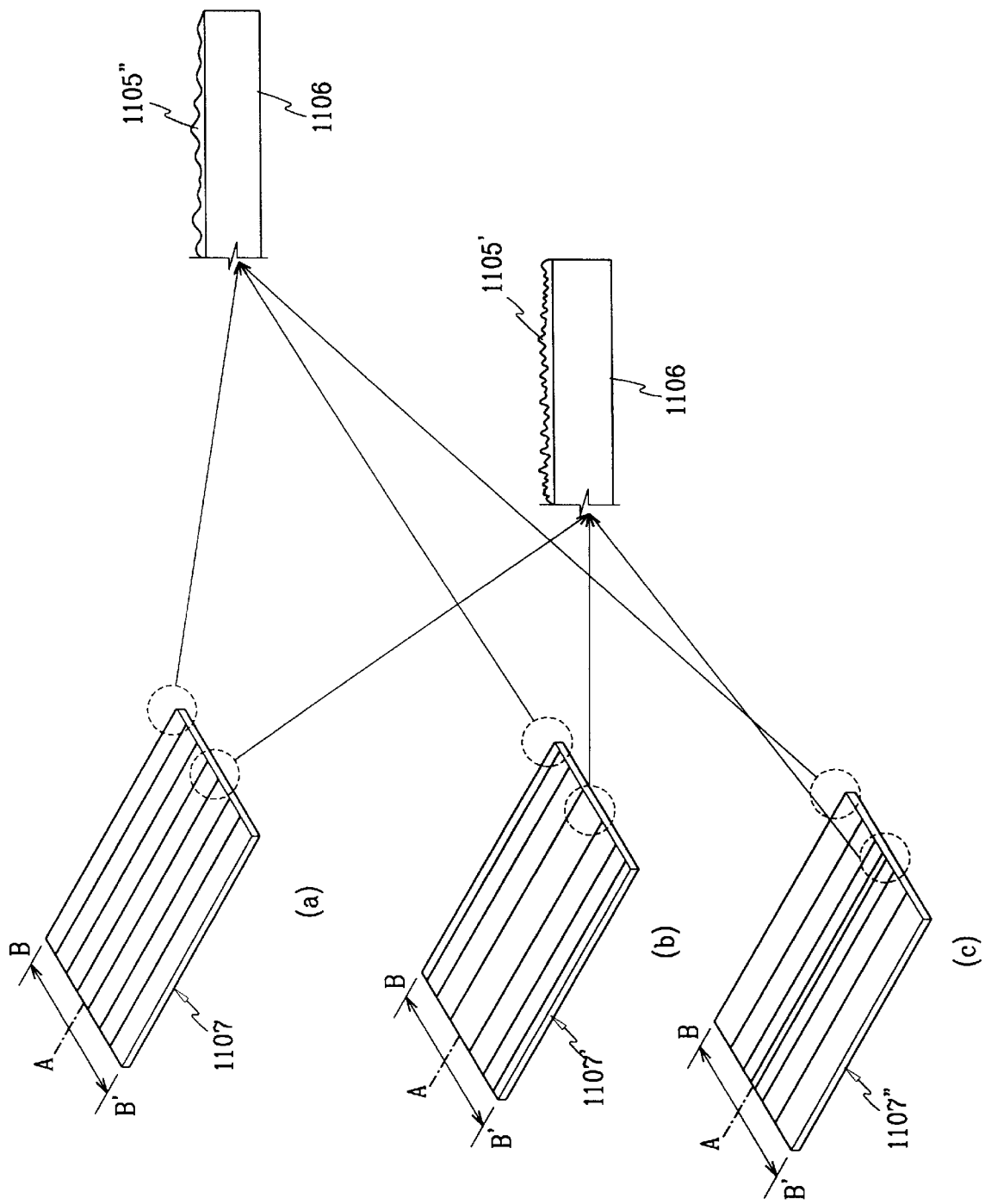
FIG. 43 shows a master hologram according to the process of FIGS. 42A–42B.

The substrate 1106, which is exposed by the above process, is developed to a master hologram 1107, 1107' or 1107" having hologram speckles 1105', 1105", as shown in FIG. 43. The density of speckles in the hologram is relatively high at the portion near the center A (hologram speckle 1105'), and discretely decreases to the portion near the edges B, B' (hologram speckles 1307"). FIG. 43 shows master holograms 1107, 1107' and 1107" wherein (a) shows the exposed width Hi is uniform over the entire substrate (Hi=Hn), while (b) shows the width Hi gradually increasing (Hi<Hn) and (c) shows Hi is gradually decreasing (Hi>Hn). It is noted that the master holograms shown in FIGS. 42A–42B, 43 are for one tubular source. Therefore, identical master holograms of which the number is the same as that of the light sources are attached to each other, resulting in a resultant master hologram for the holographic layer 94.

Then, a master stamper for the holographic layer 94 is made in the process of FIG. 12. Then, the holographic light-guides 92 are formed using the master stamper by the UV-curing process of to FIGS. 14–15 or the injection molding process of FIG. 16.

Tenth Preferred Embodiment

Now referring to FIG. 44, the tenth preferred embodiment of the plane light source unit for relatively large size LCDs according to the present invention will be explained.

Figure 44:
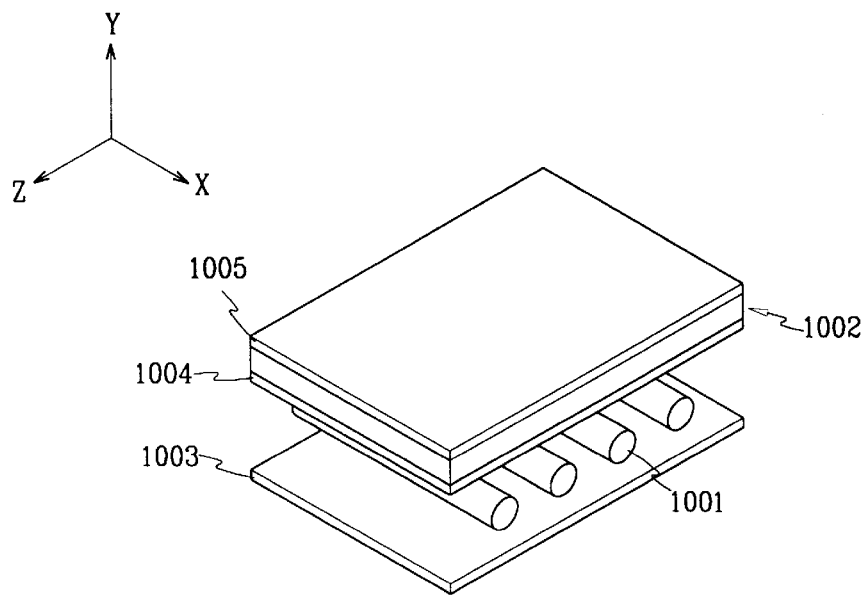
FIG. 44 shows a tenth preferred embodiment of the present invention.

As shown in FIG. 44, a plurality of tubular light sources 1001 are positioned adjacent to a light incident surface of a holographic light-guide 1002. The holographic light-guide 1002 is constituted by the light incident surface on the bottom in the drawing, a light emitting surface facing an LCD (not shown) on the top, and reflecting surfaces on the other sides. The holographic light-guide 1002 has a first holographic layer 1004 formed at the light surface on the bottom and a second holographic layer 1005 formed at the light emitting surface on the top. A reflecting plate 1003 is disposed to reflect back light emitted from the plurality of tubular light sources 1001 and the holographic light-guide 1002.

The first holographic layer 1004 of the holographic light-guide 1002 scatters light near the light source more in order to obtain uniform illumination. The density of speckles in the first holographic layer 1004 is relatively high at the portion around the light sources 1001 and gradually decreased with an increase of distance from the light sources 1001.

The second holographic layer 1005 of the holographic light-guide 1002 has speckles which are uniformly formed over the entire surface.

A master hologram for the first holographic layer 1004 as well as the master stamper (first stamper) for the first holographic layer 1004 are made through the processes as described in the holographic layer 94 of the ninth preferred embodiment with reference to FIG. 12 or 19.

Figure 45:
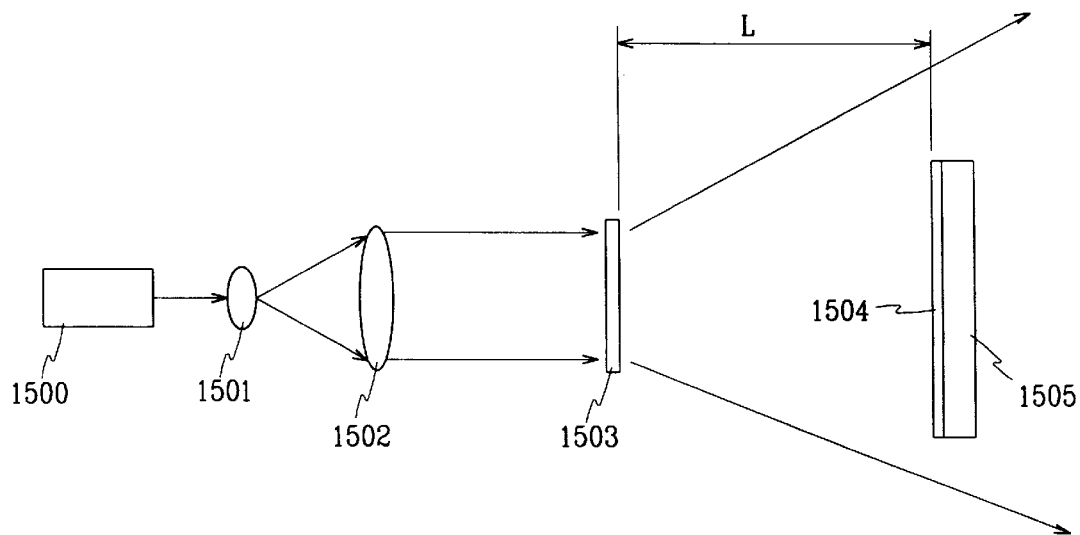
FIG. 45 illustrates a process for manufacturing a master hologram for a second holographic layer according to the tenth preferred embodiment.

On the other hand, the second holographic layer 1005 can be formed as illustrated in FIG. 45. The laser beam from laser 1500 enters lenses 1501, 1502, resulting in an enlarged beam. The enlarged beam enters a diffuser 1503 such as a ground glass diffuser. The beam diffused by the diffuser 1503 then enters a glass substrate 1105 which is at a distance L from the diffuser 1103. The glass substrate 1105, which is coated with photoresist layer 1105, is exposed for a desired time. After exposure, the substrate 1105 is developed to a master hologram for the second holographic layer 1005. A master stamper (second stamper) for the second holographic layer 1005 is made in the process of FIG. 12.

Finally, a holographic light-guide is made by a UV-curing method shown in FIG. 25 or an injection molding method shown in FIG. 26, using the first and second master stampers.

Figure 46:
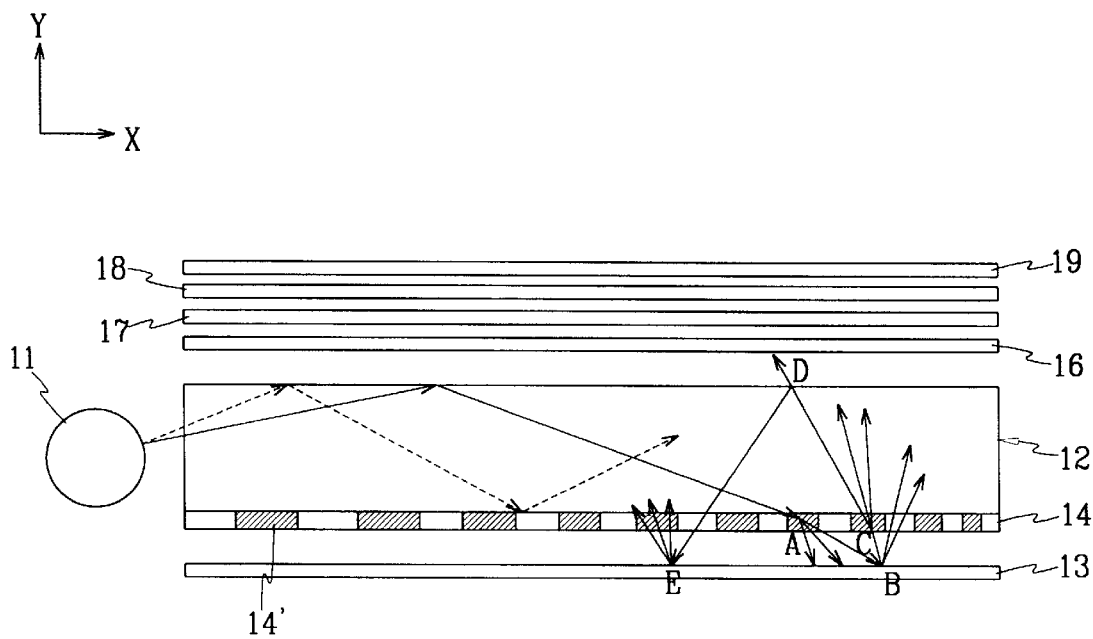
FIG. 46 illustrates ray traces in the plane light source unit according to the first preferred embodiment.

The operation of the invention unit is as follows:

First referring to FIG. 46, the first preferred embodiment as shown in FIG. 7 will be described. The light emitted from the tubular light source 11 enters to the light incident surface of the holographic light-guide 12 and reflects internally (dotted line in FIG. 46) in the holographic light-guide 12. When the light impinges on the speckle pattern 14' (portion A) of the holographic layer 14, the light scatters and exits from the holographic light-guide 12 to proceed to the reflecting plate 13. The light is then reflected (portion B) on the reflecting plate 13 and re-enters the holographic light-guide 12. At this point, if the light impinges on the speckle pattern 14' (portion C), the light again scatters. If the light impinges on the portion of no speckle pattern, it enters as it is. On the other hand, when the light reflected internally in the holographic light-guide 12 impinges on the light emitting surface of the light-guide 12 and does not satisfy the total reflection condition, the light exits the holographic light-guide 12 (portion D). After the above proceedings are repeated, the light distribution from the holographic light-guide 12 is substantially uniform over the entire surface. The light from the light-guide 12 enters diffusers 16, 19 and prism plates 17, 18.

The light proceedings of the seventh preferred embodiment as shown in FIG. 36 are similar to that of the first preferred embodiment. The difference merely lies in that two tubular light sources are used because of the light intensity required for the large size LCDs.

Figure 1A:
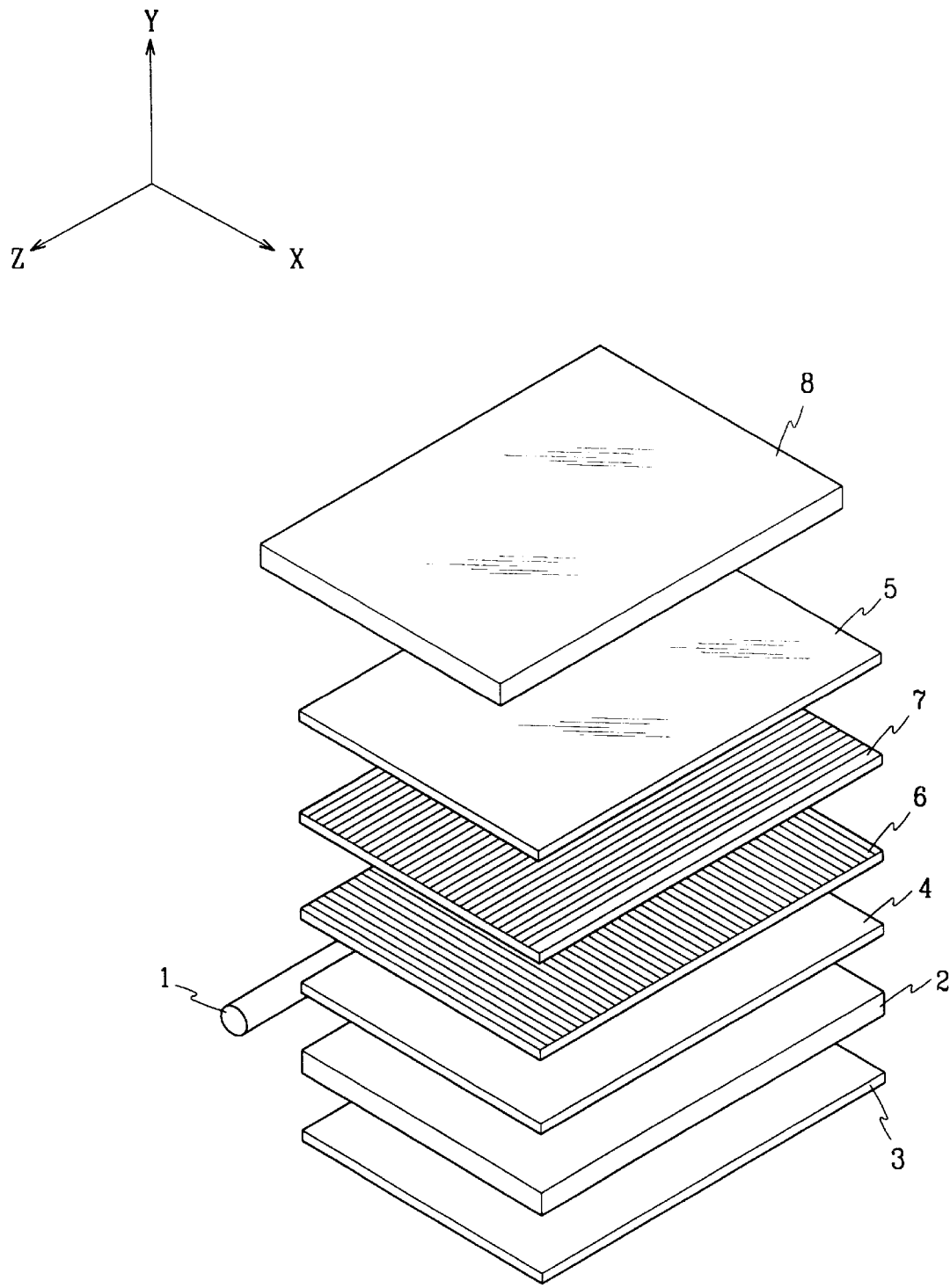
FIGS. 1A–1C show conventional plane light source units.
Figure 1B:
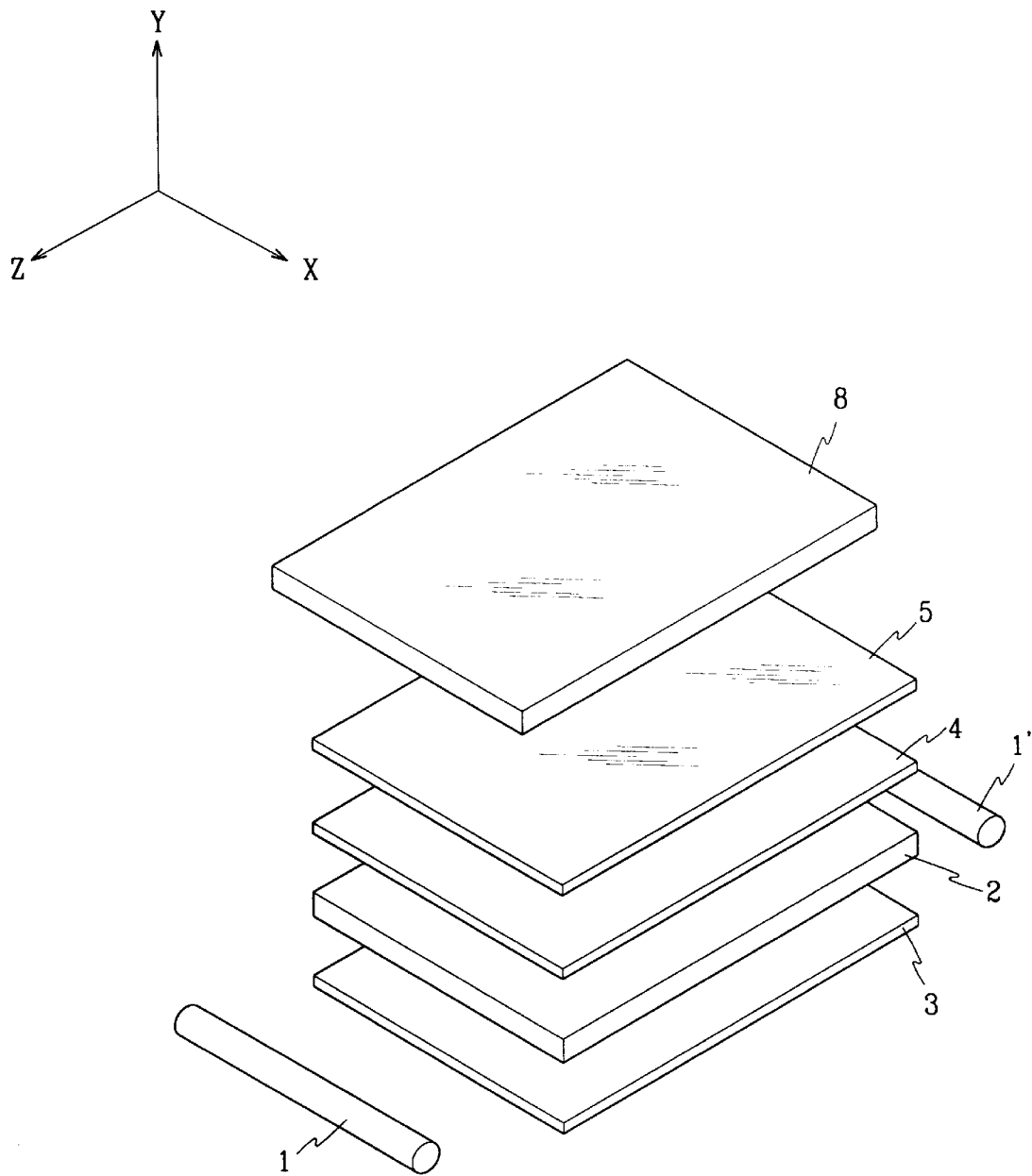
Figure 1C:
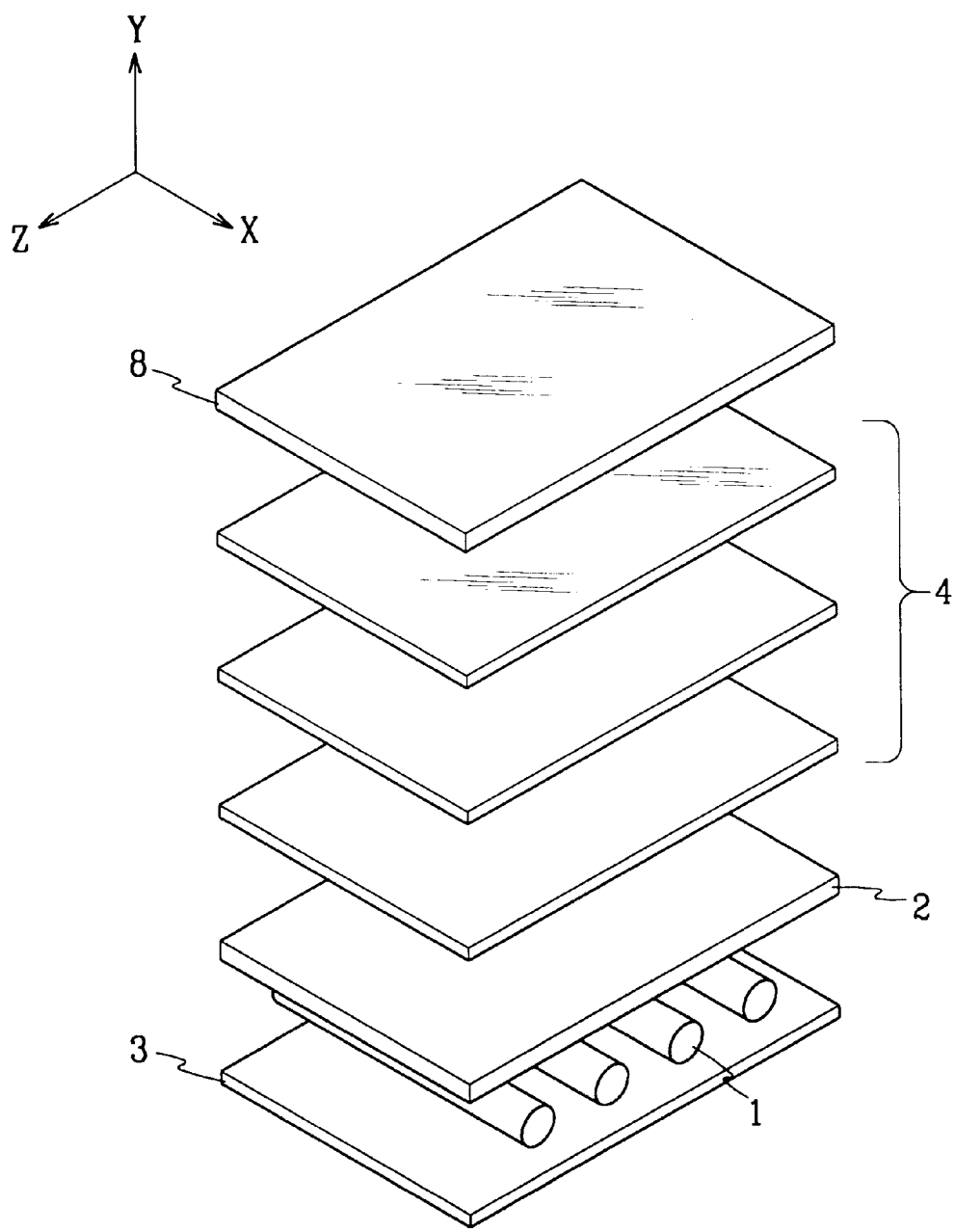
Figure 2:
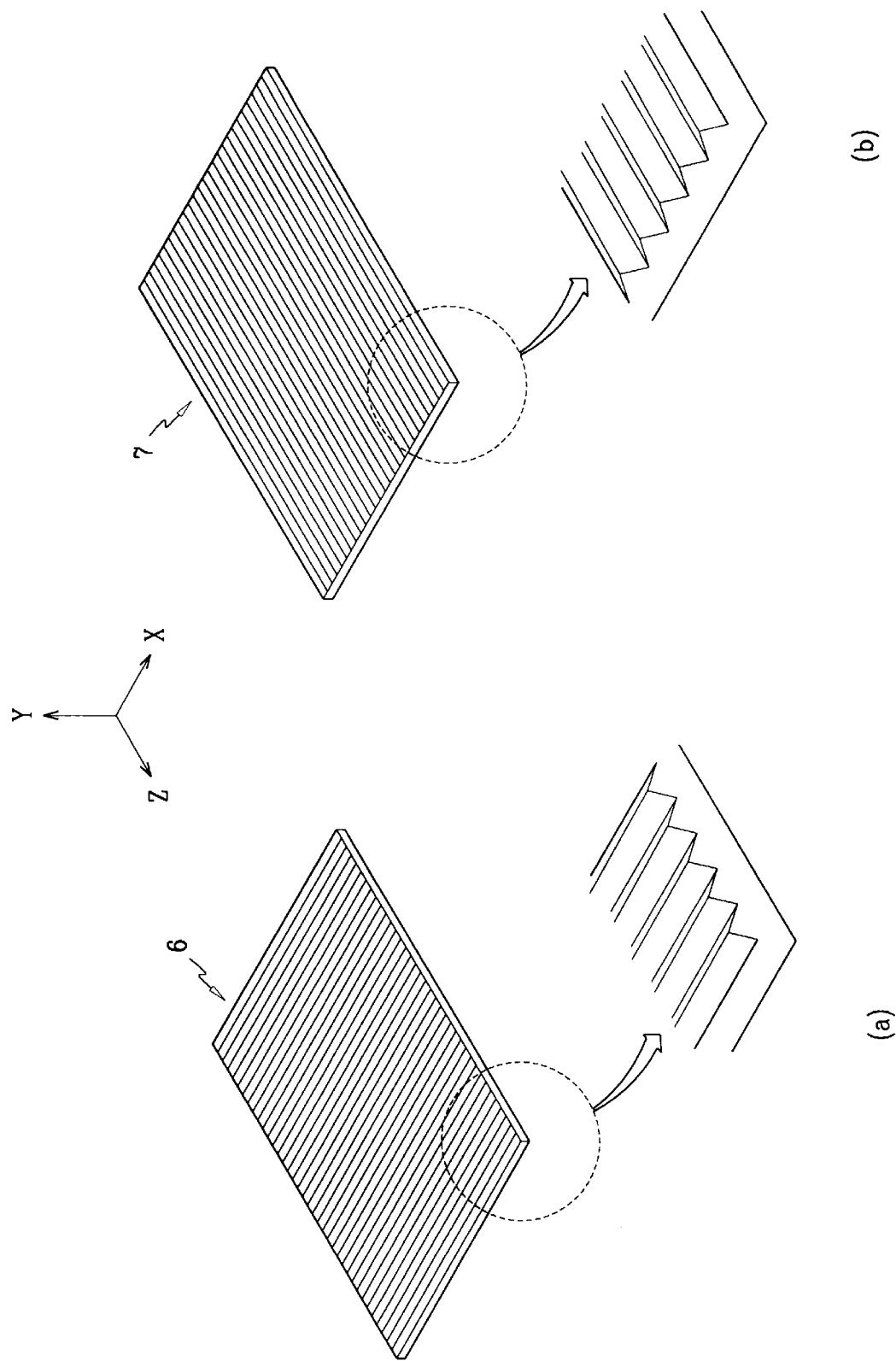
FIG. 2 shows prism plates which are used in the conventional plane light source units.
Figure 3:
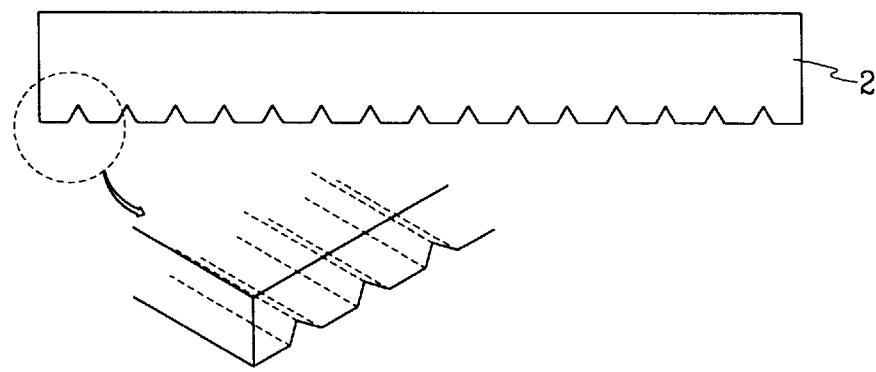
FIG. 3 shows a conventional light-guide plate.
Figure 3:
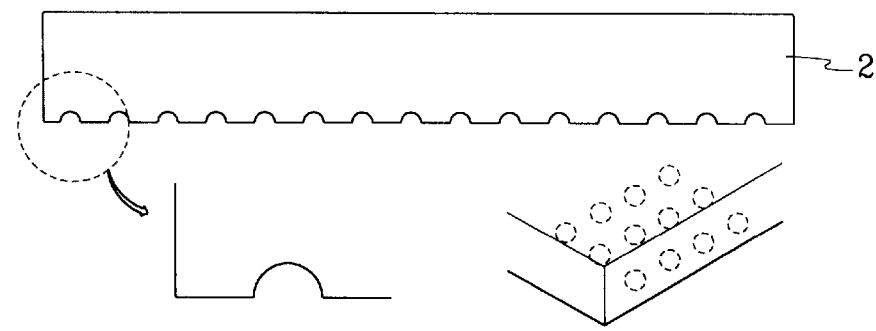
Figure 3:
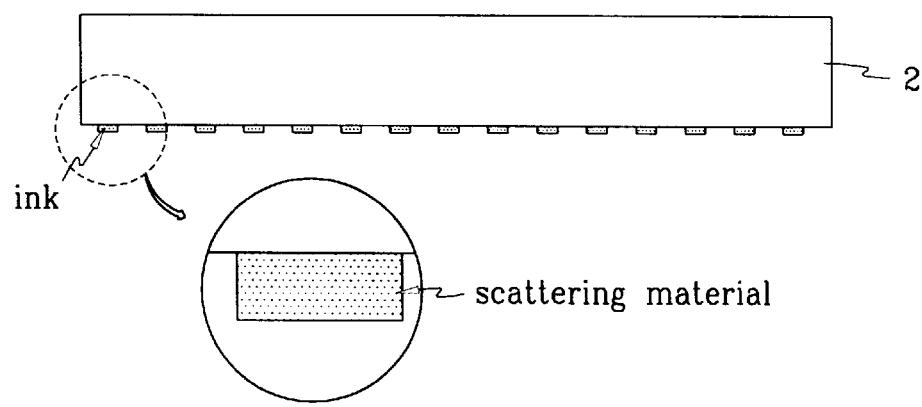
Figure 4:
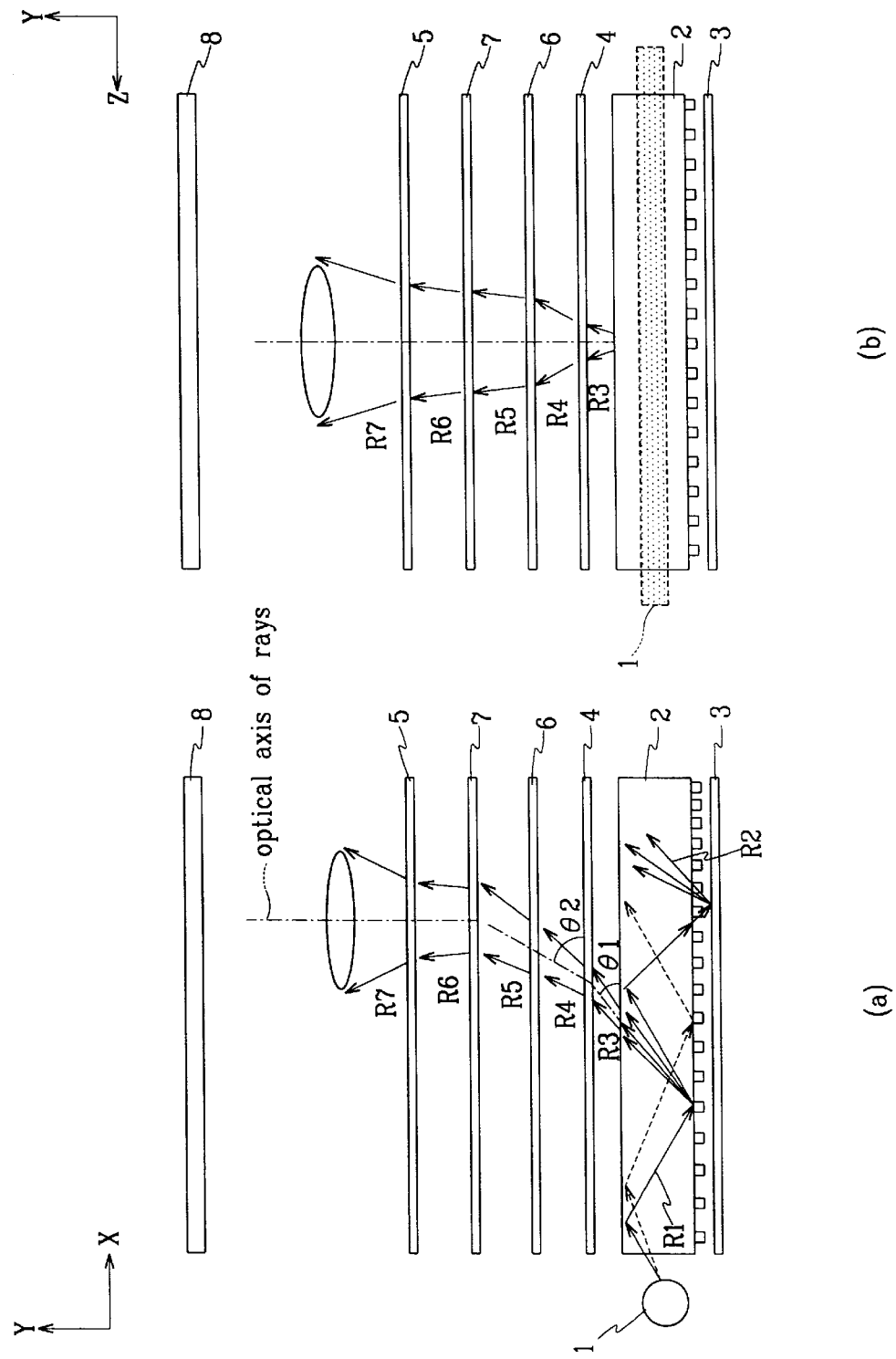
FIGS. 4–6 illustrate ray traces in the conventional plane light source unit shown in FIGS. 1A–1C, respectively.
Figure 5:
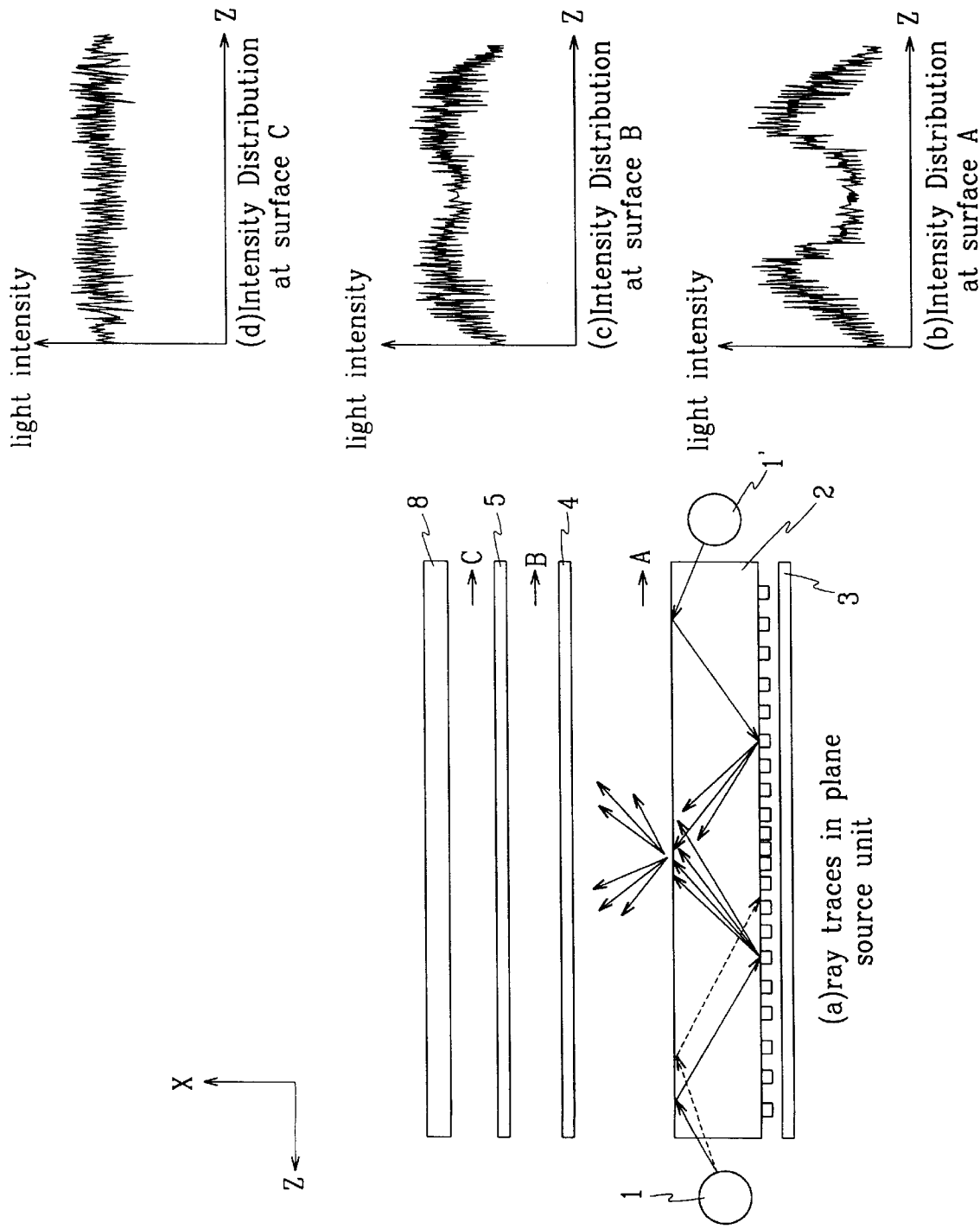
Figure 6:
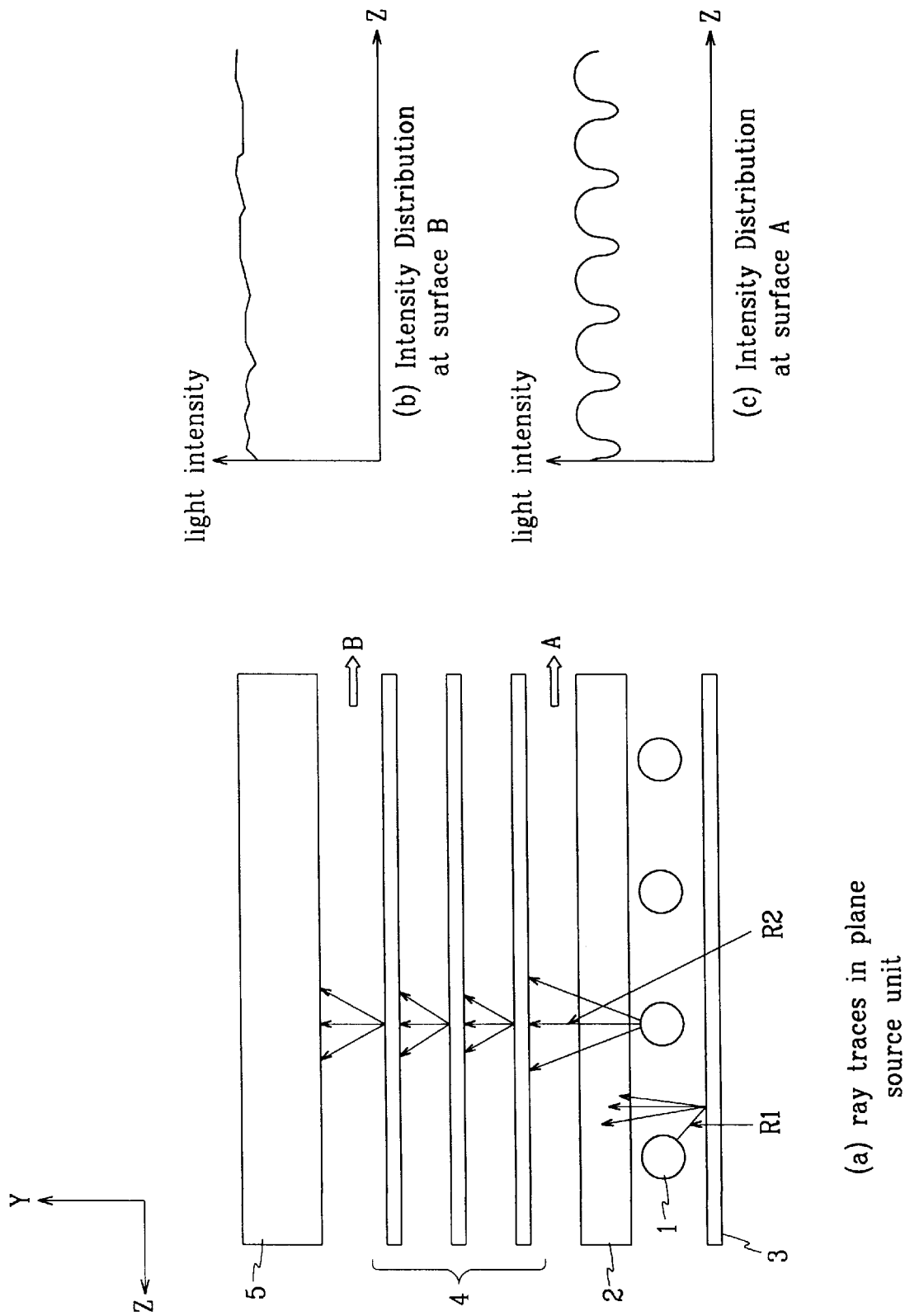
Figure 20:
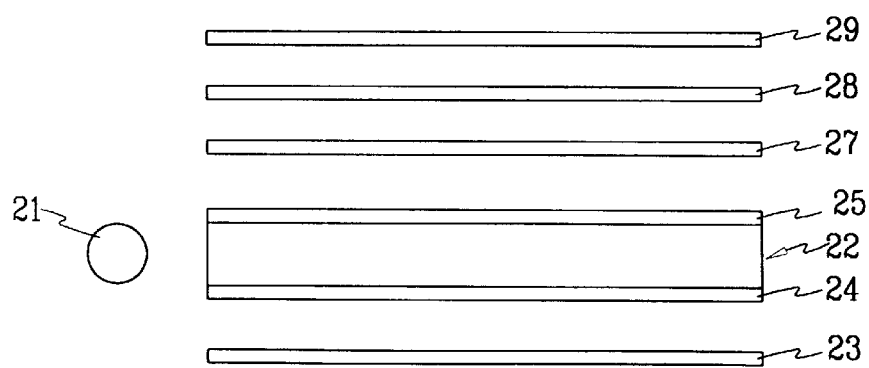
FIG. 20 shows a second preferred embodiment of a plane light source unit according to the present invention.
Figure 47:
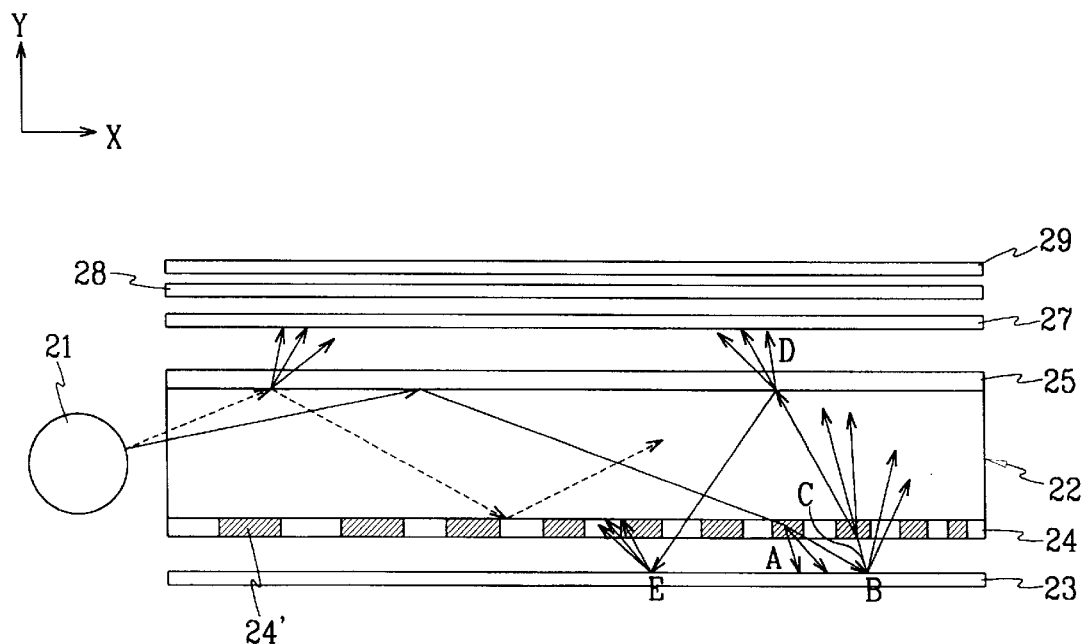
FIG. 47 illustrates ray traces in the plane light source unit according to the second preferred embodiment.

Referring to FIG. 47, the second preferred embodiment as shown in FIG. 20 is now described. The plane light source unit comprises a holographic light-guide 22 having the first and second holographic layers 24, 25. The light impinges on the first holographic layer 24 and proceeds similarly to the first preferred embodiment. On the other hand, when the light reflected internally in the holographic light-guide 22 impinges on the second holographic layer 25 on the light emitting surface of the light-guide 22 and does not satisfy the total reflection condition, the light exits and scatters from the holographic light-guide 22. The second holographic layer 25 functions as a conventional diffuser (reference numeral 4 of FIG. 1B), but has an improved optical transmittance of over 90% as compared to 50–60% in the conventional diffuser. (The optical efficiency of the first holographic layer of the first holographic layer in all embodiments is also over 90%.)

Furthermore, the speckles of the holographic layer lie below 10 $\mu$m in order of magnitude so that the light intensity through the holographic layers are more uniform than the conventional diffuser which is made with particles of 50–100 $\mu$m.

The light proceedings of the eighth preferred embodiment as shown in FIG. 39 is similar to that of the second preferred embodiment. The difference merely lies in that two tubular light source are used because of light intensity required for the large size LCDs.

Figure 27:
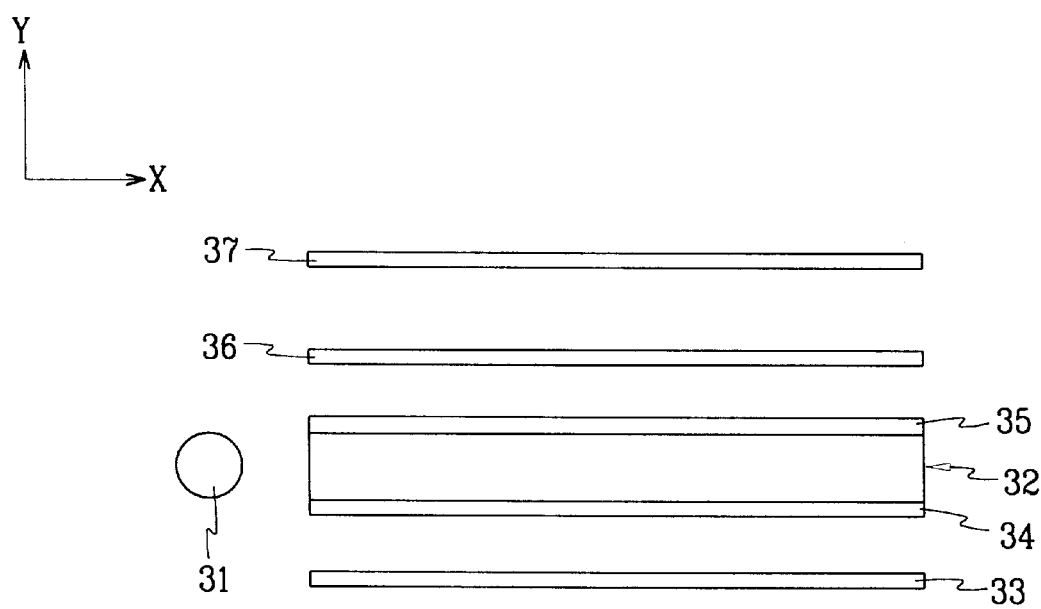
FIG. 27 shows a third preferred embodiment of a plane light source unit according to the present invention.
Figure 48A:
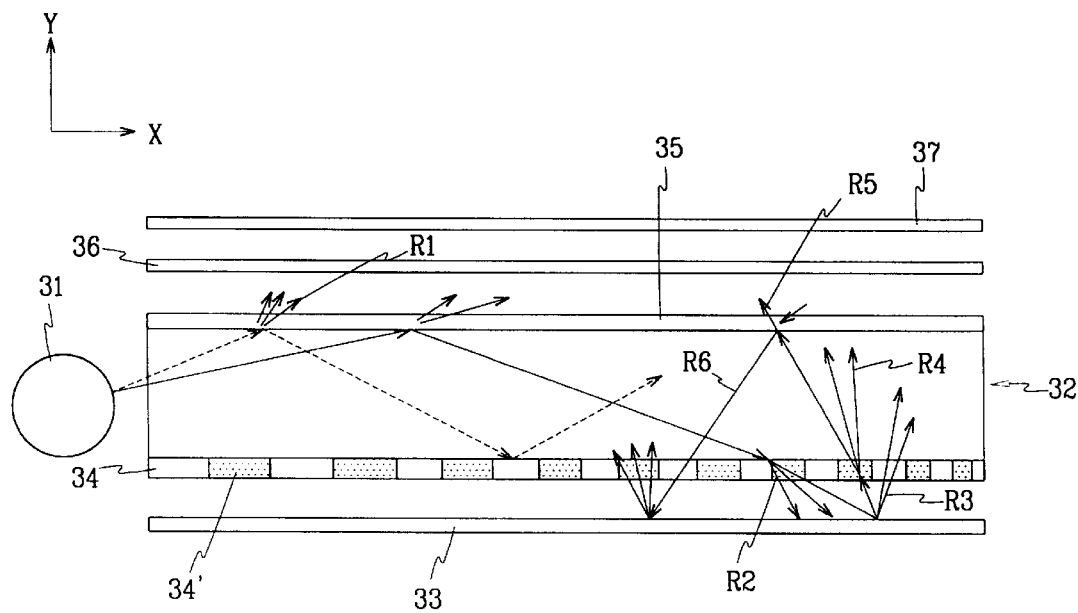
FIG. 48A illustrates ray traces in the plane light source unit according to the first preferred embodiment.
Figure 48B:
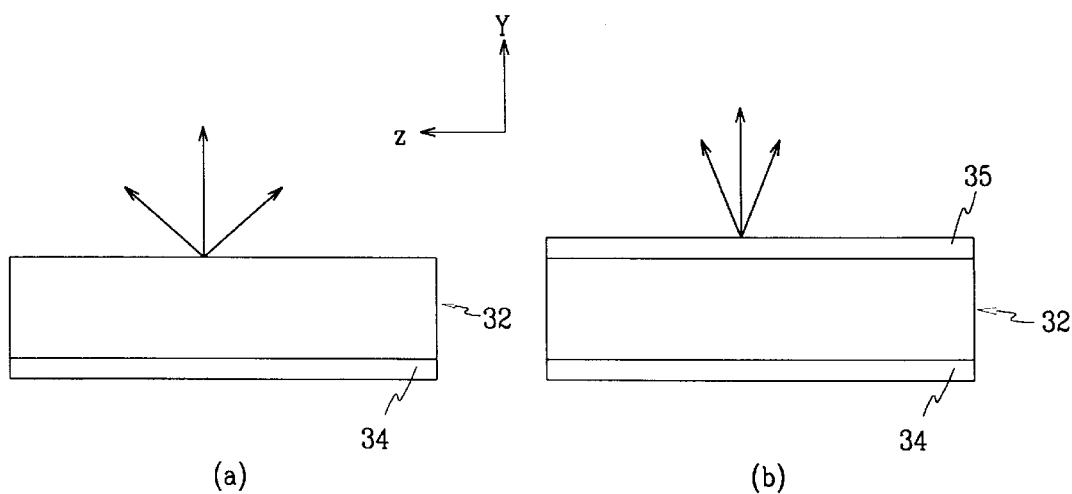
FIG. 48B shows a comparative illustration of either using a second holographic layer or not.

Referring now to FIG. 48A, the third preferred embodiment as shown in FIG. 27 will be described. The light emitted from the tubular light source 31 enters to the light incident surface of the holographic light-guide 32. When the light impinges on the second holographic layer 35, some light exits and scatters to the prism plate 36 (ray R1), and some light reflects internally (dotted line in FIG. 48a) in the holographic light-guide 32. When the light impinges on the speckle pattern 34' (ray R2) of the holographic layer 34, the light scatters and exits from the holographic light-guide 32 to proceed to the reflecting plate 33. The light is then reflected (ray R3) on the reflecting plate 33 and re-enters the holographic light-guide 32. At this point, if the light impinges on the speckle pattern 34' the light again scatters. If the light impinges on the portion of no speckle pattern enters as it is. On the other hand, when the light reflected internally in the holographic light-guide 32 impinges on the second holographic layer 35, some light exits and scatters from the holographic light-guide 32 (ray R5) and other light may reflect (ray R6). After the above proceedings are repeated, the light distribution from the holographic light-guide 32 is substantially uniform over the entire surface. The light from the second holographic layer 35 of the holographic light-guide 32 scatters more along the x-axis than the z-axis as shown in FIG. 52B, resulting in a decreased scattering angle in the y-z plane. FIG. 48B shows the case of (a) a light scattering pattern without the second holographic layer 35 and the case of (b) a light scattering pattern with the second holographic layer 35 in which scattered light has decreased the scattering angle in the y-z plane.

Then, the light exits from the holographic light-guide 32 and enters the prism plate 36 to have the main ray redirected in the y-axis. The light finally enters diffusers 37 to scatter for uniform illumination for LCDs.

Figure 30:
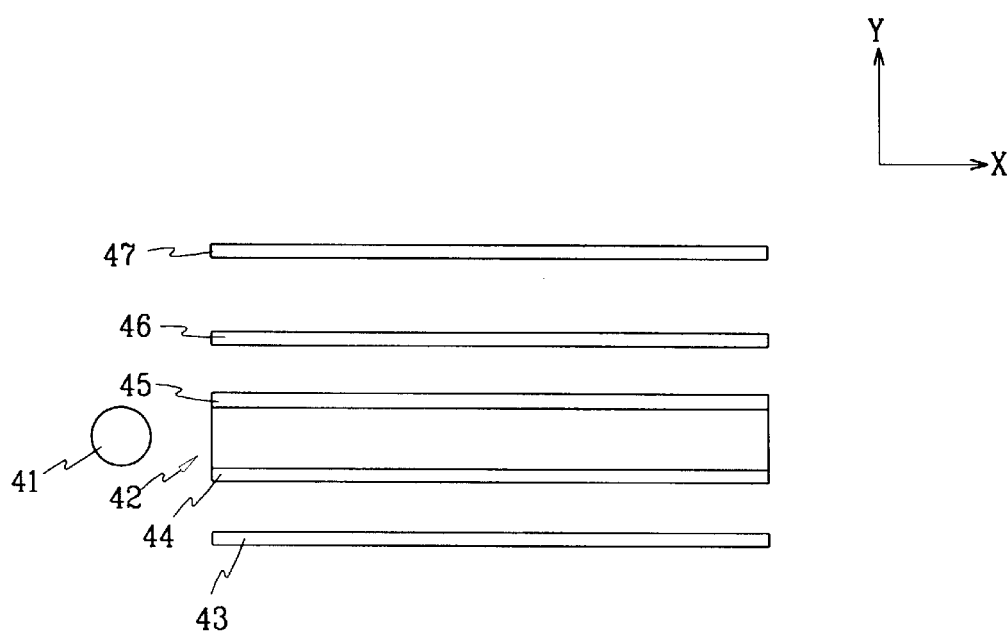
FIG. 30 shows a fourth preferred embodiment of a plane light source unit according to the present invention.

The light proceedings of the fourth preferred embodiment as shown in FIG. 30 are similar to that of the third preferred embodiment before the holographic diffuser 46. The holographic diffuser then scatters the light from the holographic light-guide 42 in such a manner that the angle of scattering is substantially greater in the direction of the z-axis as compared to the direction of the x-axis.

Figure 33:
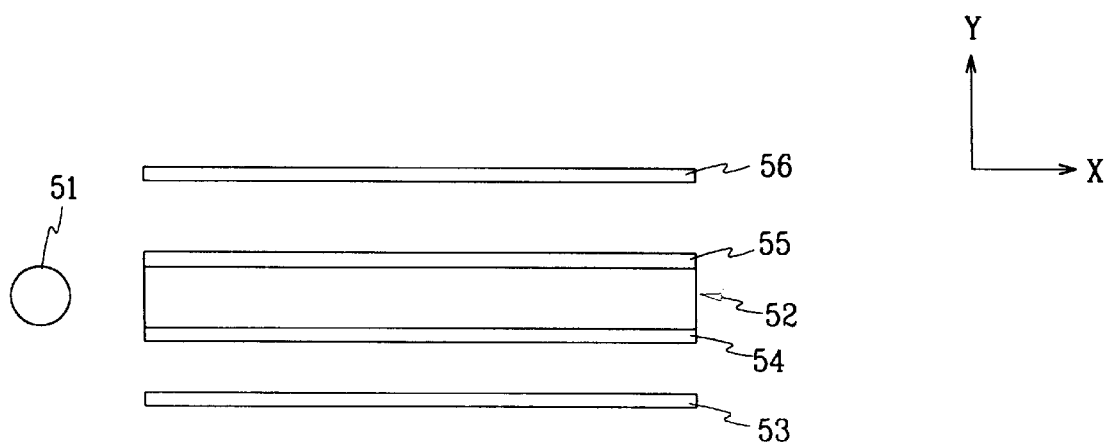
FIG. 33 shows a fifth preferred embodiment of a plane light source unit according to the present invention.

The fifth preferred embodiment as shown in FIG. 33 has the second holographic layer 55 of the holographic light-guide 52, which has the scattering characteristics of both the second holographic layer 45 and the holographic diffuser 46 of the fourth preferred embodiment. That is, the second holographic layer 55 scatters the light in such a manner that it concentrates the light substantially along the z-axis and the x-axis, Thus, the light proceedings of the fifth preferred embodiment as shown in FIG. 30 is similar to that of the fourth preferred embodiment.

Figure 34:
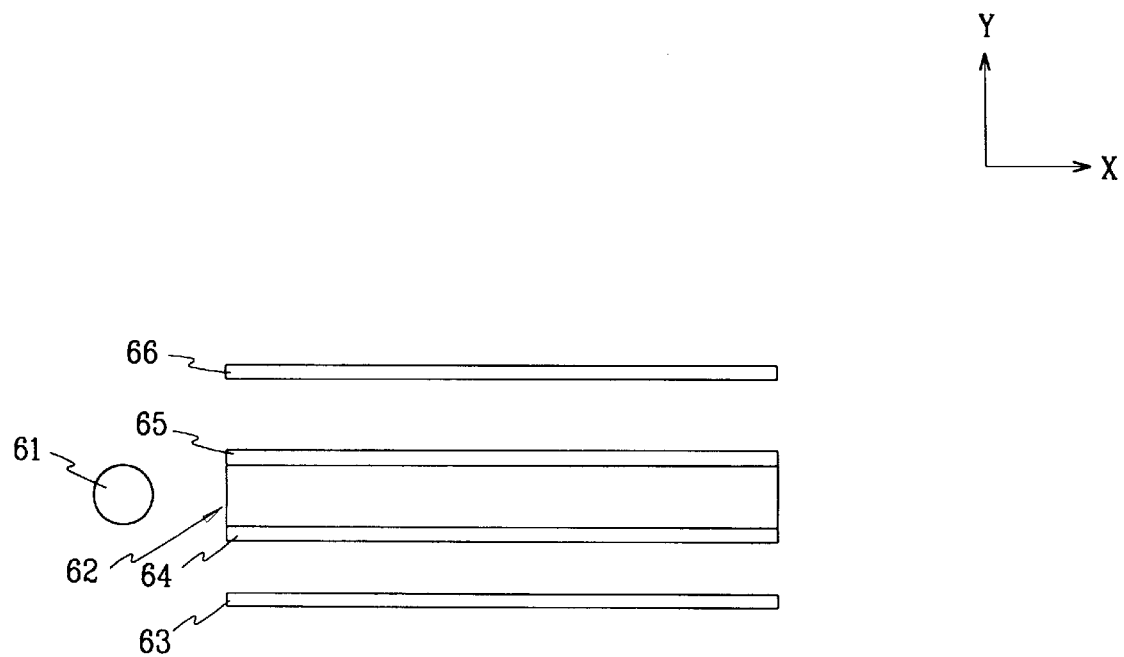
FIG. 34 shows a sixth preferred embodiment of a plane light source unit according to the present invention.
Figure 49:
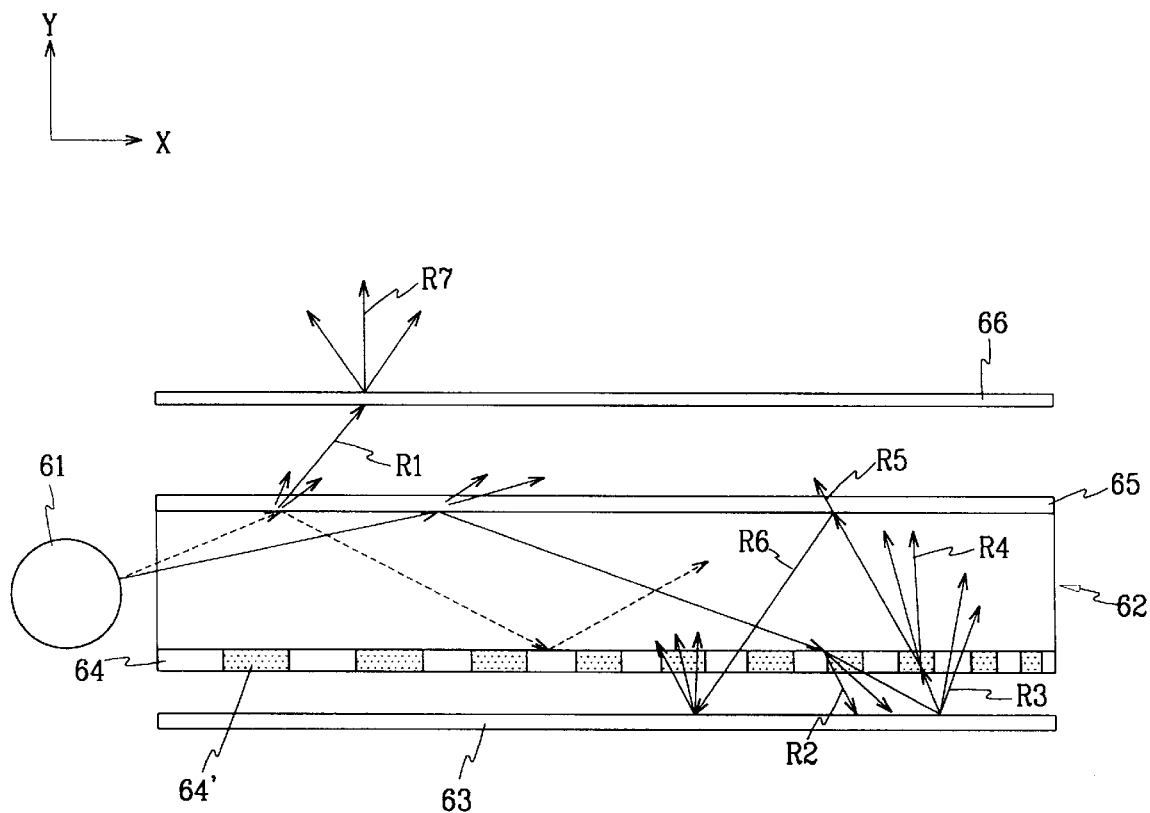
FIG. 49 illustrates ray traces in the plane light source unit according to the eighth preferred embodiment.

Referring now to FIG. 49, the sixth preferred embodiment as shown in FIG. 34 will be described. The sixth preferred embodiment as shown in FIG. 34 has the holographic diffuser 66, which has the scattering characteristics of both the second holographic layer 25 and the diffuser 26 of the fourth preferred embodiment. The light emitted from the tubular light source 61 enters to the light incident surface of the holographic light-guide 62. When the light impinges on the second holographic layer 65, some light exits and scatters to the holographic diffuser 66 (ray R1), and some light reflect internally (dotted line in FIG. 49) in the holographic light-guide 62. When the light impinges on the speckle pattern 64' (ray R2) of the first holographic layer 64, the light scatters and exits from the holographic light-guide 62 to proceed to the reflecting plate 63. The light is then reflected (ray R3) on the reflecting plate 63 and re-enters to the holographic light-guide 62. At this point, if the light impinges on the speckle pattern 64' the light again scatters. If the light impinges on the portion of no speckle pattern, it enters as it is. On the other hand, when the light reflected internally in the holographic light-guide 62 impinges on the second holographic layer 65, some light exits and scatters from the holographic light-guide 62 (ray R5) and other light may reflect (ray R6). After the above proceedings are repeated, the light distribution from the holographic light-guide 62 is substantially uniform over the entire surface. The light from the second holographic layer 65 then scatters at the holographic diffuser 66 to have the main ray redirect in parellel to the y-axis (ray R7)

Figure 50:
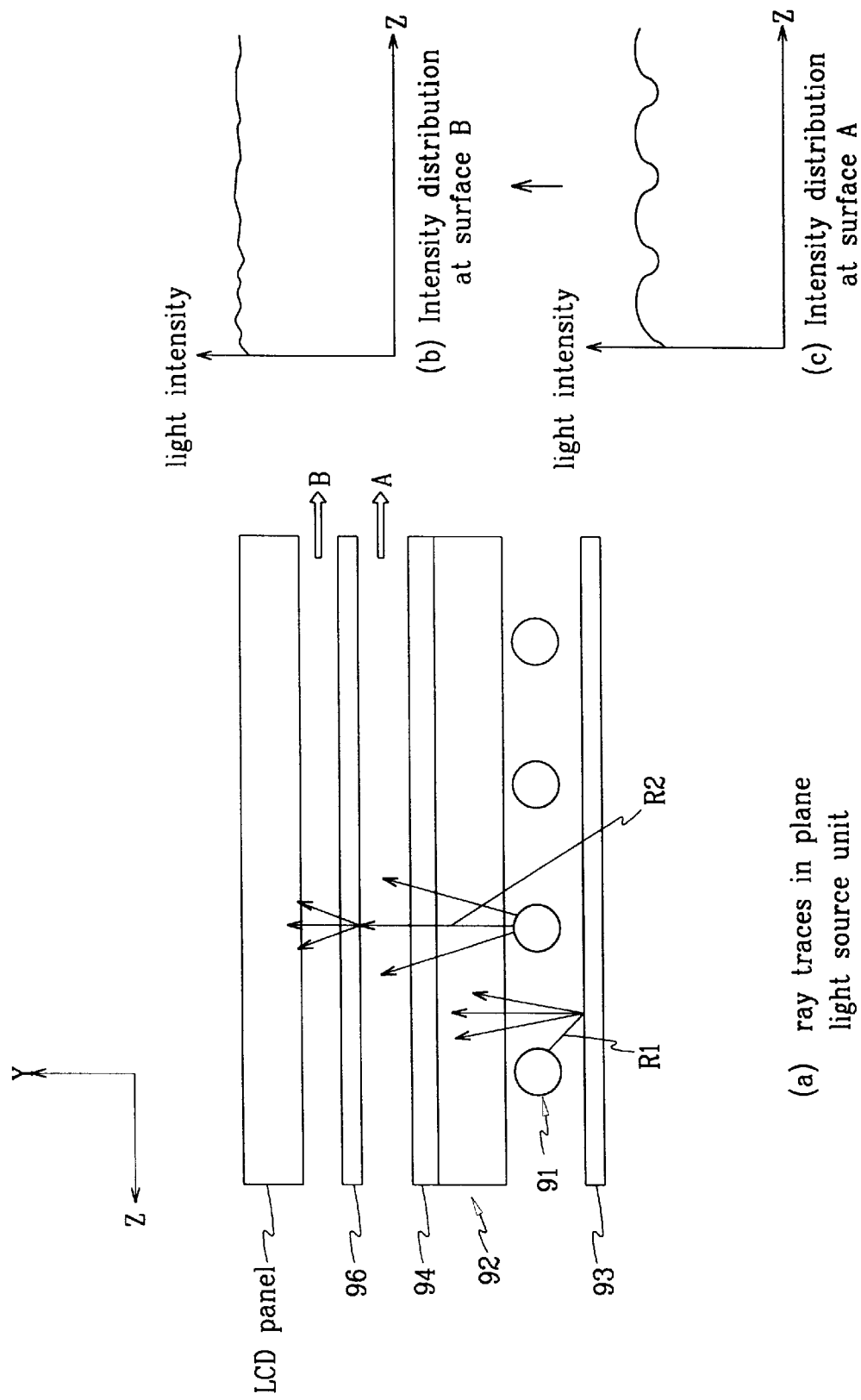
FIG. 50 illustrates ray traces in the plane light source unit according to the ninth preferred embodiment.

Referring now to FIG. 50, the ninth preferred embodiment as shown in FIG. 41A will be described. The light emitted from the tubular light sources 91 enters directly on the light incident surface of the holographic light-guide 92 (ray R2), or reflects from the reflecting plate 91 to the holographic light-guide 92 (ray R1). When the light impinges on the holographic layer 94, light exits and scatters to the diffuser 96 resulting in the light distribution shown in diagram (C). The light finally is scattered by the diffuser 96, and then has a substantially uniform light distribution as shown in diagram (B).

Figure 51:
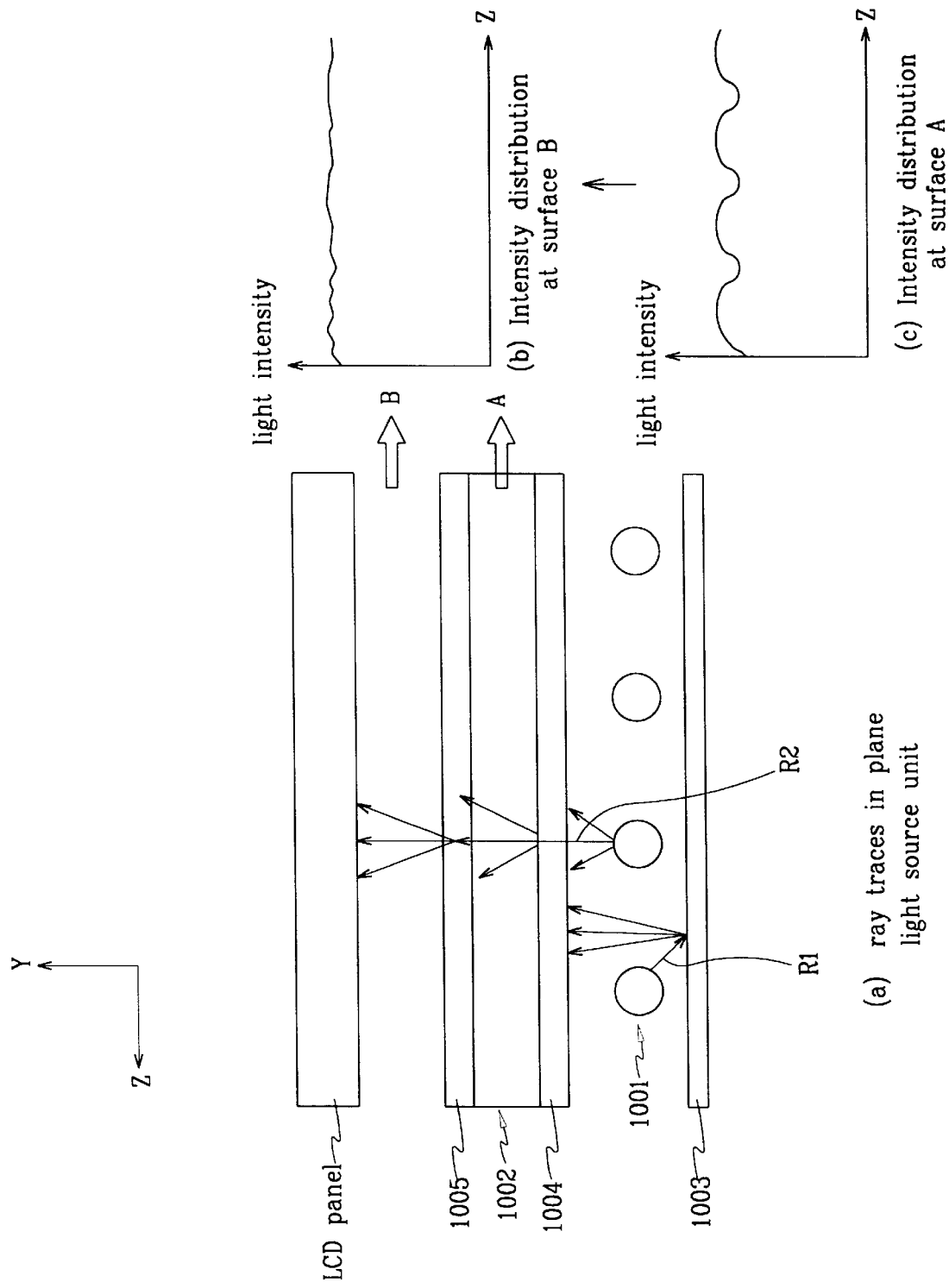
FIG. 51 illustrates ray traces in the plane light source unit according to the tenth preferred embodiment.

Referring now to FIG. 51, the tenth preferred embodiment as shown in FIG. 44 will be described. The light emitted from the tubular light sources 1001 enters directly to the holographic light-guide 1002 (ray R2), or reflect from the reflecting plate 91 to the holographic light-guide 1002 (ray R1). When the light impinges on the first holographic layer 1004, light scatters more near the light sources 1001 to bring about light distribution in the holographic light-guide 1002, as shown in diagram (C). The light finally is scattered by the second holographic layer 1005, and then has a substantially uniform light distribution as shown in diagram (B).

It will be apparent to those skilled in the art that various modifications and variations can be made to the device of the present invention without departing from the spirit and scope of the invention. The present invention covers the modifications and variations of this invention provided they fall within the scope of the appended claims and their equivalents.

What is claimed is:

1. A plane light source unit for a flat panel display, comprising:
   at least one tubular light source, elongated in a direction;
   a holographic light-guide having at least one light incident surface placed near the tubular light source, a reflecting surface on which a first holographic layer is formed for uniform illumination, and a light emitting surface; and
   a reflector disposed against the reflecting surface of the holographic light-guide, for reflecting the light that emerges from the reflecting surface and redirecting the light to the reflecting surface,
   wherein the first holographic layer has patterns with a plurality of holograms formed therein, the area density of the patterns being low toward the tubular light source and increasing with an increase in distance from the tubular light source.

2. The plane light source unit as recited in claim 1, wherein the patterns formed with the plurality of holograms are selected from the group consisting of circular and polygon shapes, the size of each hologram increasing with an increase in distance from the tubular light source, and
   wherein the plurality of holograms are arranged in a manner such that the distance between the center of each adjacent hologram is uniform.

3. The plane light source unit as recited in claim 1, wherein the patterns formed with the plurality of holograms are selected from the group consisting of circular and polygon shapes, the size of each hologram being uniform, and
   wherein the plurality of holograms are arranged in a manner such that each distance between the centers of the adjacent holograms gradually decreases with an increase in distance from the tubular light source.

4. The plane light source unit as recited in claim 1, wherein the patterns formed with the plurality of holograms are band shaped, and
   wherein each band has the same width, the plurality of holograms being arranged in a manner such that the distance between the centers of adjacent bands decreases with an increase in distance from the tubular light source.

5. The plane light source unit as recited in claim 1, further comprising one or more diffusers for diffusing the light that emerges from the holographic light-guide.

6. The plane light source unit as recited in claim 5, further comprising at least one prism plate having an array of microprisms for collimating the light from the diffuser.

7. The plane light source unit as recited in claim 1, wherein the holographic light-guide has a second holographic layer on the light emitting surface, for scattering the light for uniform illumination,
   wherein the second holographic layer has a speckled pattern, the speckles being densely formed at portions near a light source and sparsely formed at portions remote from the light source.

8. The plane light source unit as recited in claim 1, wherein the holographic light-guide has a second holographic layer on the light emitting surface, for adjusting the scattering angle of the light,
   wherein the second holographic layer redirects the light with an asymmetric scattering pattern characterized in that the angle of scattering is substantially greater within a plane perpendicular to the longitudinal direction of the tubular light source as compared to the direction parallel to the tubular light source.

9. The plane light source unit as recited in claim 8, further comprising a beam-shaping holographic diffuser, disposed against the light emitting surface of the holographic light-guide, for adjusting the scattering angle of the light emerged from the holographic light-guide, the beam-shaping holographic diffuser redirecting the light with an asymmetric scattering pattern characterized in that the angle of scattering is substantially greater within the direction parallel to the tubular light source as compared to a plane perpendicular to the longitudinal direction of the tubular light source.

10. The plane light source unit as recited in claim 9, wherein the beam-shaping holographic diffuser is provided by the following steps;
    enlarging a laser beam and entering it into a cylindrical lens so that the laser beam enters a diffuser;
    scattering of the laser beam by a diffuser;
    exposing a substrate to the laser beam at a predetermined distance, the substrate being coated with photoresist;
    developing the substrate by etching the photoresist;
    forming a metal stamper by electroless-plating the substrate;
    coating a transparent plate with an ultraviolet-curing material;
    pressing the coated transparent plate with the metal stamper; and
    irradiating the pressed transparent plate by ultraviolet rays until the ultraviolet-curing material is completely cured.

11. The plane light source unit as recited in claim 1, wherein the holographic light-guide has a second holographic layer on the light emitting surface, for adjusting the scattering angle of the light,
    wherein the second holographic layer redirects the light with a combined asymmetric scattering pattern characterized in that the angle of scattering is substantially greater within a plane perpendicular to the longitudinal direction of the tubular light source than the direction parallel to the tubular light source, as well as substantially greater within the direction parallel to the tubular light source than a plane perpendicular to the longitudinal direction of the tubular light source.

12. The plane light source unit as recited in claim 8, further comprising a holographic diffuser, disposed against the light emitting surface of the holographic light-guide, for adjusting the scattering direction of the light that emerges from the holographic light-guide, the holographic diffuser redirecting the light in such a manner that the main rays with a first predetermined angle scatter to have a second predetermined angle.

13. The plane light source unit as recited in claim 9, wherein the holographic diffuser is provided by the following steps;

separating a laser beam by a beam splitter;

enlarging each of the two separated laser beams;

scattering each of the laser beams by a diffuser;

entering each of the laser beams into a substrate with a predetermined angle, the substrate being coated with photoresist;

exposing the substrate for a predetermined time;

developing the substrate by etching the photoresist;

forming a metal stamper by electroless-plating the substrate;

coating a transparent plate with an ultraviolet-curing material;

pressing the coated transparent plate with the metal stamper; and irradiating the pressed transparent plate by ultraviolet rays until the ultraviolet-curing material is completely cured.

14. The plane light source unit as recited in claim 1, wherein the holographic layer of the holographic light-guide is provided by the following steps;

enlarging a laser beam and entering it into a diffuser;

exposing a substrate with a mask having patterns to be formed by the laser beam, the substrate being coated with photoresist; and developing the substrate by etching the photoresist.

15. The plane light source unit as recited in claim 7, wherein the second holographic layer of the holographic light-guide is provided by the following steps:

enlarging a laser beam and entering it into a diffuser;

providing a second substrate with a predetermined angle to an optic axis, the second substrate being coated with photoresist;

exposing the second substrate to the laser beam for a predetermined time; and developing the second substrate by etching the photoresist.

16. The plane light source unit as recited in claim 7, wherein the second holographic layer of the holographic light-guide is provided by the following steps;

a) enlarging a laser beam and entering it into a diffuser;

b) exposing a portion of a second substrate with a shielding plate to the laser beam in a predetermined distance, the second substrate being coated with photoresist;

c) repeating the step b) as the distance increases by a predetermined increment until the entire surface of the second substrate is exposed, wherein the portion to be exposed is adjacent to the portion previously exposed and the portion previously exposed is shielded by the shielding plate; and d) developing the second substrate by etching the photoresist.

17. The plane light source unit as recited in claim 8, wherein the second holographic layer of the holographic light-guide is provided by the following steps;

a) enlarging a laser beam and entering it into a cylindrical lens so that the laser beam enters a diffuser;

b) exposing a portion of a second substrate with a shielding plate to the laser beam at a predetermined distance, the second substrate being coated with photoresist;

c) repeating the step b) as the distance increases by a predetermined increment until the entire surface of the second substrate is exposed, wherein the portion to be exposed is adjacent to the portion previously exposed and the portion previously exposed is shielded by the shielding plate; and d) developing the second substrate by etching the photoresist.

18. The plane light source unit as recited in claim 11, wherein the second holographic layer of the holographic light-guide is provided by the following steps;

a) enlarging a laser beam and entering it into a cylindrical lens so that the laser beam enters a diffuser;

b) exposing a portion of a second substrate with a shielding plate to the laser beam at a predetermined distance, the second substrate being coated with photoresist;

c) repeating the step b) as the distance increases by a predetermined increment until the entire surface of the second substrate is exposed, wherein the portion to be exposed is adjacent to the portion previously exposed and the portion previously exposed is shielded by the shielding plate;

d) rotating the cylindrical lens by 90 degrees around an optic axis;

e) repeating the step a) through the step c); and f) developing the second substrate by etching the photoresist.

19. A plane light source unit for flat panel display, comprising:

a plurality of tubular light sources disposed in parallel, elongated in a direction;

a holographic light-guide having a light incident surface placed against the tubular light sources and a light emitting surface opposite to the light incident surface, a first holographic layer being formed on one surface selected from the group consisting of the light incident surface and the light emitting surface; and a reflector disposed against both the tubular light sources and the reflecting surface of the holographic light-guide, for reflecting and redirecting the light to the reflecting surface, wherein the first holographic layer has speckles, the density of the speckles being dense near the tubular light sources and sparse away the tubular light source.

20. The plane light source unit as recited in claim 19, wherein the holographic light-guide has a second holographic layer on the other surface selected from the group consisting of the light incident surface and the light emitting surface, the second holographic layer having speckle patterns, the density of the speckle being substantially uniform.

21. The plane light source unit as recited in claim 19, wherein the first holographic layer of the holographic light-guide is provided by the following steps;
   a) enlarging a laser beam and entering it into a diffuser;
   b) exposing a portion of a first substrate with a shielding plate to the laser beam at a predetermined distance, the first substrate being coated with photoresist;
   c) repeating the step b) as the distance increases by a predetermined increment until the entire surface of the first substrate is exposed, wherein the portion to be exposed is adjacent to the portion previously exposed and the portion previously exposed is shielded by the shielding plate; and
   d) developing the first substrate by etching the photoresist.

22. The plane light source unit as recited in claim 20, wherein the second holographic layer of the holographic light-guide is provided by the following steps;
   enlarging a laser beam and entering it into a diffuser;
   exposing a second substrate to the laser beam at a predetermined distance, the second substrate being coated with photoresist; and
   developing the second substrate by etching the photoresist.

23. The plane light source unit as recited in claim 1, wherein the plurality of holograms of the first holographic layer are selected from the group of a negative hologram in which the pattern in which the holograms are formed is recessed and a positive hologram in which the pattern in which the holograms are formed protrudes outwardly.

24. In a plane light source unit for flat panel display including a holographic light-guide, the holographic light-guide having a reflecting surface on which a first holographic layer is formed, and a light emitting surface on which a second holographic layer is formed, a method for manufacturing the holographic light-guide comprising the steps of:
   1) forming a first hologram for the first holographic layer, comprising the steps of:
      A) enlarging a laser beam and entering it into a diffuser;
      B) exposing a first substrate with a mask having patterns to be formed upon the first substrate, the first substrate being coated with photoresist; and
      C) developing the first substrate by etching the photoresist;
   2) forming a second hologram for the second holographic layer, comprising the steps of:
      a) enlarging a laser beam and entering it into a cylindrical lens so that the laser beam enters a diffuser;
      b) exposing a portion of a second substrate with a shielding plate to the laser beam at a predetermined distance, the second substrate being coated with photoresist;
      c) repeating the step b) as the distance increases by a predetermined increment until the entire surface of the second substrate is exposed, wherein the portion to be exposed is adjacent to the portion previously exposed and the portion exposed is shielded by the shielding plate; and
      d) developing the second substrate by etching the photoresist;
   3) forming a first metal stamper by electroless-plating the first substrate;
   4) forming a second metal stamper by electroless-plating the second substrate;
   5) coating a transparent plate with an ultraviolet-curing material;
   6) irradiating the coated transparent plate with ultraviolet rays without completely curing the ultraviolet-curing material;
   7) pressing the irradiated transparent plate up and down with the first metal stamper and the second metal stamper simultaneously; and
   8) irradiating the transparent plate with ultraviolet rays until the ultraviolet-curing material is completely cured.

25. The method as recited in claim 24, wherein the step of 2) forming a second hologram further comprises the step of:
   repeating the steps of a) through c) under the condition that the cylindrical lens is rotated by 90 degrees around the optic axis before the d) developing step.

26. In a plane light source unit for flat panel display including a holographic light-guide, the holographic light-guide having a reflecting surface on which a first holographic layer is formed, and a light emitting surface on which a second holographic layer is formed, a method for manufacturing the holographic light-guide comprising the steps of:
   1) forming a first hologram for the first holographic layer, comprising the steps of:
      A) enlarging a laser beam and entering it into a diffuser;
      B) exposing a first substrate with a mask having patterns to be formed to the laser beam, the first substrate being coated with photoresist; and
   2) forming a second hologram for the second holographic layer, comprising the steps of:
      a) enlarging a laser beam and entering it into a cylindrical lens so that the laser beam enters a diffuser;
      b) exposing a portion of a second substrate with a shielding plate to the laser beam at a predetermined distance, the second substrate being coated with photoresist;
      c) repeating the step b) as the distance increases by a predetermined increment until the entire surface of the second substrate is exposed, wherein the portion to be exposed is adjacent to the portion previously exposed and the portion exposed is shielded by the shielding plate; and
      d) developing the second substrate by etching the photoresist;
   3) forming a first metal stamper by electroless-plating the first substrate;
   4) forming a second metal stamper by electroless-plating the-second substrate;
   5) providing a mold with the first metal stamper and second metal stamper attached to the bottom and top thereof, respectively; and
   6) injecting molding material into the mold.

27. The method as recited in claim 24, wherein the mask used in the step of 1) is selected from the group consisting of a mask that has patterns which are transparent in portions to be formed as holograms and opaque in other portions so that a negative hologram is produced and a mask that has patterns which are opaque in portions to be formed as holograms and transparent in other portions so that a positive hologram is produced.

28. In a plane light source unit for a flat panel display including a holographic light-guide, the holographic light-guide having a holographic layer on one of the top and bottom surfaces, a method for manufacturing the holographic light-guide comprising the steps of:

1) enlarging a laser beam and entering it into a diffuser;
2) exposing a portion of a substrate with a shielding plate to the laser beam at a predetermined distance, the second substrate being coated with photoresist;
3) repeating the step 2) as the distance increases by a predetermined increment until the entire surface of the substrate is exposed, wherein the portion to be exposed is adjacent to the portion previously exposed and the portion previously exposed is shielded by the shielding plate;
4) developing the substrate by etching the photoresist;
5) forming a metal stamper by electroless-plating the substrate;
6) coating a transparent plate with an ultraviolet-curing material;
7) irradiating the coated transparent plate by ultraviolet rays without completely curing the ultraviolet-curing material;
8) pressing the irradiated transparent plate with the metal stamper; and
9) irradiating the transparent plate by ultraviolet rays until the ultraviolet-curing material is complete cured.

29. The method as recited in claim 28, wherein in the 9) irradiating step, the ultraviolet rays are irradiated within a time period selected from the group consisting of during the pressing with the metal stamper and after pressing with the metal stamper.

30. In a plane light source unit for a flat panel display including a holographic light-guide, the holographic light-guide having a holographic layer on one of the top and bottom surfaces, a method for manufacturing the holographic light-guide comprising the steps of:
1) enlarging, a laser beam and entering it into a diffuser;
2) exposing a portion of a substrate with a shielding plate to the laser beam at a predetermined distance, the second substrate being coated with photoresist;
3) repeating the step 2) as the distance increases by a predetermined increment until the entire surface of the substrate is exposed, wherein the portion to be exposed is adjacent to the portion previously exposed and the portion previously exposed is shielded by the shielding plate;
4) developing the substrate by etching the photoresist;
5) forming a metal stamper by electroless-plating the substrate;
6) providing a mold with the metal stamper attached; and
7) injecting molding material into the mold.

31. In a plane light source unit for flat panel display including a holographic light-guide, the holographic light-guide having a reflecting surface on which a first holographic layer is formed, and a light emitting surface on which a second holographic layer is formed, the first holographic layer being formed in a speckled pattern which is densely formed at portions near a light source and sparsely formed at portions remote from the light source, the second holographic layer being formed in a speckle pattern which is uniformly formed over an entire surface, a method for manufacturing the holographic light-guide comprising the steps of:
1) forming a first hologram for the first holographic layer, comprising the steps of:
   A) enlarging a laser beam and entering it into a diffuser;
   B) exposing a portion of a first substrate with a shielding plate to the laser beam at a predetermined distance, the first substrate being coated with photoresist;
   C) repeating the step B) as the distance increases by a predetermined increment until the entire surface of the first substrate is exposed, wherein the portion to be exposed is adjacent to the portion previously exposed and the portion previously exposed is shielded by the shielding plate; and
   D) developing the first substrate by etching the photoresist;
2) forming a second hologram for the second holographic layer, comprising the steps of:
   a) enlarging a laser beam and entering it into a diffuser;
   b) exposing a portion of a second substrate by etching the photoresist;
3) forming a first metal stamper by electroless-plating the first substrate;
4) forming a second metal stamper by electroless-plating the second substrate;
5) coating a transparent plate with an ultraviolet-curing material;
6) irradiating the coated transparent plate by ultraviolet rays without complete curing the ultraviolet-curing material;
7) pressing the irradiated transparent plate up and down with the first metal stamper and the second metal stamper simultaneously; and
8) irradiating the transparent plate with ultraviolet rays until the ultraviolet-curing material is completely cured.

32. In a plane light source unit for flat panel display including a holographic light-guide, the holographic light-guide having a reflecting surface on which a first holographic layer is formed, and a light emitting surface on which a second holographic layer is formed, the first holographic layer being formed in a speckled pattern which is densely formed at portions near a light source and sparsely formed at portions remote from the light source, the second holographic layer being form in a speckle pattern which is uniformly formed over an entire surface, a method for manufacturing the holographic light-guide comprising the steps of:
1) forming a first hologram for the first holographic layer, comprising the steps of:
   A) enlarging a laser beam and entering it into a diffuser;
   B) exposing a portion of a first substrate with a shielding plate to the laser beam at a predetermined distance, the first substrate being coated with photoresist;
   C) repeating the step B) as the distance increases by a predetermined increment until the entire surface of the first substrate is exposed, wherein the portion to be exposed is adjacent to the portion previously exposed and the portion previously exposed is shielded by the shielding plate; and
   D) developing the first substrate by etching the photoresist;
2) forming a second hologram for the second holographic layer, comprising the steps of:
   a) enlarging a laser beam and entering it into a diffuser;
   b) exposing a portion of a second substrate by etching the photoresist;
3) forming a first metal stamper by electroless-plating the first substrate;
4) forming a second metal stamper by electroless-plating the second substrate;
5) providing a mold with the first metal stamper and second meta stamper attached to the bottom and top thereof, respectively; and 6) injecting molding material into the mold.

33. The plane light source unit as recited in claim 1,
wherein the patterns formed with the plurality of holograms are band shaped, and
wherein each band has a width which increases with an increase in distance from the tubular light source, the plurality of holograms being arranged in a manner such that the distance between the centers of adjacent bands is uniform.

* * * * *

UNITED STATES PATENT AND TRADEMARK OFFICE
CERTIFICATE OF CORRECTION

PATENT NO. : 6,480,307 B1
DATED : November 12, 2002
INVENTOR(S) : Yang

It is certified that error appears in the above-identified patent and that said Letters Patent is hereby corrected as shown below:

Title page,
Item [30], Foreign Application Priority Data,
"Jul. 2, 1919" should read -- Jul. 2, 1999 --.

Item [56], References Cited, U.S. PATENT DOCUMENTS,
"Ishikawa" should read -- Ishikawa et al. --;
"Hira" should read -- Hira et al. --;
"Shinohara" should read -- Shinohara et al. --.

Column 27,
Line 33, after "enlarging" cancel the comma (,).

Column 28,
Line 37, "form" should read -- formed --;
Line 66, "meta" should read -- metal --.

Signed and Sealed this

Eighth Day of April, 2003

JAMES E. ROGAN
*Director of the United States Patent and Trademark Office*